United States Patent
Kaechi

(10) Patent No.: US 9,760,747 B2
(45) Date of Patent: Sep. 12, 2017

(54) COMMUNICATION APPARATUS AND METHOD FOR CONTROLLING THE SAME

(71) Applicant: CANON KABUSHIKI KAISHA, Tokyo (JP)

(72) Inventor: Shuya Kaechi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/053,243

(22) Filed: Feb. 25, 2016

(65) Prior Publication Data

US 2016/0171259 A1     Jun. 16, 2016

Related U.S. Application Data

(63) Continuation-in-part of application No. 14/643,373, filed on Mar. 10, 2015, now abandoned.

(30) Foreign Application Priority Data

Mar. 11, 2014 (JP) ................................. 2014-048071
Apr. 13, 2015 (JP) ................................. 2015-082088

(51) Int. Cl.
  *G06K 19/06*     (2006.01)
  *G06K 7/10*      (2006.01)

(52) U.S. Cl.
  CPC ................................. *G06K 7/10158* (2013.01)

(58) Field of Classification Search
  CPC ........... G06K 19/0712; G06K 19/0723; G06K 19/0707; G06K 19/0727; G06K 19/07345; G06K 19/07381; G06K 19/0739; G06K 19/07749; G06K 19/0715; G06K 19/0724; G06K 7/0008; G06Q 10/00; G06Q 20/045; G06Q 20/327; G06Q 20/3278; G07B 15/00; G07B 15/02; G07F 17/0014; H03H 1/0007; H03H 2001/0085; H03H 7/0115; H04B 7/0602

(Continued)

(56) References Cited

U.S. PATENT DOCUMENTS

2004/0189263 A1 * 9/2004 Meier ...................... H02J 7/025
                                                                323/210
2005/0156709 A1 * 7/2005 Gilbert ................. G06K 7/0008
                                                                340/10.1

(Continued)

FOREIGN PATENT DOCUMENTS

JP     2008-092304 A     4/2008

*Primary Examiner* — Christopher Stanford
*Assistant Examiner* — Tae Kim
(74) *Attorney, Agent, or Firm* — Carter, DeLuca, Farrell & Schmidt, LLP

(57) ABSTRACT

There is provided a communication apparatus comprising an antenna. A communication unit is able to use external power that is generated by receiving a signal from an external apparatus via the antenna, thereby transmitting a response to the signal that is received from the external apparatus to the external apparatus. A deactivation unit deactivates, in a case where the external power is generated by receiving the signal from the external apparatus via the antenna, supply of the external power from the antenna to the communication unit. A control unit performs control so as to interrupt deactivation of supply of the external power from the antenna to the communication unit by the deactivation unit.

8 Claims, 33 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2006/0114159 A1* | 6/2006 | Yoshikawa | H01Q 1/24 343/702 |
| 2007/0075140 A1* | 4/2007 | Guez | G06K 19/0707 235/435 |
| 2009/0088077 A1* | 4/2009 | Brown | H04B 5/02 455/41.2 |
| 2011/0198398 A1* | 8/2011 | Itay | G06K 7/10356 235/439 |
| 2013/0234835 A1* | 9/2013 | Piersol | G06K 19/07381 340/10.5 |

\* cited by examiner

F I G. 2

| BATTERY VOLTAGE Vbatt STATE | CPU STATE | CPU OUTPUT 1 | SW-B STATE | SW-A STATE | CONTACTLESS IC WIRELESS COMMUNICATION OPERATION |
|---|---|---|---|---|---|
| $0 \leq V_{batt} < V_{b1}$ | OFF | OFF | OFF | ON | DISABLE |
| $V_{b1} \leq V_{batt}$ | OFF | OFF | OFF | ON | DISABLE |
| | ON | L | OFF | ON | DISABLE |
| | | H | ON | OFF | ENABLE |

F I G. 9

| BATTERY VOLTAGE Vbatt STATE | CPU STATE | CPU OUTPUT 1 | STATE HOLDING CIRCUIT OUTPUT | SW-B STATE | SW-C STATE | SW-A STATE | CONTACTLESS IC WIRELESS COMMUNICATION OPERATION |
|---|---|---|---|---|---|---|---|
| $0 \leq Vbatt < Va1$ | OFF | OFF | OFF | OFF | OFF | ON | DISABLE |
| $Va1 \leq Vbatt < Vb1$ | OFF | OFF | L | OFF | OFF | ON | DISABLE |
|  | OFF | OFF | H | OFF | ON | OFF | ENABLE |
| $Vb1 \leq Vbatt$ | ON | OFF | L | OFF | OFF | ON | DISABLE |
|  |  | OFF | H | OFF | ON | OFF | ENABLE |
|  |  | L | L | OFF | OFF | ON | DISABLE |
|  |  | H | H | ON | ON | OFF | ENABLE |
|  |  | L | L | OFF | OFF | ON | DISABLE |
|  |  | H | H | ON | OFF | ON | DISABLE |

FIG. 15

| BATTERY VOLTAGE Vbatt STATE | CPU STATE | CPU OUTPUT 1 | VOLTAGE DETECTION CIRCUIT OUTPUT | SW-B STATE | SW-D STATE | SW-C STATE | SW-A STATE | CONTACTLESS IC WIRELESS COMMUNICATION OPERATION |
|---|---|---|---|---|---|---|---|---|
| $0 \leq Vbatt < Vb1$ | OFF | OFF | L | OFF | OFF | OFF | ON | DISABLE |
| $Vb1 \leq Vbatt < Vt1$ | OFF | OFF | L | OFF | OFF | OFF | ON | DISABLE |
| | ON | L | H | OFF | ON | OFF | OFF | ENABLE |
| | | H | | ON | OFF | OFF | ON | DISABLE |
| $Vt1 \leq Vbatt$ | OFF | OFF | H | OFF | OFF | ON | OFF | ENABLE |
| | ON | L | | OFF | ON | ON | OFF | ENABLE |
| | | H | | ON | OFF | OFF | ON | DISABLE |

FIG. 21

| BATTERY VOLTAGE Vbatt STATE | CPU STATE | CPU OUTPUT 1 | VOLTAGE DETECTION CIRCUIT OUTPUT | SW-C STATE | SW-A STATE | CONTACTLESS IC WIRELESS COMMUNICATION OPERATION |
|---|---|---|---|---|---|---|
| $0 \leq Vbatt < Vb1$ | OFF | OFF | L | OFF | ON | DISABLE |
| $Vb1 \leq Vbatt < Vt1$ | OFF | OFF | L | OFF | ON | DISABLE |
| | ON | L | H | OFF | ON | DISABLE |
| | | H | | ON | OFF | ENABLE |
| $Vt1 \leq Vbatt$ | OFF | OFF | H | ON | OFF | ENABLE |
| | ON | L | | | | |
| | | H | | | | |

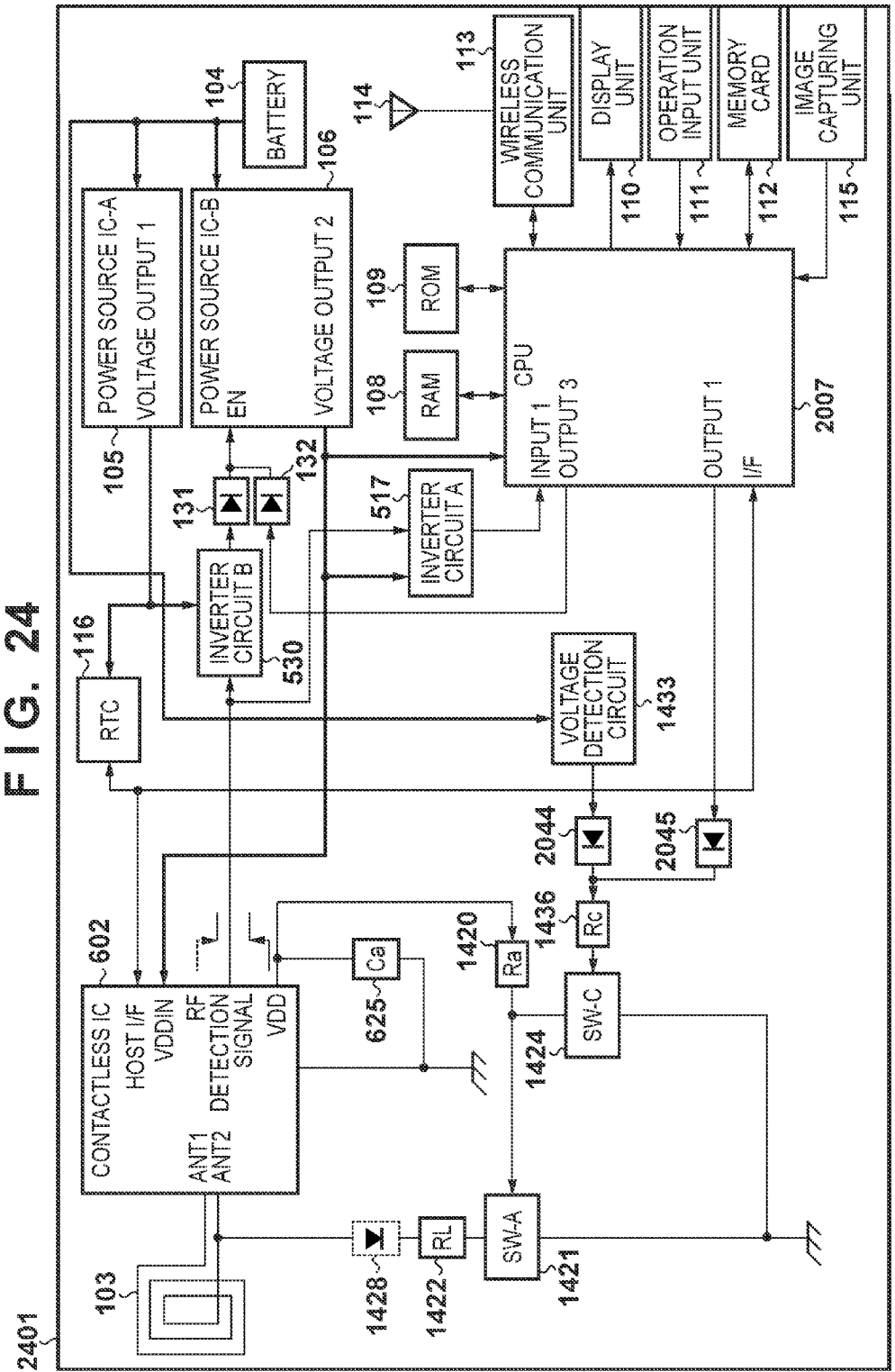
F I G. 24

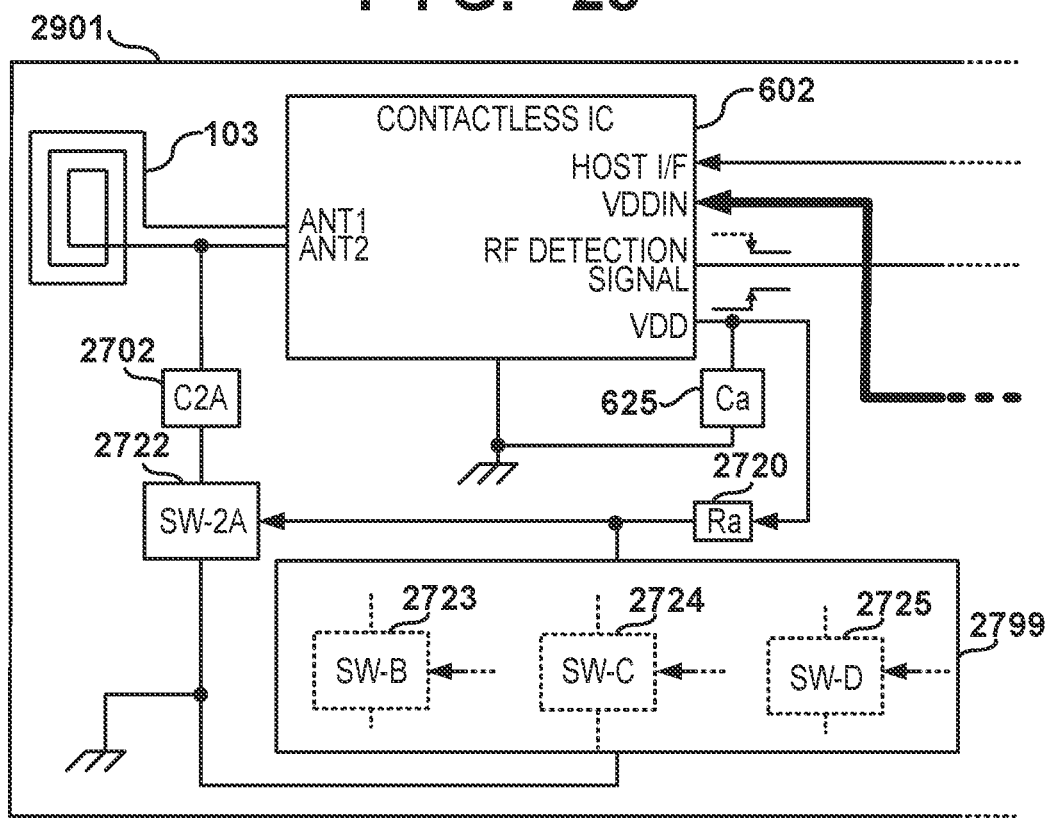
F I G. 28

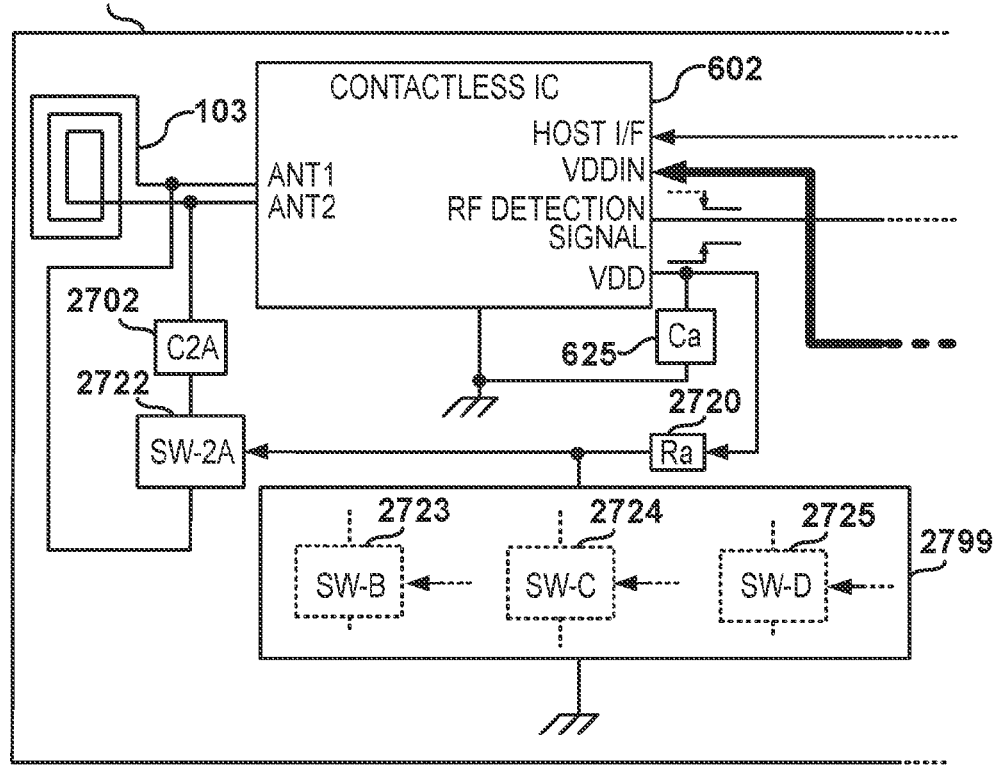
F I G. 30

F I G. 32
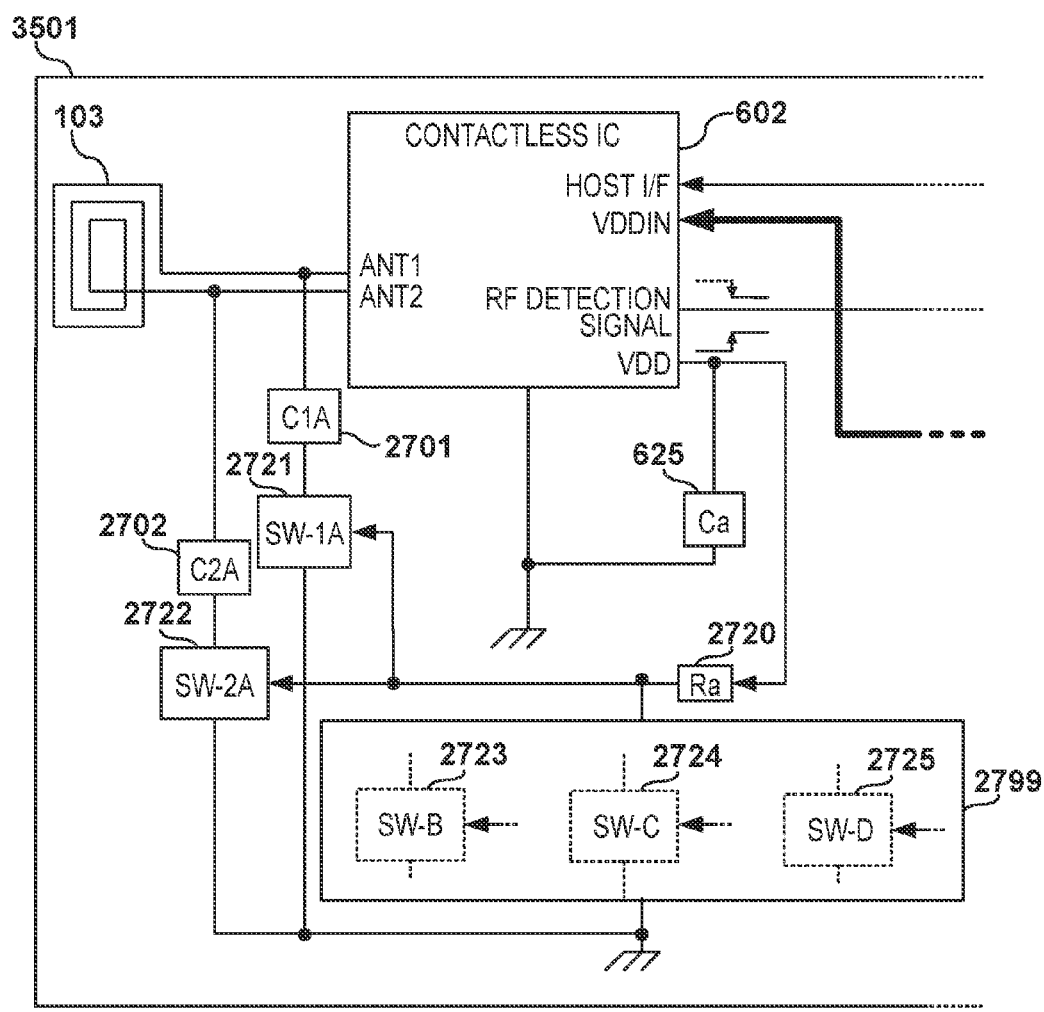

COMMUNICATION APPARATUS AND METHOD FOR CONTROLLING THE SAME

The present application is a continuation-in-part of U.S. patent application Ser. No. 14/643,373, filed on Mar. 10, 2015, which claims the priority benefit of Japanese Patent Application No. 2014-048071, filed on Mar. 11, 2014. The present application also claims the priority benefit of Japanese Patent Application No. 2015-082088, filed on Apr. 13, 2015. Each of the foregoing applications is hereby incorporated by reference herein in its entirety.

BACKGROUND OF THE INVENTION

Field of the Invention

The present invention relates to a communication apparatus, and a method for controlling the same.

Description of the Related Art

In recent years, wireless communication apparatuses that have a contactless IC reader/writer function have become widely used, and such wireless communication apparatuses can perform wireless communication using a contactless IC with another wireless communication apparatus that is equipped with a contactless IC. Also, wireless communication using a contactless IC is commonly used for exchanging pairing information for other types of wireless communication (for example, Wi-Fi), controlling the operations of a wireless communication apparatus, and the like.

The contactless IC can store data in an internal memory, and can perform reading operations in which data in the memory is returned in response to communication from the contactless IC reader/writer and writing operations in which data is stored in the memory by communication from the contactless IC reader/writer.

The contactless IC can perform wireless communication using only electromagnetic waves from the contactless IC reader/writer as power, and can be used without another power supply. Accordingly, even if the power source of a wireless communication apparatus that is equipped with a contactless IC is in an OFF state, the contactless IC reader/writer can perform reading operations or writing operations on the contactless IC, regardless of an operating state of the wireless communication apparatus.

The capability of responding regardless of the operating state of the wireless communication apparatus is an advantage as well as a disadvantage of the contactless IC. For example, there is a problem in that even in the case where the user does not desire wireless communication using the contactless IC, wireless communication is performed against the user's wishes. Also, for example, there may be a problem in the case where battery capacity for performing Wi-Fi communication is insufficient in a scenario in which pairing information is exchanged and Wi-Fi communication is started, triggered by wireless communication in which the contactless IC is used. In such a case, there is a possibility that, regardless of wireless communication that uses the contactless IC and serves as a trigger having been normally performed, the user will become confused because subsequent Wi-Fi communication does not start.

Japanese Patent Laid-Open No. 2008-92304 proposes a mobile terminal apparatus that sets the contactless IC function to an unusable state in the case where it is conceivable that the user is in a situation where he or she will not use the contactless IC module. This mobile terminal apparatus determines that a user is in a situation where he or she will not use the contactless IC module when the main body of the mobile terminal apparatus is tilted by a predetermined amount or greater, and sets the contactless IC function to an unusable state by stopping power supply to the contactless IC module.

Japanese Patent Laid-Open No. 2008-92304 is directed toward a contactless IC module that requires a separate power supply to electromagnetic waves from the contactless IC reader/writer, and discloses setting the contactless IC function to an unusable state by stopping this power supply. Therefore, the technology in Japanese Patent Laid-Open No. 2008-92304 cannot be applied to a contactless IC that can perform wireless communication using only electromagnetic waves from the contactless IC reader/writer as power.

SUMMARY OF THE INVENTION

The present invention has been made in view of such circumstances, and provides technology for controlling activation/deactivation of a wireless communication operation by a contactless IC that can perform wireless communication using, as a power, only electromagnetic waves from a contactless IC reader/writer.

According to an aspect of the present invention, there is provided a communication apparatus comprising: an antenna; a communication unit configured to be able to use external power that is generated by receiving a signal from an external apparatus via the antenna, thereby transmitting a response to the signal that is received from the external apparatus to the external apparatus; a deactivation unit configured to, in a case where the external power is generated by receiving the signal from the external apparatus via the antenna, deactivate supply of the external power from the antenna to the communication unit; and a control unit configured to perform control so as to interrupt deactivation of supply of the external power from the antenna to the communication unit by the deactivation unit.

According to another aspect of the present invention, there is provided a method for controlling a communication apparatus that includes: an antenna; a communication unit configured to be able to use external power that is generated by receiving a signal from an external apparatus via the antenna, thereby transmitting a response to the signal that is received from the external apparatus to the external apparatus; and a deactivation unit configured to, in a case where the external power is generated by receiving the signal from the external apparatus via the antenna, deactivate supply of the external power from the antenna to the communication unit, the control method comprising: a control step of performing control so as to interrupt deactivation of supply of the external power from the antenna to the communication unit by the deactivation unit.

Further features of the present invention will become apparent from the following description of exemplary embodiments with reference to the attached drawings.

BRIEF DESCRIPTION OF THE DRAWINGS

FIG. 2 is a table of truth values related to states of peripheral circuits of the contactless IC 102 of the wireless communication apparatus 101 according to the first embodiment and a wireless communication operation of the contactless IC 102.

FIG. 9 is a table of truth values related to states of peripheral circuits of the contactless IC 102 of the wireless communication apparatus 801 according to the second embodiment and the wireless communication operation of the contactless IC 102.

FIG. 15 is a table of truth values related to states of peripheral circuits of the contactless IC 102 of the wireless communication apparatus 1401 according to the third embodiment and the wireless communication operation of the contactless IC 102.

FIG. 21 is a table of truth values related to states of peripheral circuits of the contactless IC 102 of the wireless communication apparatus 2001 according to the fourth embodiment and the wireless communication operation of the contactless IC 102.

FIG. 24 is a block diagram showing a configuration example 3 of peripheral circuits of a contactless IC 602 of a wireless communication apparatus 2401 according to the fourth embodiment.

FIG. 28 is a block diagram showing a configuration example 3 of peripheral circuits of the contactless IC 602 of a wireless communication apparatus 2901 according to the fifth embodiment.

FIG. 30 is a block diagram showing a configuration example 3 of peripheral circuits of a contactless IC 602 of a wireless communication apparatus 3201 according to the sixth embodiment.

FIG. 32 is a block diagram showing a configuration example 3 of peripheral circuits of a contactless IC 602 of a wireless communication apparatus 3501 according to the seventh embodiment.

DESCRIPTION OF THE EMBODIMENTS

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

Also, sizes and shapes of components, relative positions thereof and the like that are illustrated as examples in each embodiment described below are to be appropriately modified depending on the configuration of the apparatus to which the present invention is applied or various conditions, and the present invention is not limited to these examples.

First Embodiment

The first embodiment will describe circuits and control methods for switching a wireless communication function of a contactless IC between enabled (usable) and disabled (unusable) in a wireless communication apparatus that is equipped with the contactless IC. Herein, four configuration examples (configuration examples 1 to 4) of circuits that correspond to functions of the contactless IC will be described in order. It is assumed that in the first embodiment, wireless communication of the contactless IC supports the international standard ISO/IEC 21481.

Configuration Example 1 of First Embodiment

Figure 1:
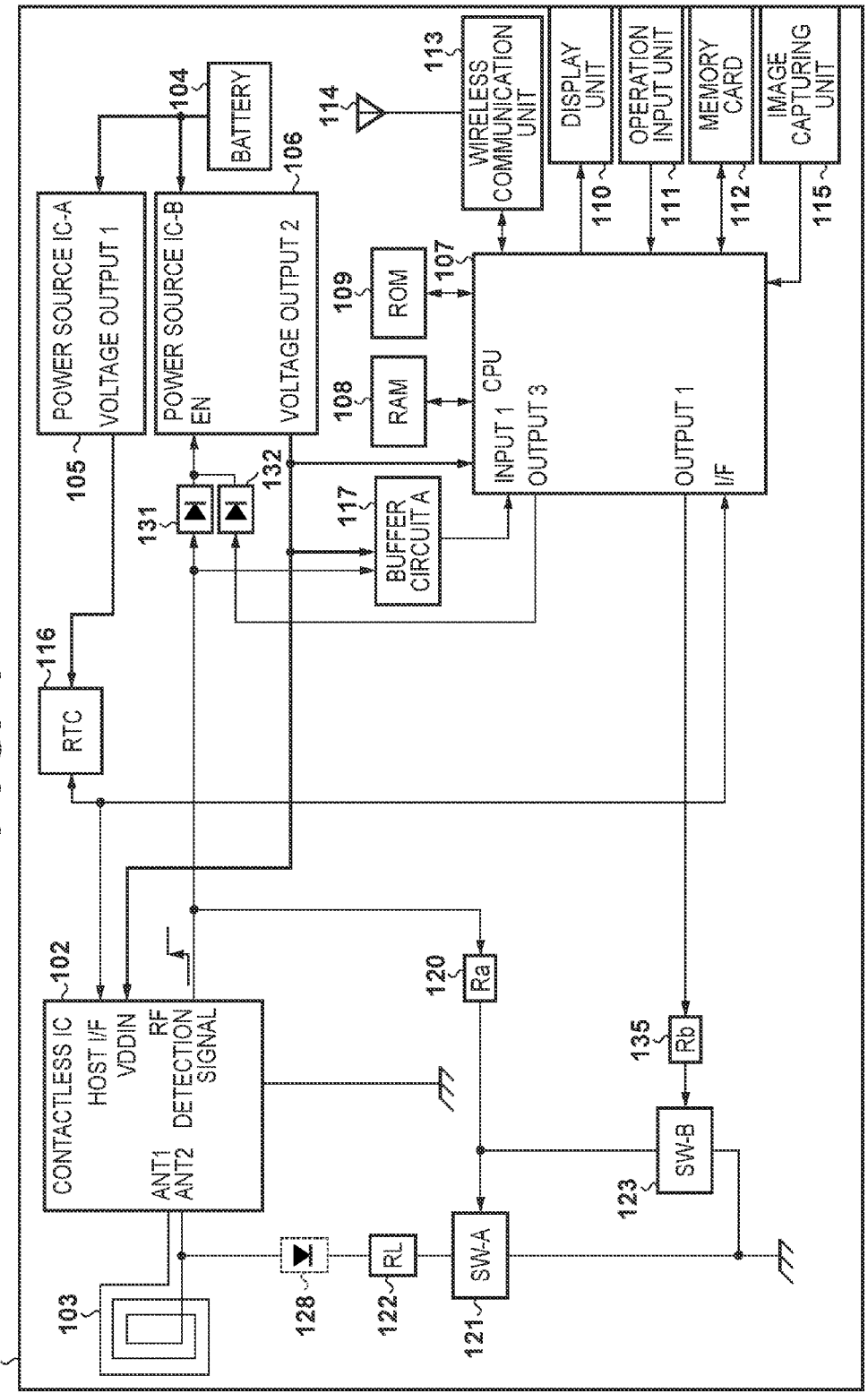
FIG. 1 is a block diagram showing a configuration example 1 of peripheral circuits of a contactless IC 102 of a wireless communication apparatus 101 according to a first embodiment.

FIG. 1 is a block diagram showing the configuration example 1 of peripheral circuits of a contactless IC 102 of a wireless communication apparatus 101 according to the first embodiment. In the block diagram that is used to describe the present embodiment, description of a power source connection to blocks that are not necessary for describing the present embodiment will be omitted.

Figure 26:
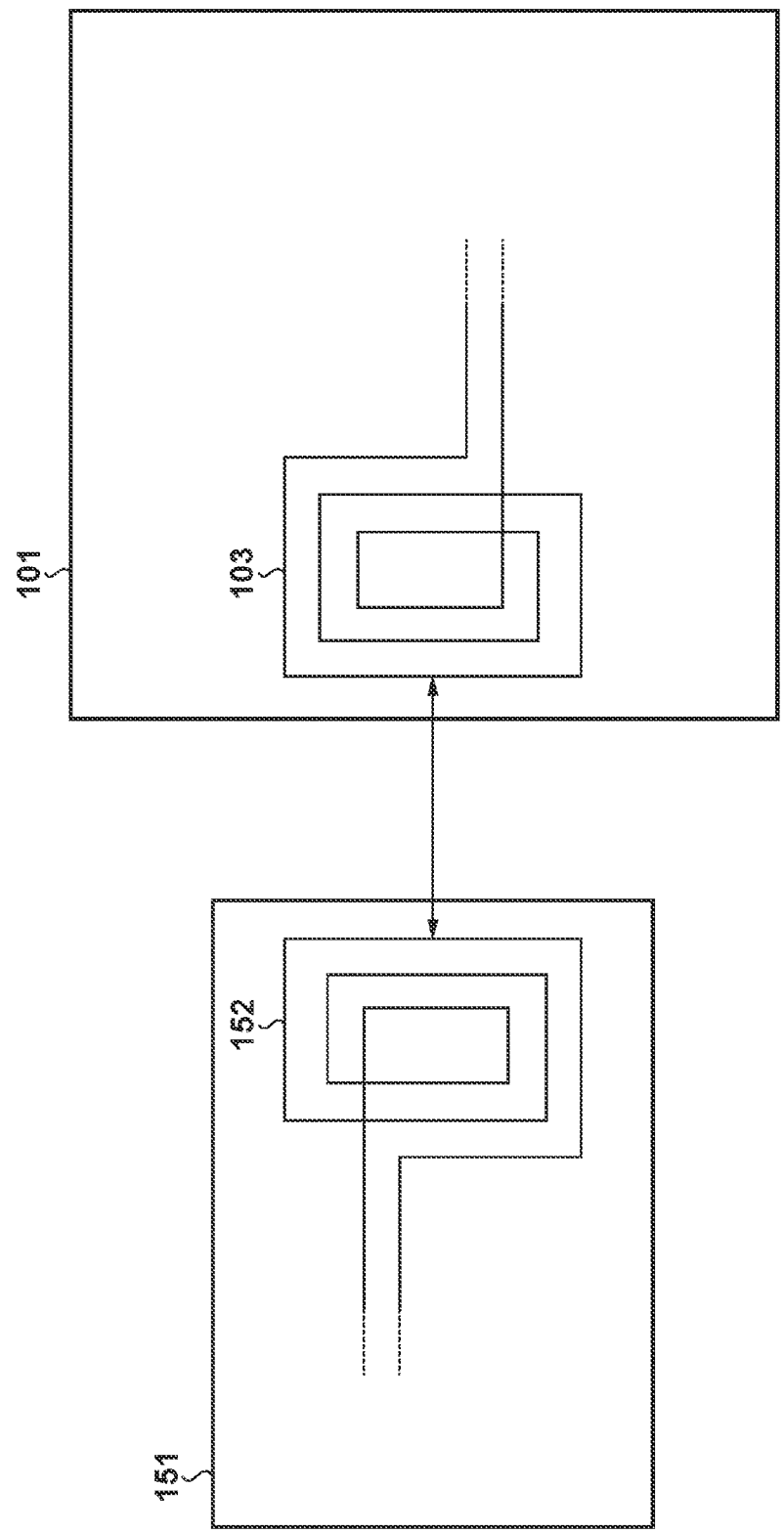
FIG. 26 is a block diagram showing the configuration of a wireless communication apparatus 151 that is equipped with a contactless IC reader/writer.

In FIG. 1, an antenna 103 is an antenna of the contactless IC 102. The contactless IC 102 can receive electromagnetic waves from a contactless IC reader/writer using the antenna 103, and perform wireless communication using only external power generated by the electromagnetic waves. In other words, the contactless IC 102 has a power supply function for generating power from the electromagnetic waves received from the antenna 103 and supplying the power for wireless communication, and can be used without another power supply. The contactless IC reader/writer is provided in a wireless communication apparatus 151 such as is shown in FIG. 26. In FIG. 26, an antenna 152 is an antenna of the contactless IC reader/writer, and communicates with the antenna 103 of the wireless communication apparatus 101. Because an internal block diagram of the wireless communication apparatus 151 is not necessary for description of the present embodiment, illustration and description thereof are omitted.

It is assumed that the contactless IC 102 according to the present embodiment has a function of outputting an RF detection signal upon receiving electromagnetic waves and communication from the outside. A power source VDDIN that is supplied to the contactless IC 102 inside the wireless communication apparatus 101 is a power source that is required in the case where a HOST I/F that is a wired interface is operated. In the case where the power source VDDIN is supplied, the contactless IC 102 and a later-described CPU 107 can perform communication via the HOST I/F, and writing/reading of data can be performed to/from the contactless IC 102. It should be noted that even in the case where the VDDIN is not supplied, the contactless IC 102 can perform wireless communication using only electromagnetic waves from the outside as power.

A battery 104 is a battery of the wireless communication apparatus 101. A power source IC-A 105 outputs a voltage regardless of the operations of the wireless communication apparatus 101 if the voltage of the battery 104 is in a range in which the power source IC-A 105 operates. A power source IC-B 106 outputs a voltage in accordance with a control signal from the outside.

The CPU 107 (central processing unit) performs overall control of the wireless communication apparatus 101. A RAM 108 (random access memory) is a memory that is used as a work area of the CPU 107. A ROM 109 (read only memory) is a memory that stores processing procedures for the CPU 107, and for example, is constituted by a rewritable non-volatile memory such as a flash memory.

A display unit 110 is constituted by, for example, an LCD (liquid crystal display), and displays video such as image data, operation information, and the like. An operation input unit 111 receives various operations for the wireless communication apparatus 101, and sends the operation information to the CPU 107. A memory card 112 can perform writing/reading of digital data.

A wireless communication unit 113 performs wireless communication, and an antenna 114 is an antenna for the wireless communication unit 113 to perform wireless communication. The wireless communication unit 113 supports a wireless standard, which is different from the contactless IC 102 and has a wider communication range. For example, the wireless communication unit 113 supports the WLAN standard IEEE 802.11. Moreover, communication parameters for establishing wireless communication via the wireless communication unit 113 can be shared with the external apparatus via the contactless IC 102. Specifically, the communication parameters for establishing wireless communication via the wireless communication unit 113 are written in a storage area of the contactless IC 102 in advance, and shared by the external apparatus reading them.

An image capturing unit 115 is constituted by an image sensor and an optical unit that is constituted by a lens and a drive system therefor. An RTC 116 (real time clock) is used to perform clocking. The RTC 116 can continue a backup clocking operation using the voltage output from the power source IC-A 105 even in the case where the main body of the wireless communication apparatus 101 is in the OFF state.

An Ra 120, an RL 122, and an Rb 135 are resistors, and an SW-A 121 and an SW-B 123 are switches. An input terminal for turning on/off the SW-A 121 (a first switch) is connected to a terminal for outputting an RF detection signal (a signal output terminal) via the Ra 120. An input terminal for turning on/off the SW-B 123 (a second switch) is connected to an "output 1" of the CPU 107 (a control output terminal) via the Rb 135. The SW-A 121 and the SW-B 123 can be elements that are in a conduction state when on, and that are in a high impedance state when off, such as an NPN transistor, an NchMOSFET, and the like.

A diode 128 is a diode for rectification. In the case where the SW-A 121 is an NPN transistor, the SW-A 121 itself performs the rectification operation, and therefore the diode 128 is not required, but in the case where the SW-A 121 is an NchMOSFET, the diode 128 for rectification is required. In the present embodiment, because description will be given assuming the SW-A 121 is an NPN transistor, detailed description of the diode 128 will be omitted.

A buffer circuit A 117 buffers an RF detection signal output from the contactless IC 102 and then sends the RF detection signal to the CPU 107 only when the voltage is output from the power source IC-B 106. Diodes 131 and 132 are arranged in order to perform OR input of signals for controlling the power source IC-B 106 that are sent from both the contactless IC 102 and the CPU 107.

Next, operations of peripheral circuits of the contactless IC 102 will be described. In the description below, it is assumed that an OFF state of the main body of the wireless communication apparatus 101 refers to a state in which the CPU 107 does not perform control due to the voltage not being output from the power source IC-B 106 and the CPU 107 being in the OFF state. Also, it is assumed that an ON state of the main body of the wireless communication apparatus 101 refers to a state in which the CPU 107 performs control due to the voltage being output from the power source IC-B 106 and the CPU 107 being in the ON state.

First, operations performed in a case in which the contactless IC 102 receives electromagnetic waves and communication from the contactless IC reader/writer in the case where the main body of the wireless communication apparatus 101 is OFF will be described.

The contactless IC 102 outputs a positive logic RF detection signal upon receiving electromagnetic waves and communication from the outside. The RF detection signal drives the SW-A 121 via the Ra 120, and the SW-A 121 is turned on. The SW-A 121 is connected to the antenna 103 of the contactless IC 102 via the RL 122, and the antenna 103 is shunted to ground via the RL 122 and the SW-A 121 if the SW-A 121 is ON.

When the antenna 103 is shunted to ground, the electric current generated in the antenna 103 due to the electromagnetic waves from the outside flows to ground side. As a result of the electric current generated in the antenna 103 flowing to ground side, modulation/demodulation for wireless communication in the contactless IC 102 is prevented, and the power required to perform wireless communication cannot be maintained, as a result of which the wireless communication operation is stopped. In order to reliably prevent modulation/demodulation for wireless communication, it is desirable that the RL 122 and the SW-A 121 are connected to an antenna terminal on the side to which the load that is used to perform wireless communication load modulation in the contactless IC 102 is connected so as to extract the electric current of the antenna 103.

Upon receiving electromagnetic waves and communication from the outside, the contactless IC 102 outputs an RF detection signal, and thus drives the power source IC-B 106 using the RF detection signal. Thereafter, the CPU 107 starts operating with the voltage output from the power source IC-B 106. However, as described above, if the contactless IC 102 cannot maintain the power required to perform wireless communication and the wireless communication operation stops, the contactless IC 102 stops output of the RF detection signal, and therefore the power source IC-B 106 is no longer driven by the contactless IC 102.

Next, operations performed in the case in which the contactless IC 102 receives electromagnetic waves and communication from the contactless IC reader/writer in the case where the main body of the wireless communication apparatus 101 is ON will be described.

In the case where the main body of the wireless communication apparatus 101 is ON, the wireless communication apparatus 101 can drive the SW-B 123 using a signal from the CPU 107 (an output 1). If the SW-B 123 is driven by the signal from the CPU 107 and the SW-B 123 is turned on, the SW-B 123 shunts the signal that drives the SW-A 121 to ground, as a result of which the SW-A 121 is turned off.

In the case where the SW-B 123 is turned on under the control of the CPU 107, the contactless IC 102 outputs the RF detection signal upon receiving electromagnetic waves and communication from the outside, but the RF detection signal is shunted to ground by the SW-B 123 via the Ra 120. Accordingly, the SW-A 121 is not driven by the RF detection signal, and the SW-A 121 is turned off. If the SW-A 121 is in the OFF state, the contactless IC 102 can perform wireless communication.

The operations of the configuration example 1 of the first embodiment are summarized as follows.

In the case where the main body of the wireless communication apparatus 101 is OFF, the SW-A 121 is turned on when the contactless IC receives electromagnetic waves and communication from the outside, and the antenna 103 is shunted to ground via the SW-A 121, and therefore the wireless communication operation of the contactless IC 102 is deactivated.

In the case where the main body of the wireless communication apparatus 101 is ON, the wireless communication apparatus 101 can perform control to turn on/off the SW-B 123 using a signal from the CPU 107 (the output 1). Because the SW-A 121 is OFF even if the contactless IC receives electromagnetic waves and communication from the outside in the case where the SW-B 123 is ON, the wireless communication operation of the contactless IC 102 is activated. When the contactless IC receives electromagnetic waves and communication from the outside in the case where the SW-B 123 is OFF, the SW-A 121 is turned on, and the wireless communication operation of the contactless IC 102 is deactivated.

Control for switching the wireless communication of the contactless IC 102 between enabled and disabled has been described above with regard to the respective cases in which the main body of the wireless communication apparatus 101 is OFF and ON.

FIG. 2 is a table of truth values related to states of peripheral circuits of the contactless IC 102 of the wireless communication apparatus 101 according to the first embodiment and the wireless communication operation of the contactless IC 102. In the description below, activation and deactivation of the wireless communication operation of the contactless IC 102 may be respectively described as "enabling" and "disabling" the wireless communication operation.

If the operation minimum voltage of the power source IC-B 106 is Vb1, the power source IC-B 106 cannot operate in the case where a battery voltage Vbatt of the battery 104 is $0 \leq Vbatt < Vb1$, and therefore the CPU 107 is OFF. If the CPU 107 is OFF, the wireless communication operation of the contactless IC 102 is only "disabled".

In the case where the battery voltage Vbatt of the battery 104 is $Vb1 \leq Vbatt$, the power source IC-B 106 is operable, and therefore the CPU 107 can be in either the ON or the OFF state. Although if the CPU 107 is OFF, the wireless communication operation of the contactless IC 102 is "disabled", if the CPU 107 is ON, the wireless communication operation of the contactless IC 102 can be selectively "disabled" or "enabled" under the control of the CPU 107.

Figure 3:
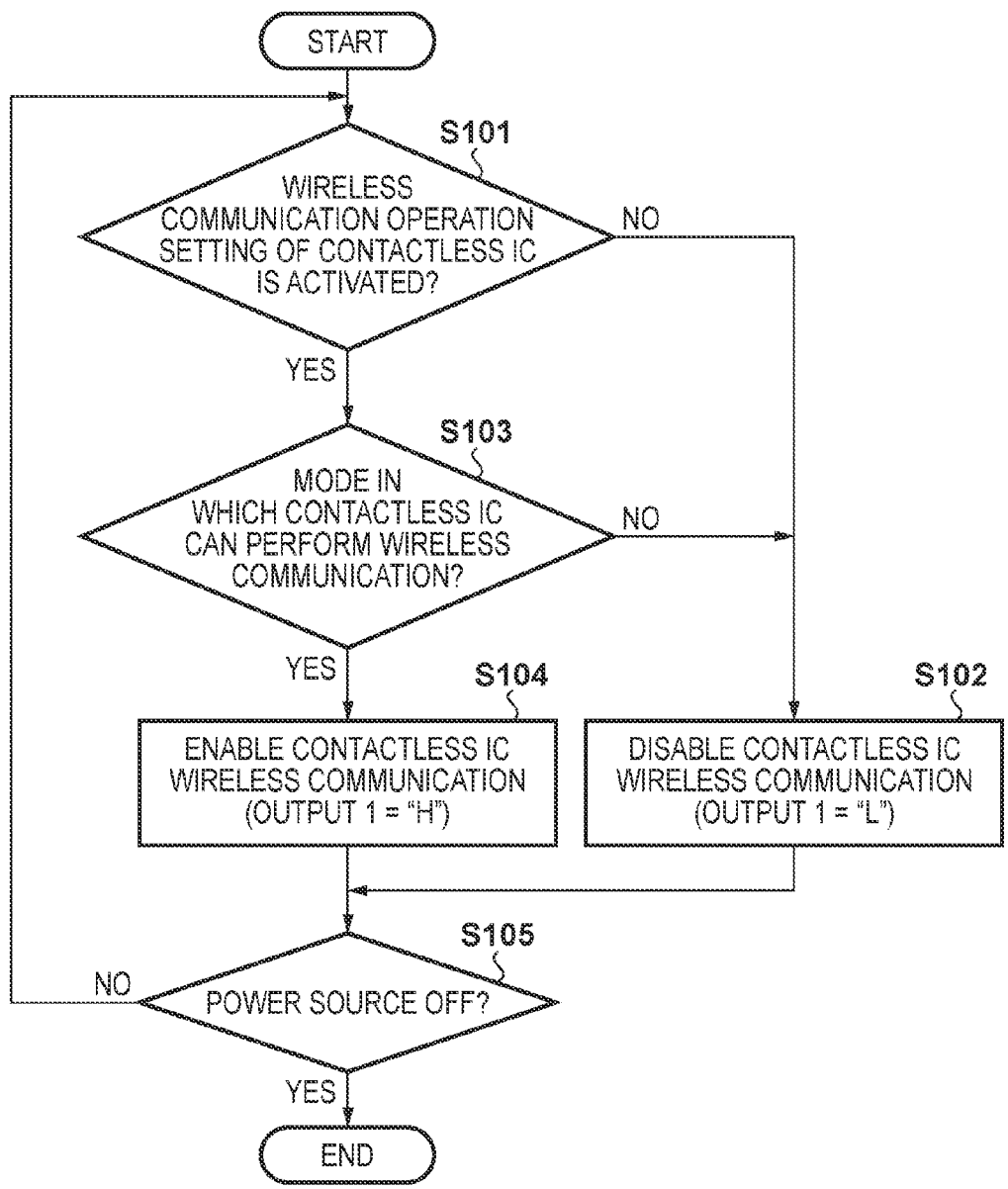
FIG. 3 is a flowchart showing a procedure for controlling the contactless IC 102 of the wireless communication apparatus 101 according to the first embodiment.

FIG. 3 is a flowchart showing the procedure for controlling the contactless IC 102 of the wireless communication apparatus 101 according to the first embodiment. Processing of each step in this flowchart is executed by the CPU 107, unless otherwise stated.

Figure 4:
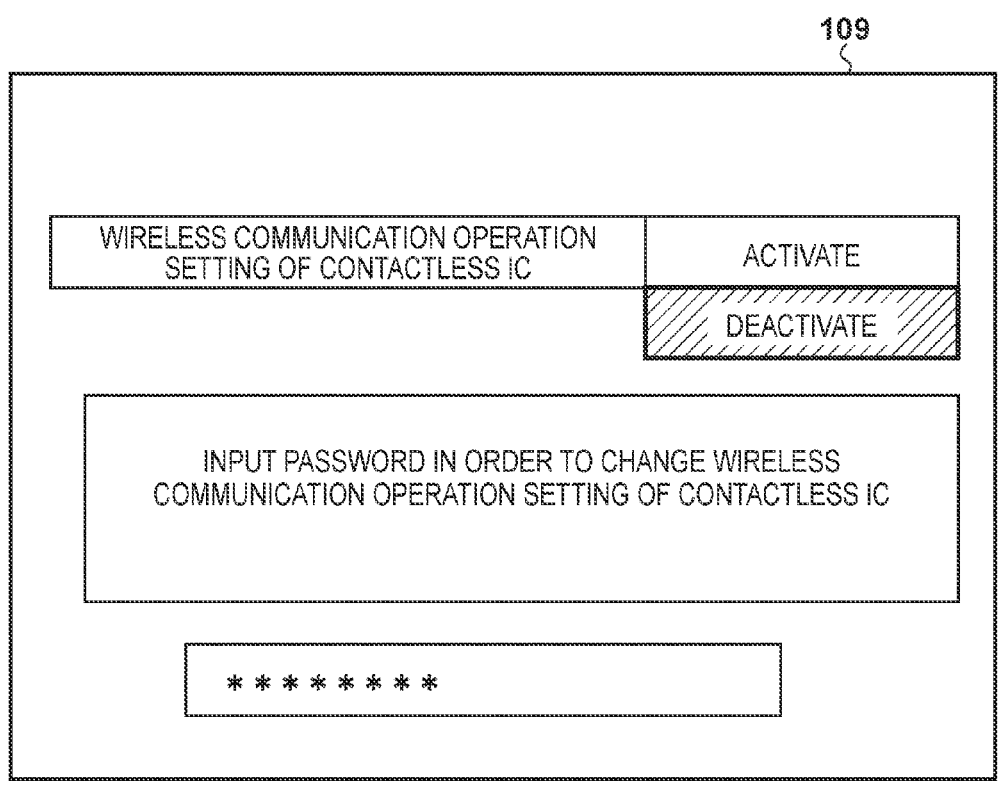
FIG. 4 is a diagram showing an example of a menu for setting operations of the contactless IC 102 of the wireless communication apparatus 101 according to the first embodiment.

The CPU 107 determines in step S101 whether or not the wireless communication operation setting of the contactless IC 102 is activated. Activation/deactivation of the wireless communication operation setting can be switched by a user using the display unit 110 and the operation input unit 111. If a user operates the operation input unit 111 so as to give an instruction to display a menu for setting operations of the contactless IC 102, the CPU 107 displays an operation setting menu such as is shown in FIG. 4 on the display unit 110, for example. The user selects "activate" or "deactivate" by operating the operation input unit 111 in the operation setting menu to switch the wireless communication operation setting between activation and deactivation. The switching of activation/deactivation may be protected by a lock function using a password.

In the case where it is determined in step S101 that the wireless communication operation setting is not activated, in step S102, the CPU 107 controls the output 1 to "L" so as to turn off the SW-B 123, and thereby causes the contactless IC 102 to be "disabled".

In the case where it is determined in step S101 that the wireless communication operation setting is activated, the CPU 107 determines in step S103 whether or not the operation mode of the CPU 107 is a mode in which the contactless IC 102 can perform wireless communication. The mode in which the contactless IC 102 cannot perform wireless communication is a mode in which the processing load of the CPU 107 is too high to process communication using the contactless IC 102 such as, for example, when the wireless communication apparatus 101 controls the image capturing unit 115 to capture a still image or a moving image. In other words, in step S103, conditional branching is performed in accordance with whether or not the processing load of the CPU 107 is greater than or equal to a threshold.

In the case where it is determined in step S103 that the operation mode of the CPU 107 is a mode in which the contactless IC 102 cannot perform wireless communication, in step S102, the CPU 107 controls the output 1 to "L" to turn off the SW-B 123, and thereby causes the contactless IC 102 to be "disabled".

In the case where it is determined in step S103 the operation mode of the CPU 107 is a mode in which the contactless IC 102 can perform wireless communication, in step S104, the CPU 107 controls the output 1 to "H" to turn on the SW-B 123, and thereby causes the contactless IC 102 to be "enabled".

The CPU 107 determines in step S105 whether or not an operation for turning off the power source of the wireless communication apparatus 101 has been performed using the operation input unit 111. If the operation for turning off the power source has not been performed, the processing returns to step S101. In the case where the operation for turning off the power source has been performed, the CPU 107 ends the processing of this flowchart.

In this manner, in the present embodiment, in the case where the CPU 107 is ON, the wireless communication operation of the contactless IC 102 can be set to either "disabled" or "enabled" depending on the wireless communication operation setting of the contactless IC 102 (step S101). If the wireless communication operation setting of the contactless IC 102 is stored in the ROM 109, when the wireless communication apparatus 101 is turned on, the CPU 107 can read out the wireless communication operation setting of the contactless IC 102 stored in the ROM 109, and control the wireless communication operation of the contactless IC 102.

Configuration Example 2 of First Embodiment

Figure 5:
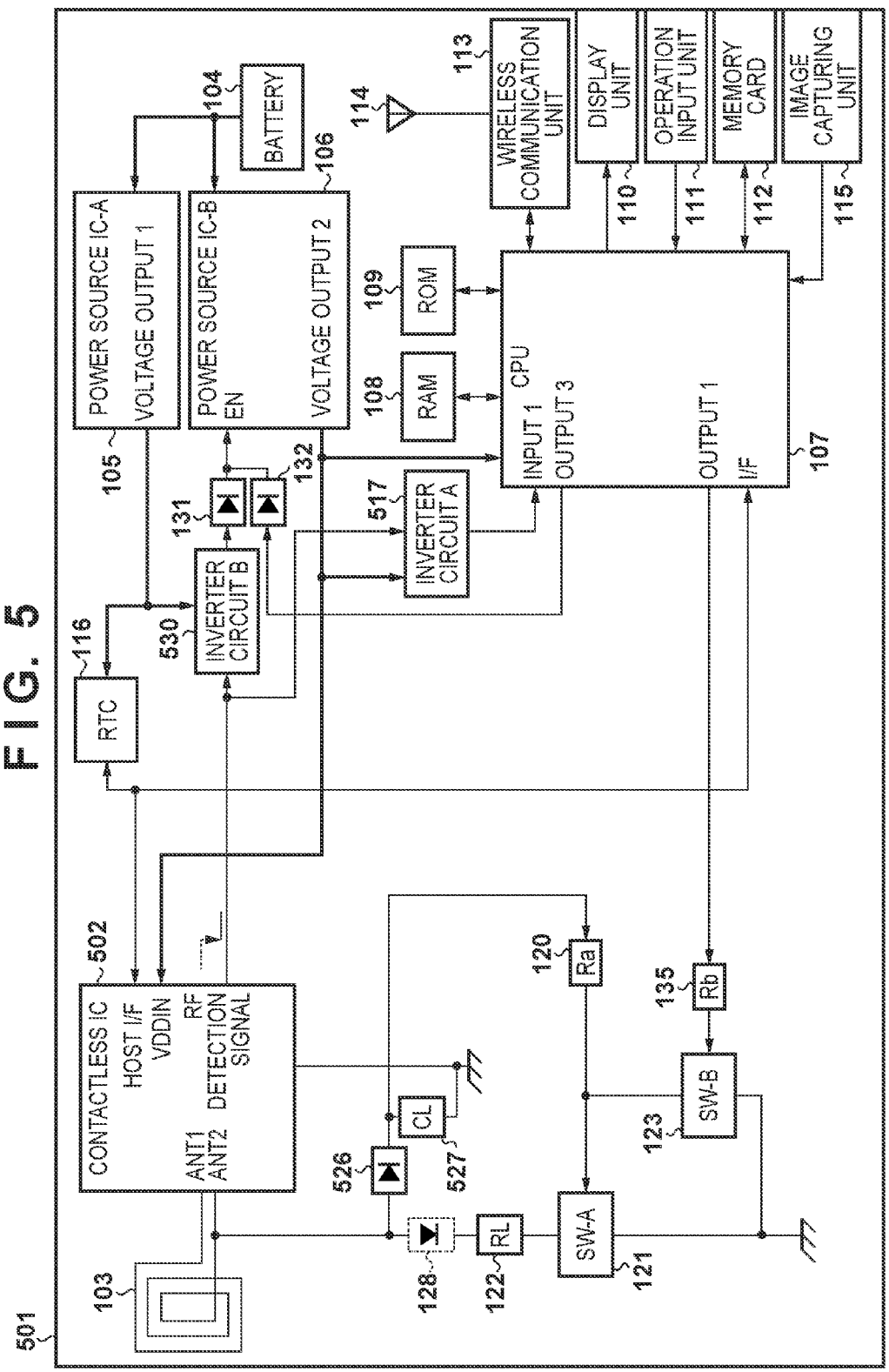
FIG. 5 is a block diagram showing a configuration example 2 of peripheral circuits of a contactless IC 502 of the wireless communication apparatus 501 according to the first embodiment.

FIG. 5 is a block diagram showing the configuration example 2 of peripheral circuits of a contactless IC 502 of a wireless communication apparatus 501 according to the first embodiment. In FIG. 5, the same reference numerals are given to constituent elements that are the same as or similar to those in the configuration example 1 of FIG. 1. Hereinafter, differences from the configuration example 1 will be mainly described.

The function of the contactless IC 502 is different from the function of the contactless IC 102 in FIG. 1. The contactless IC 102 of FIG. 1 outputs a positive logic RF detection signal upon receiving electromagnetic waves and communication from the outside, whereas the contactless IC 502 of FIG. 5 outputs a negative logic RF detection signal upon receiving electromagnetic waves and communication from the outside. Similarly to the contactless IC 102, the contactless IC 502 can receive electromagnetic waves from the contactless IC reader/writer using the antenna 103, and perform wireless communication using only electromagnetic waves as power. In other words, the contactless IC 502 has a power supply function for generating power from the electromagnetic waves received from the antenna 103 and supplying power for wireless communication, and can be used without another power supply.

An inverter circuit A 517 inverts the signal logic to match the function of the contactless IC 502 and the peripheral circuits. Other functions of the inverter circuit A 517 are similar to the buffer circuit A 117 in FIG. 1. An inverter circuit B 530 inverts the signal logic to match the function of the contactless IC 502 and the peripheral circuits.

An input terminal for turning on/off the SW-A 121 (a first switch) is connected to the antenna 103 via the Ra 120 and the diode 526. An input terminal for turning on/off the SW-B 123 (a second switch) is connected to an "output 1" of the CPU 107 (a control output terminal) via the Rb 135.

When the contactless IC 502 receives electromagnetic waves from the outside, the electric current is generated in the antenna 103, and the electric current is rectified by the diode 526. The rectified electric current drives the SW-A 121 via the Ra 120, and the SW-A 121 is turned on. A CL 527 is a capacitor, and is disposed for compensating driving of the SW-A 121. The SW-A 121 is connected to the antenna 103 of the contactless IC 502 via the RL 122, and the antenna 103 is shunted to ground via the RL 122 and the SW-A 121 if the SW-A 121 is ON.

When the antenna 103 is shunted to ground, the electric current generated in the antenna 103 due to the electromagnetic waves from the outside flows to the ground side. As a result of the electric current generated in the antenna 103 flowing in the ground side, modulation/demodulation for wireless communication in the contactless IC 502 is prevented, and the power required to perform wireless communication cannot be maintained, as a result of which the wireless communication operation is stopped. In order to reliably prevent modulation/demodulation for wireless communication, it is desirable that the RL 122 and the SW-A 121 are connected to an antenna terminal on the side to which the load that is used to perform wireless communication load modulation in the contactless IC 502 is connected so as to extract the electric current of the antenna 103.

The configuration example 2 of FIG. 5 and the configuration example 1 of FIG. 1 are the same in that they have the SW-A 121 and the SW-B 123. Therefore, also in the configuration example 2, the wireless communication operation of the contactless IC 502 can be selectively "disabled" or "enabled" under the control of the CPU 107. The table of truth values in FIG. 2, the flowchart in FIG. 3, and the operation setting menu in FIG. 4 can also be applied to the configuration example 2.

Configuration Example 3 of First Embodiment

Figure 6:
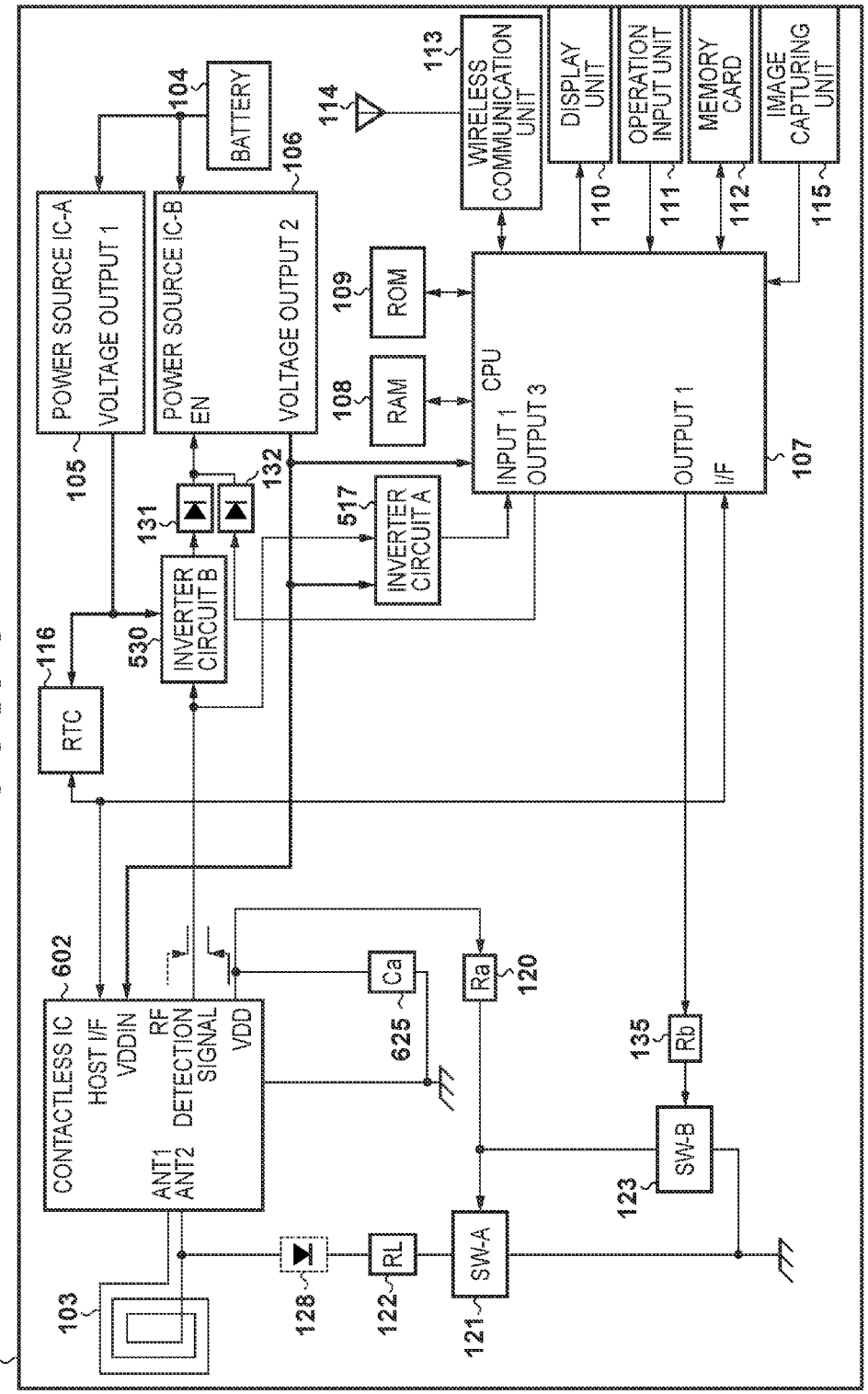
FIG. 6 is a block diagram showing a configuration example 3 of peripheral circuits of a contactless IC 602 of a wireless communication apparatus 601 according to the first embodiment.

FIG. 6 is a block diagram showing the configuration example 3 of peripheral circuits of a contactless IC 602 of a wireless communication apparatus 601 according to the first embodiment. In FIG. 6, the same reference numerals are given to constituent elements that are the same as or similar to those in the configuration example 1 of FIG. 1 and the configuration example 2 of FIG. 5. Hereinafter, differences from the configuration examples 1 and 2 will be mainly described.

The function of the contactless IC 602 is different from the function of the contactless IC 502 in FIG. 5. Upon receiving electromagnetic waves from the outside, the contactless IC 502 in FIG. 5 internally uses the electromagnetic waves as power for operating wireless communication. In contrast, upon receiving electromagnetic waves from the outside, the contactless IC 602 of FIG. 6 outputs a voltage to a VDD terminal, and accumulates the voltage required to perform wireless communication in an operation compensate capacitor Ca 625 to perform wireless communication. Similarly to the contactless IC 502, the contactless IC 602 can receive electromagnetic waves from the contactless IC reader/writer using the antenna 103, and perform wireless communication using only electromagnetic waves as power. In other words, the contactless IC 602 has a power supply function for generating power from the electromagnetic waves received from the antenna 103 and supplying the power for wireless communication, and can be used without another power supply.

An input terminal for turning on/off the SW-A 121 (a first switch) is connected to the VDD terminal (a power output terminal) via the Ra 120. An input terminal for turning on/off the SW-B 123 (a second switch) is connected to an "output 1" of the CPU 107 (a control output terminal) via the Rb 135.

The contactless IC 602 outputs a voltage to the VDD terminal upon receiving electromagnetic waves and communication from the outside. The signal generated by the voltage that is output to the VDD terminal drives the SW-A 121 via the Ra 120, and the SW-A 121 is turned on. The SW-A 121 is connected to the antenna 103 for the contactless IC 602 via the RL 122, and the antenna 103 is shunted to ground via the RL 122 and the SW-A 121 if the SW-A 121 is ON.

When the antenna 103 is shunted to ground, the electric current generated in the antenna 103 due to the electromagnetic waves from the outside flows to the ground side. As a result of the electric current generated in the antenna 103 flowing in the ground side, modulation/demodulation for wireless communication in the contactless IC 602 is prevented, and the power required to perform wireless communication cannot be maintained, as a result of which the wireless communication operation is stopped. In order to reliably prevent modulation/demodulation for wireless communication, it is desirable that the RL 122 and the SW-A 121 are connected to an antenna terminal on the side to which the load that is used to perform wireless communication load modulation in the contactless IC 602 is connected so as to extract the electric current of the antenna 103.

The configuration example 3 of FIG. 6 and the configuration example 1 of FIG. 1 are the same in that they have the SW-A 121 and the SW-B 123. Therefore, also in the configuration example 3, the wireless communication operation of the contactless IC 602 can be selectively "disabled" or "enabled" under the control of the CPU 107. The table of truth values in FIG. 2, the flowchart in FIG. 3, and the operation setting menu in FIG. 4 can also be applied to the configuration example 3.

Configuration Example 4 of First Embodiment

Figure 7:
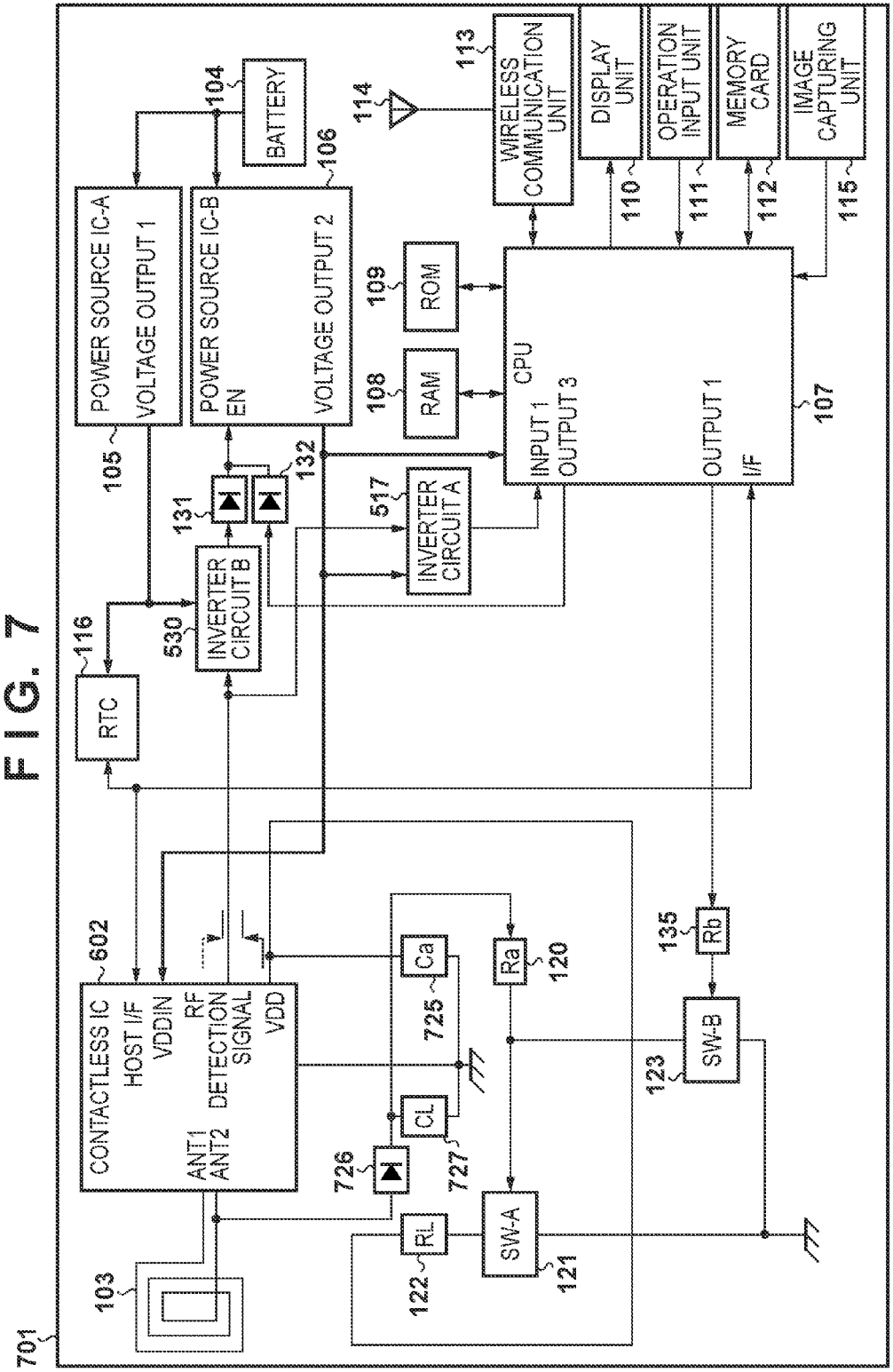
FIG. 7 is a block diagram showing a configuration example 4 of peripheral circuits of a contactless IC 602 of a wireless communication apparatus 701 according to the first embodiment.

FIG. 7 is a block diagram showing the configuration example 4 of peripheral circuits of a contactless IC 602 of a wireless communication apparatus 701 according to the first embodiment. In FIG. 7, the same reference numerals are given to constituent elements that are the same as or similar to those in the configuration example 1 of FIG. 1, the configuration example 2 of FIG. 5, and the configuration example 3 of FIG. 6. Hereinafter, differences from the configuration examples 1, 2, and 3 will be mainly described.

An input terminal for turning on/off the SW-A 121 (a first switch) is connected to the antenna 103 via the Ra 120 and a diode 726. An input terminal for turning on/off the SW-B 123 (a second switch) is connected to an "output 1" of the CPU 107 (a control output terminal) via the Rb 135.

When the contactless IC 602 receives electromagnetic waves from the outside, the electric current is generated in the antenna 103, and the electric current is rectified by the diode 726. The rectified electric current drives the SW-A 121 via the Ra 120, and the SW-A 121 is turned on. A CL 727 is the capacitor, and is disposed for compensating driving of the SW-A 121. The SW-A 121 is connected to the VDD terminal of the contactless IC 602 via the RL 122, and if the SW-A 121 is ON, the VDD terminal of the contactless IC 602 is shunted to ground via the RL 122 and the SW-A 121.

If the VDD terminal of the contactless IC 602 is shunted to ground, the voltage required to perform wireless communication cannot be accumulated in the VDD terminal of the contactless IC 602 due to the electromagnetic waves from the outside, and the power required to perform wireless communication cannot be maintained, as a result of which the wireless communication operation is stopped.

The configuration example 4 of FIG. 7 and the configuration example 1 of FIG. 1 are the same in that they have the SW-A 121 and the SW-B 123. Therefore, also in the configuration example 4, the wireless communication operation of the contactless IC 602 can be selectively "disabled" or "enabled" under the control of the CPU 107. The table of truth values in FIG. 2, the flowchart in FIG. 3, and the operation setting menu in FIG. 4 can also be applied to the configuration example 4.

The four configuration examples of the first embodiment have been described above. The configuration of the first embodiment is as follows when described in general terms. The contactless IC and the peripheral circuits configure a closed loop circuit such that in the case of receiving electromagnetic waves and communication from the outside, the wireless communication operation of the contactless IC is deactivated using the electromagnetic waves and communication as a trigger. Moreover, the peripheral circuits further include a configuration for releasing the closed loop circuit. In the first embodiment, release of the closed loop circuit is controlled by the output of the CPU.

Second Embodiment

The first embodiment has described a configuration in which in the case where the CPU of the wireless communication apparatus is ON, the wireless communication operation of the contactless IC can be selectively "disabled" or "enabled" under the control of the CPU.

The second embodiment will describe a configuration in which even in the case where the CPU of the wireless communication apparatus is OFF, the wireless communication operation of the contactless IC can be selectively "disabled" or "enabled" by a state holding circuit, in addition to the control described in the first embodiment.

Herein, similarly to the first embodiment, four configuration examples (configuration examples 1 to 4) of circuits that correspond to functions of a contactless IC will be described in order. It is assumed that in the second embodiment, wireless communication of the contactless IC supports the international standard ISO/IEC 21481.

Configuration Example 1 of Second Embodiment

Figure 8:
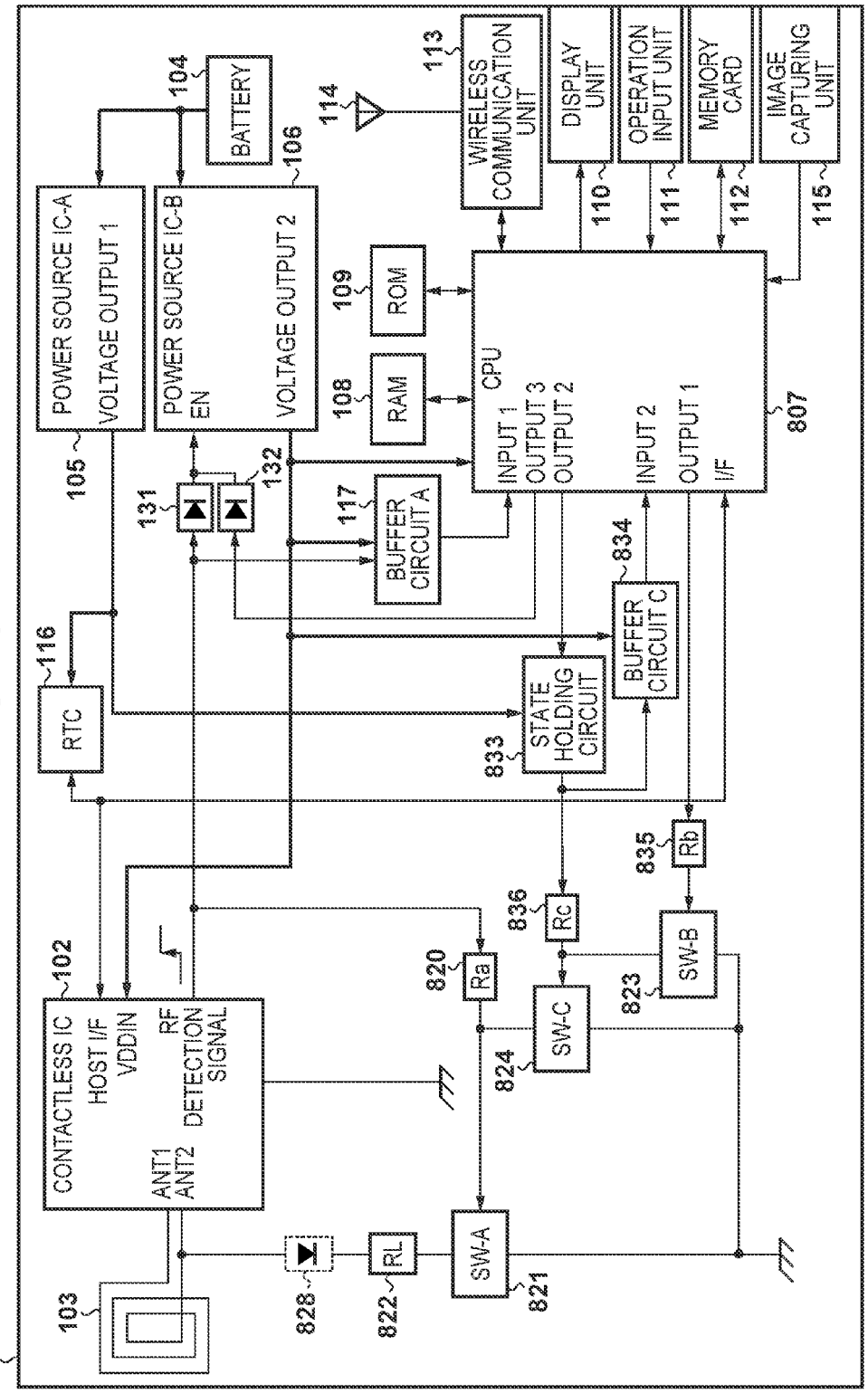
FIG. 8 is a block diagram showing a configuration example 1 of peripheral circuits of a contactless IC 102 of a wireless communication apparatus 801 according to a second embodiment.

FIG. 8 is a block diagram showing a configuration example 1 of peripheral circuits of a contactless IC 102 of a wireless communication apparatus 801 according to the second embodiment. In FIG. 8, the same reference numerals are given to constituent elements that are the same as or similar to those in the configuration example 1 of the first embodiment (FIG. 1). Hereinafter, differences from the configuration example 1 of the first embodiment will be mainly described.

An Ra 820, an RL 822, an Rb 835, and an Rc 836 are resistors, and an SW-A 821, an SW-B 823, and an SW-C 824 are switches. An input terminal for turning on/off the SW-A 821 (a first switch) is connected to a terminal for outputting an RF detection signal (a signal output terminal) via the Ra 820. An input terminal for turning on/off the SW-B 823 (a second switch) is connected to an "output 1" of the CPU 807 (a first control output terminal) via the Rb 835. An input terminal for turning on/off the SW-C 824 (a third switch) is connected to a state holding circuit 833 via the Rc 836. The SW-A 821, the SW-B 823, and the SW-C 824 can be elements that are in a conduction state when on, and that are in a high impedance state when off, such as an NPN transistor, an NchMOSFET, and the like.

A diode 828 is a diode for rectification. In the case where the SW-A 821 is an NPN transistor, the SW-A 821 itself performs the rectification operation, and therefore the diode 828 is not required, but in the case where the SW-A 821 is an NchMOSFET, the diode 828 for rectification is required. In the present embodiment, because description is given assuming the SW-A 821 is an NPN transistor, detailed description of the diode 828 will be omitted.

The state holding circuit 833 can perform switching of the internal state depending on a control signal (a second control signal) from an "output 2" of the CPU 807 (a second control output terminal), and perform switching of a signal output state in accordance with the internal state. It should be noted that the control signal from the "output 2" can be switched in accordance with a user operation, or the operating state of the wireless communication apparatus 801. The state holding circuit 833 can be either a volatile circuit such as a flip-flop or an SRAM, or a non-volatile circuit in which an EEPROM or FRAM (registered trademark) element is used. The power source of the state holding circuit 833 is a power source IC-A 105. The power source IC-A 105 outputs a voltage regardless of the operations of the wireless communication apparatus 801 if the voltage of the battery 104 is in a range in which the power source IC-A 105 operates, and therefore the output state of the state holding circuit 833 is maintained by the voltage output from the power source IC-A 105.

A buffer circuit C 834 buffers a signal output from the state holding circuit 833 and sends the signal to the CPU 807 only when the voltage is output from the power source IC-B 106.

Next, operations of peripheral circuits of the contactless IC 102 will be described. In the description below, it is assumed that the OFF state of the main body of the wireless communication apparatus 801 refers to a state in which the CPU 807 does not perform control due to the voltage not being output from the power source IC-B 106 and the CPU 807 being in the OFF state. Also, it is assumed that an ON state of the main body of the wireless communication apparatus 801 refers to a state in which the CPU 807 performs control due to the voltage being output from the power source IC-B 106 and the CPU 807 being in the ON state.

First, operations performed in a case in which the contactless IC 102 receives electromagnetic waves and communication from the contactless IC reader/writer in the case where the main body of the wireless communication apparatus 801 is OFF and the output from the state holding circuit 833 is "L" will be described.

The contactless IC 102 outputs a positive logic RF detection signal upon receiving electromagnetic waves and communication from the outside. The RF detection signal drives the SW-A 821 via the Ra 820, and the SW-A 821 is turned on. The SW-A 821 is connected to the antenna 103 for the contactless IC 102 via the RL 822, and the antenna 103 is shunted to ground via the RL 822 and the SW-A 821 if the SW-A 821 is ON.

When the antenna 103 is shunted to ground, the electric current generated in the antenna 103 due to the electromagnetic waves from the outside flows to the ground side. As a result of the electric current generated in the antenna 103 flowing in the ground side, modulation/demodulation for wireless communication in the contactless IC 102 is prevented, and the power required to perform wireless communication cannot be maintained, as a result of which the wireless communication operation is stopped. In order to reliably prevent modulation/demodulation for wireless communication, it is desirable that the RL 822 and the SW-A 821 are connected to an antenna terminal on the side to which the load that is used to perform wireless communication load modulation in the contactless IC 102 is connected so as to extract the electric current of the antenna 103.

The contactless IC 102 outputs an RF detection signal upon receiving electromagnetic waves and communication from the outside, and therefore the contactless IC 102 drives the power source IC-B 106 using the RF detection signal. The CPU 807 then starts operating with the voltage output from the power source IC-B 106. However, as described above, if the contactless IC 102 cannot maintain the power required to perform wireless communication and the wireless communication operation stops, the contactless IC 102 stops output of the RF detection signal, and therefore the power source IC-B 106 is no longer driven by the contactless IC 102.

Next, operations performed in a case in which the contactless IC 102 receives electromagnetic waves and communication from the contactless IC reader/writer in the case where the main body of the wireless communication apparatus 801 is OFF, and the output from the state holding circuit 833 is "H" will be described.

Because the state holding circuit 833 outputs "H", the SW-C 824 is driven. If the SW-C 824 is driven by the output from the state holding circuit 833 to turn on the SW-C 824, the SW-C 824 shunts the signal that drives the SW-A 821 to ground, as a result of which the SW-A 821 is turned off.

In the case where the state holding circuit 833 turns on the SW-C 824, the contactless IC 102 outputs the RF detection signal upon receiving electromagnetic waves and communication from the outside, but the RF detection signal is shunted to ground by the SW-C 824 via the Ra 820. Accordingly, the SW-A 821 is not driven by the RF detection signal, and the SW-A 821 is turned off. If the SW-A 821 is in the OFF state, the contactless IC 102 can perform wireless communication.

Next, operations performed in a case in which the contactless IC 102 receives electromagnetic waves and communication from the contactless IC reader/writer in the case where the main body of the wireless communication apparatus 801 is ON will be described.

In the case where the main body of the wireless communication apparatus 801 is ON, the wireless communication apparatus 801 can drive the SW-B 823 using a signal (a first control signal) from the CPU 807 (an output 1). If the SW-B 823 is driven by the signal from the CPU 807 to turn on the SW-B 823, the SW-B 823 shunts the signal that drives the SW-C 824 to ground, as a result of which the SW-C 824 is turned off.

Because the SW-C 824 is turned off regardless of a state in which output state of the state holding circuit 833 in the case where the SW-B 823 is turned on under the control of the CPU 807, there is no longer a switch that turns off the SW-A 821. When the contactless IC 102 receives the electromagnetic waves and communication from the outside in this state, the SW-A 821 is turned on, and the antenna 103 is shunted to ground via the RL 822 and the SW-A 821, as a result of which the wireless communication operation of the contactless IC 102 is stopped.

If the SW-B 823 is not driven by the signal from the CPU 807 (the output 1) and the SW-B 823 is turned off, the wireless communication apparatus 801 can switch output from the state holding circuit 833 using a signal from the CPU 807 (an output 2) and perform control to turn on/off the SW-C 824. The contactless IC 102 outputs the RF detection signal upon receiving electromagnetic waves and communication from the outside in the case where the SW-C 824 is ON, but the RF detection signal is shunted to ground by the SW-C 824 via the Ra 820. Accordingly, the SW-A 821 is not driven by the RF detection signal, and the SW-A 821 is turned off. If the SW-A 821 is in the OFF state, the contactless IC 102 can perform wireless communication. Because the SW-A 821 is turned on when the contactless IC 102 receives electromagnetic waves and communication from the outside in the case where the SW-C 824 is OFF, the antenna 103 is shunted to ground via the RL 822 and the SW-A 821, as a result of which the wireless communication operation of the contactless IC 102 is stopped.

The operations of the configuration example 1 of the second embodiment are summarized as follows.

In the case where the main body of the wireless communication apparatus 801 is OFF, control can be performed to turn on/off the SW-C 824 using the signal from the state holding circuit 833. Because the SW-A 821 is OFF even if the contactless IC receives electromagnetic waves and communication from the outside in the case where the SW-C 824 is ON, the wireless communication operation of the contactless IC 102 is activated. When the contactless IC receives electromagnetic waves and communication from the outside in the case where the SW-C 824 is OFF, the SW-A 821 is turned on, and the wireless communication operation of the contactless IC 102 is deactivated.

In the case where the main body of the wireless communication apparatus 801 is ON, the wireless communication apparatus 801 can perform control to turn on/off the SW-B 823 using the signal from the CPU 807. Also, the wireless communication apparatus 801 can control the state holding circuit 833 using the signal from the CPU 807 to turn on/off the SW-C 824. Because the SW-A 821 is made ON when the contactless IC receives electromagnetic waves and communication from the outside in the case where the SW-B 823 is ON, regardless of the output state of the state holding circuit 833, the wireless communication operation of the contactless IC 102 is deactivated. In the case where the SW-B 823 is OFF and the SW-C 824 is OFF, the SW-A 821 is turned on when the contactless IC receives electromagnetic waves and communication from the outside, as a result of which the wireless communication operation of the contactless IC 102 is deactivated. In the case where the SW-B 823 is OFF and the SW-C 824 is ON, the SW-A 821 is OFF even if the contactless IC receives electromagnetic waves and communication from the outside, and therefore the wireless communication operation of the contactless IC 102 is activated.

Control for switching the wireless communication of the contactless IC 102 between enabled and disabled has been described above with regard to the respective cases in which the main body of the wireless communication apparatus 801 is OFF and ON.

FIG. 9 is a table of truth values related to states of peripheral circuits of the contactless IC 102 of the wireless communication apparatus 801 according to the second embodiment and the wireless communication operation of the contactless IC 102. In the description below, activation and deactivation of the wireless communication operation of the contactless IC 102 may be respectively described as "enabling" and "disabling" the wireless communication operation.

It is assumed that the operation minimum voltage of the power source IC-A 105 is Va1, the operation minimum voltage of the power source IC-B 106 is Vb1, and Va1<Vb1. Because the power source IC-A 105 and the power source IC-B 106 cannot operate in the case where the battery voltage Vbatt of the battery 104 is 0≤Vbatt<Va1, the CPU 807 and the state holding circuit 833 are OFF. If the CPU 807 and the state holding circuit 833 are OFF, the wireless communication operation of the contactless IC 102 is only "disabled".

In the case where the battery voltage Vbatt of the battery 104 is Va1≤Vbatt<Vb1, the power source IC-A 105 is operable but the power source IC-B 106 cannot operate, and thus the CPU 807 is OFF and the state holding circuit 833 is ON. If the CPU 807 is OFF and the state holding circuit 833 is ON, the wireless communication operation of the contactless IC 102 can be selectively "disabled" or "enabled" depending on the output state of the state holding circuit 833.

In the case where the battery voltage Vbatt of the battery 104 is Vb1≤Vbatt, the power source IC-A 105 and the power source IC-B 106 is operable, and thus the CPU 807 can be in either the ON state or the OFF state. If the CPU 807 is OFF, the wireless communication operation of the contactless IC 102 can be selectively "disabled" or "enabled" depending on the output state of the state holding circuit 833. If the CPU 807 is ON, the wireless communication operation of the contactless IC 102 can be selectively "disabled" or "enabled" depending on the control of the CPU 807 and the output state of the state holding circuit 833.

Figure 10:
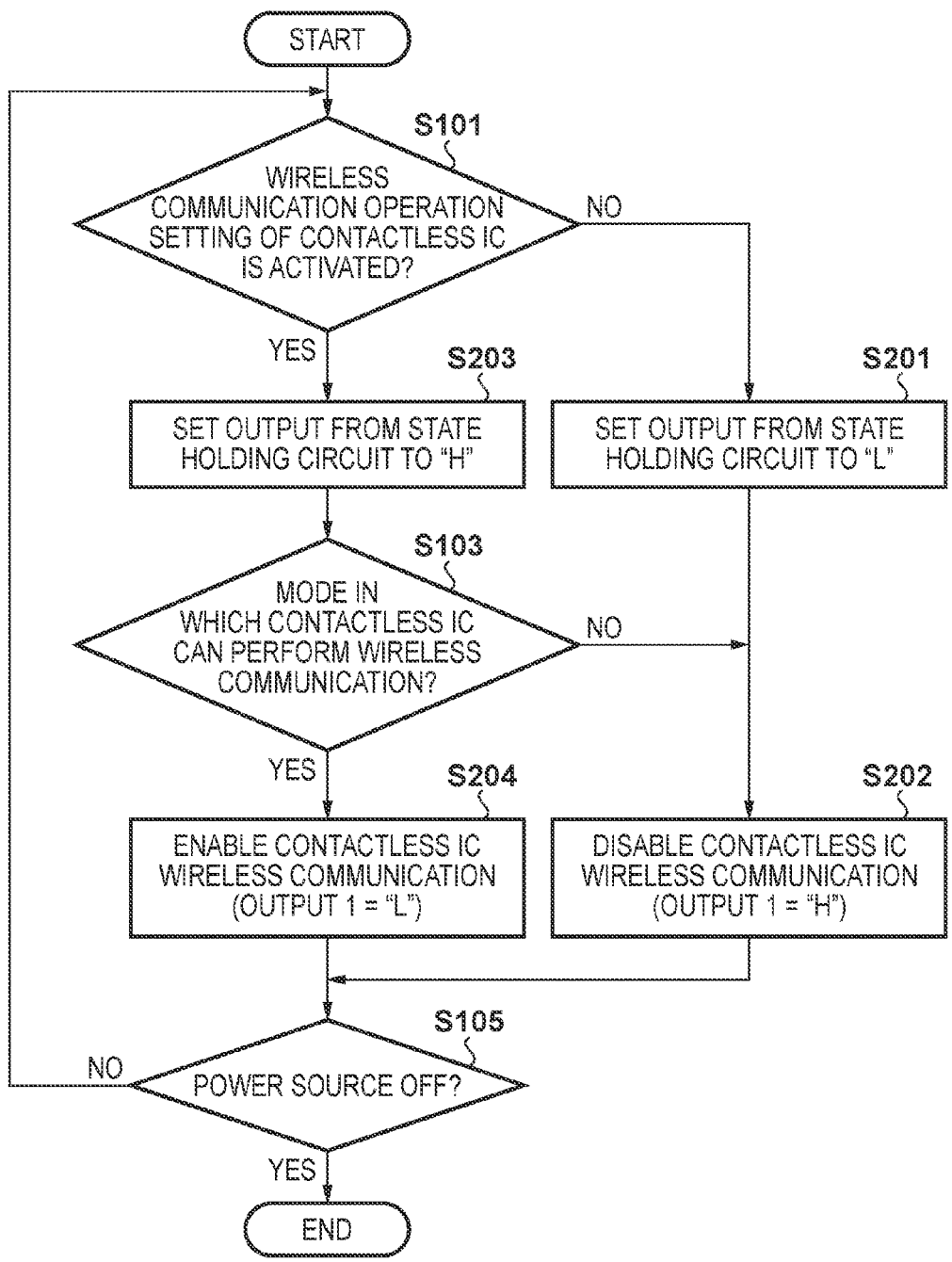
FIG. 10 is a flowchart showing a procedure for controlling the contactless IC 102 of the wireless communication apparatus 801 according to the second embodiment.

FIG. 10 is a flowchart showing the procedure for controlling the contactless IC 102 of the wireless communication apparatus 801 according to the second embodiment. Processing of each step in this flowchart is executed by the CPU 807, unless otherwise stated. In FIG. 10, the same reference numerals are given to the steps in which the same or similar processing as/to that shown in FIG. 3 is performed, and description thereof will be omitted.

In the case where it is determined in step S101 that the wireless communication operation setting is not activated, in step S201, the CPU 807 sets the output from the state holding circuit 833 to "L". In step S202, the CPU 807 then controls the output 1 to "H" to turn on the SW-B 823, and thereby causes the contactless IC 102 to be "disabled". It should be noted that as shown in FIG. 9, if the output from the state holding circuit 833 is "L", the contactless IC 102 is "disabled" regardless of the state of the SW-B 123, and therefore the processing of step S202 can be omitted.

In the case where it is determined in step S101 that the wireless communication operation setting is activated, in step S203, the CPU 807 sets the output from the state holding circuit 833 to "H", and performs determination processing in step S103.

In the case where it is determined in step S103 that the operation mode of the CPU 807 is a mode in which the contactless IC 102 cannot perform wireless communication, in step S202, the CPU 807 controls the output 1 to "H" to turn on the SW-B 823, and thereby causes the contactless IC 102 to be "disabled".

In the case where it is determined in step S103 that the operation mode of the CPU 807 is a mode in which the contactless IC 102 can perform wireless communication, in step S204, the CPU 807 controls the output 1 to "L" to turn off the SW-B 823, and thereby causes the contactless IC 102 to be "enabled".

In this manner, in the present embodiment, in the case where the CPU 807 is ON, the output from the state holding circuit 833 can be set to either "L" or "H" depending on the wireless communication operation setting of the contactless IC 102 (step S101). In the case where the output from the state holding circuit 833 is "L", the wireless communication operation of the contactless IC 102 is "disabled". In the case where the output from the state holding circuit 833 is "H", the wireless communication operation of the contactless IC 102 can be set to either "disabled" or "enabled" in accordance with the operation mode of the CPU 807 (step S103). If the wireless communication operation setting of the contactless IC 102 is stored in the ROM 109, when the wireless communication apparatus 801 is turned on, the CPU 807 can read out the wireless communication operation setting of the contactless IC 102 stored in the ROM 109, and control the wireless communication operation of the contactless IC 102.

Furthermore, in the present embodiment, the output state of the state holding circuit 833 is continuously held even in the case where the CPU 807 is OFF. Accordingly, even in the case where the CPU 807 is OFF, the wireless communication operation of the contactless IC 102 can be selectively "disabled" or "enabled".

Configuration Example 2 of Second Embodiment

Figure 11:
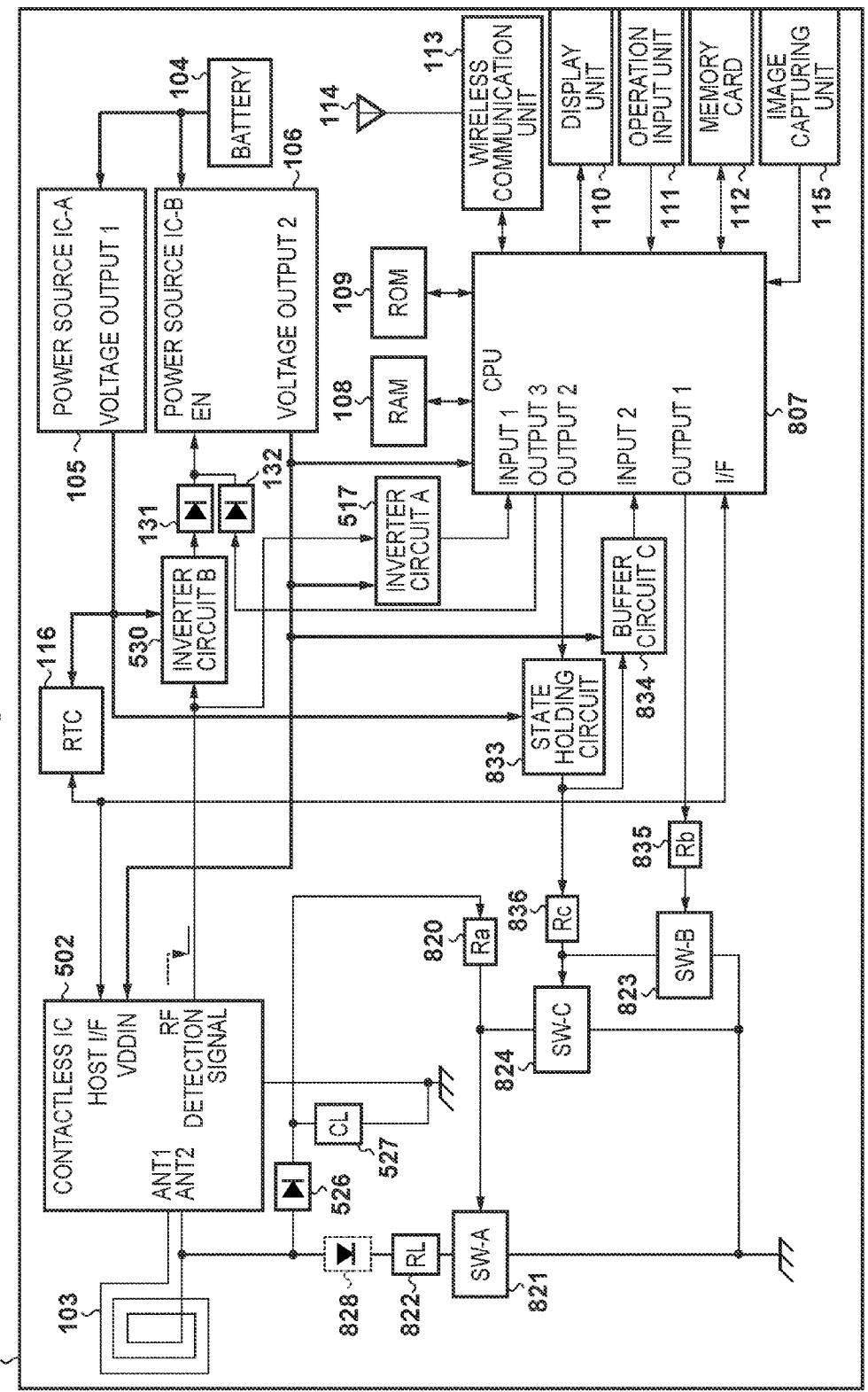
FIG. 11 is a block diagram showing a configuration example 2 of peripheral circuits of a contactless IC 502 of a wireless communication apparatus 1101 according to the second embodiment.

FIG. 11 is a block diagram showing the configuration example 2 of peripheral circuits of a contactless IC 502 of a wireless communication apparatus 1101 according to the second embodiment. In FIG. 11, the same reference numerals are given to constituent elements that are the same as or similar to those in the configuration example 1 of FIG. 8. Also, the same reference numerals are given to constituent elements that are the same as or similar to those in the configuration example 2 of the first embodiment (FIG. 5). Hereinafter, differences from the configuration example 1 will be mainly described.

When the contactless IC 502 receives electromagnetic waves from the outside, the electric current is generated in the antenna 103, and the electric current is rectified by a diode 526. The rectified electric current drives the SW-A 821 via the Ra 820, and the SW-A 821 is turned on. A CL 527 is the capacitor, and is disposed for compensating driving of the SW-A 821. The SW-A 821 is connected to the antenna 103 for the contactless IC 502 via the RL 822, and the antenna 103 is shunted to ground via the RL 822 and the SW-A 821 if the SW-A 821 is ON.

When the antenna 103 is shunted to ground, the electric current generated in the antenna 103 due to the electromagnetic waves from the outside flows to the ground side. As a result of the electric current generated in the antenna 103 flowing in the ground side, modulation/demodulation for wireless communication in the contactless IC 502 is prevented, and the power required to perform wireless communication cannot be maintained, as a result of which the wireless communication operation is stopped. In order to reliably prevent modulation/demodulation for wireless communication, it is desirable that the RL 822 and the SW-A 821 are connected to an antenna terminal on the side to which the load that is used to perform wireless communication load modulation in the contactless IC 502 is connected so as to extract the electric current of the antenna 103.

The configuration example 2 of FIG. 11 and the configuration example 1 of FIG. 8 are the same in that they have the SW-A 821, the SW-B 823, the SW-C 824, and the state holding circuit 833. Therefore, also in the configuration example 2, the wireless communication operation of the contactless IC 502 can be selectively "disabled" or "enabled" depending on the control of the CPU 807 and the output state of the state holding circuit 833. The table of truth values in FIG. 9 and the flowchart in FIG. 10 can also be applied to the configuration example 2.

Configuration Example 3 of Second Embodiment

Figure 12:
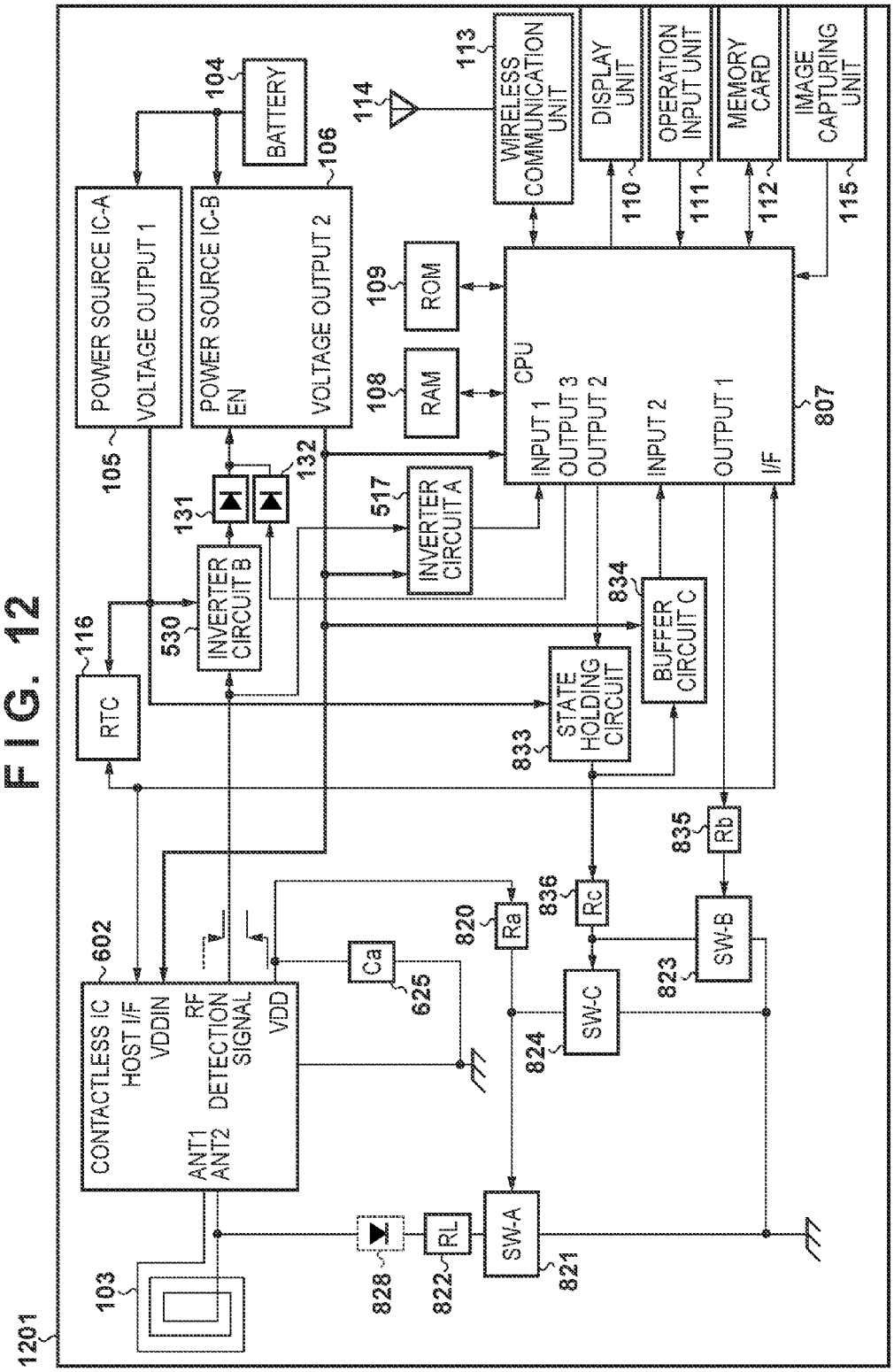
FIG. 12 is a block diagram showing a configuration example 3 of peripheral circuits of a contactless IC 602 of a wireless communication apparatus 1201 according to the second embodiment.

FIG. 12 is a block diagram showing the configuration example 3 of peripheral circuits of a contactless IC 602 of a wireless communication apparatus 1201 according to the second embodiment. In FIG. 12, the same reference numerals are given to constituent elements that are the same as or similar to those in the configuration example 1 of FIG. 8. Also, the same reference numerals are given to constituent elements that are the same as or similar to those in the configuration example 3 of the first embodiment (FIG. 6). Hereinafter, differences from the configuration example 1 will be mainly described.

The contactless IC 602 outputs a voltage to the VDD terminal upon receiving electromagnetic waves and communication from the outside. The signal generated by the voltage that is output to the VDD terminal drives the SW-A 821 via the Ra 820, and the SW-A 821 is turned on. The SW-A 821 is connected to the antenna 103 for the contactless IC 602 via the RL 822, and the antenna 103 is shunted to ground via the RL 822 and the SW-A 821 if the SW-A 821 is ON.

When the antenna 103 is shunted to ground, the electric current generated in the antenna 103 due to the electromagnetic waves from the outside flows to the ground side. As a result of the electric current generated in the antenna 103 flowing in the ground side, modulation/demodulation for wireless communication in the contactless IC 602 is prevented, and the power required to perform wireless communication cannot be maintained, as a result of which the wireless communication operation is stopped. In order to reliably prevent modulation/demodulation for wireless communication, it is desirable that the RL 822 and the SW-A 821 are connected to an antenna terminal on the side to which the load that is used to perform wireless communication load modulation in the contactless IC 602 is connected so as to extract the electric current of the antenna 103.

The configuration example 3 of FIG. 12 and the configuration example 1 of FIG. 8 are the same in that they have the SW-A 821, the SW-B 823, the SW-C 824, and the state holding circuit 833. Therefore, also in the configuration example 3, the wireless communication operation of the contactless IC 602 can be selectively "disabled" or "enabled" depending on the control of the CPU 807 and the output state of the state holding circuit 833. The table of truth values in FIG. 9 and the flowchart in FIG. 10 can also be applied to the configuration example 3.

Configuration Example 4 of Second Embodiment

Figure 13:
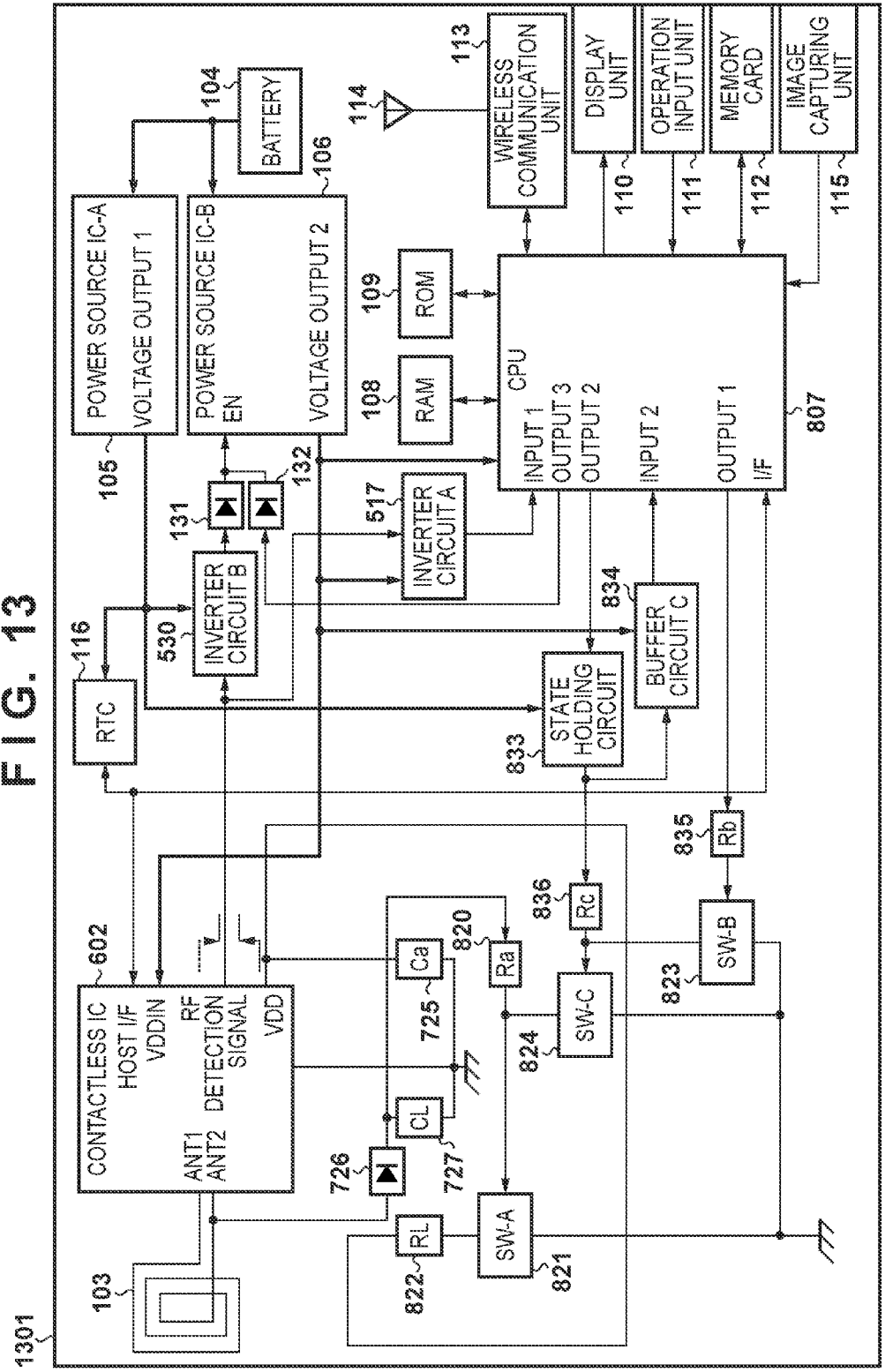
FIG. 13 is a block diagram showing a configuration example 4 of peripheral circuits of a contactless IC 602 of a wireless communication apparatus 1301 according to the second embodiment.

FIG. 13 is a block diagram showing the configuration example 4 of peripheral circuits of a contactless IC 602 of a wireless communication apparatus 1301 according to the second embodiment. In FIG. 13, the same reference numerals are given to constituent elements that are the same as or similar to those in the configuration example 1 of FIG. 8. Also, the same reference numerals are given to constituent elements that are the same as or similar to those in the configuration example 4 of the first embodiment (FIG. 7). Hereinafter, differences from the configuration example 1 will be mainly described.

When the contactless IC 602 receives electromagnetic waves and communication from the outside, the electric current is generated in the antenna 103, and the electric current is rectified by the diode 726. The rectified electric current drives the SW-A 821 via the Ra 820, and the SW-A 821 is turned on. A CL 727 is the capacitor, and is disposed for compensating driving of the SW-A 821. The SW-A 821 is connected to the VDD terminal of the contactless IC 602 via the RL 822, and if the SW-A 821 is ON, the VDD terminal of the contactless IC 602 is shunted to ground via the RL 822 and the SW-A 821.

If the VDD terminal of the contactless IC 602 is shunted to ground, the voltage required to perform wireless communication cannot be accumulated in the VDD terminal of the contactless IC 602 due to the electromagnetic waves from the outside, and the power required to perform wireless communication cannot be maintained, as a result of which the wireless communication operation is stopped.

The configuration example 4 of FIG. 13 and the configuration example 1 of FIG. 8 are the same in that they have the SW-A 821, the SW-B 823, the SW-C 824, and the state holding circuit 833. Therefore, also in the configuration example 4, the wireless communication operation of the contactless IC 602 can be selectively "disabled" or "enabled" depending on the control of the CPU 807 and the output state of the state holding circuit 833. The table of truth values in FIG. 9 and the flowchart in FIG. 10 can also be applied to the configuration example 4.

The four configuration examples of the second embodiment have been described above. The configuration of the second embodiment is as follows when described in general terms. The contactless IC and the peripheral circuits configure a closed loop circuit such that in the case of receiving electromagnetic waves and communication from the outside, the wireless communication operation of the contactless IC is deactivated using the electromagnetic waves and communication as a trigger. Moreover, the peripheral circuits further include a configuration for releasing the closed loop circuit. In the second embodiment, release of the closed loop circuit is controlled by the output of the CPU and the output of the state holding circuit.

Third Embodiment

The first embodiment has described a configuration in which in the case where the CPU of the wireless communication apparatus is ON, the wireless communication operation of the contactless IC can be selectively "disabled" or "enabled" under the control of the CPU.

The second embodiment has described a configuration in which even in the case where the CPU of the wireless communication apparatus is OFF, the wireless communication operation of the contactless IC can be selectively "disabled" or "enabled" by the state holding circuit, in addition to the control described in the first embodiment.

The third embodiment will describe the configuration in which even in the case where the CPU of the wireless communication apparatus is OFF, the wireless communication operation of the contactless IC can be selectively "disabled" or "enabled" by a voltage detection circuit, in addition to the control described in the first embodiment.

Herein, similarly to the first embodiment, four configuration examples (configuration examples 1 to 4) of circuits that correspond to functions of a contactless IC will be described in order. It is assumed that in the third embodiment, wireless communication of the contactless IC supports the international standard ISO/IEC 21481.

Configuration Example 1 of Third Embodiment

Figure 14:
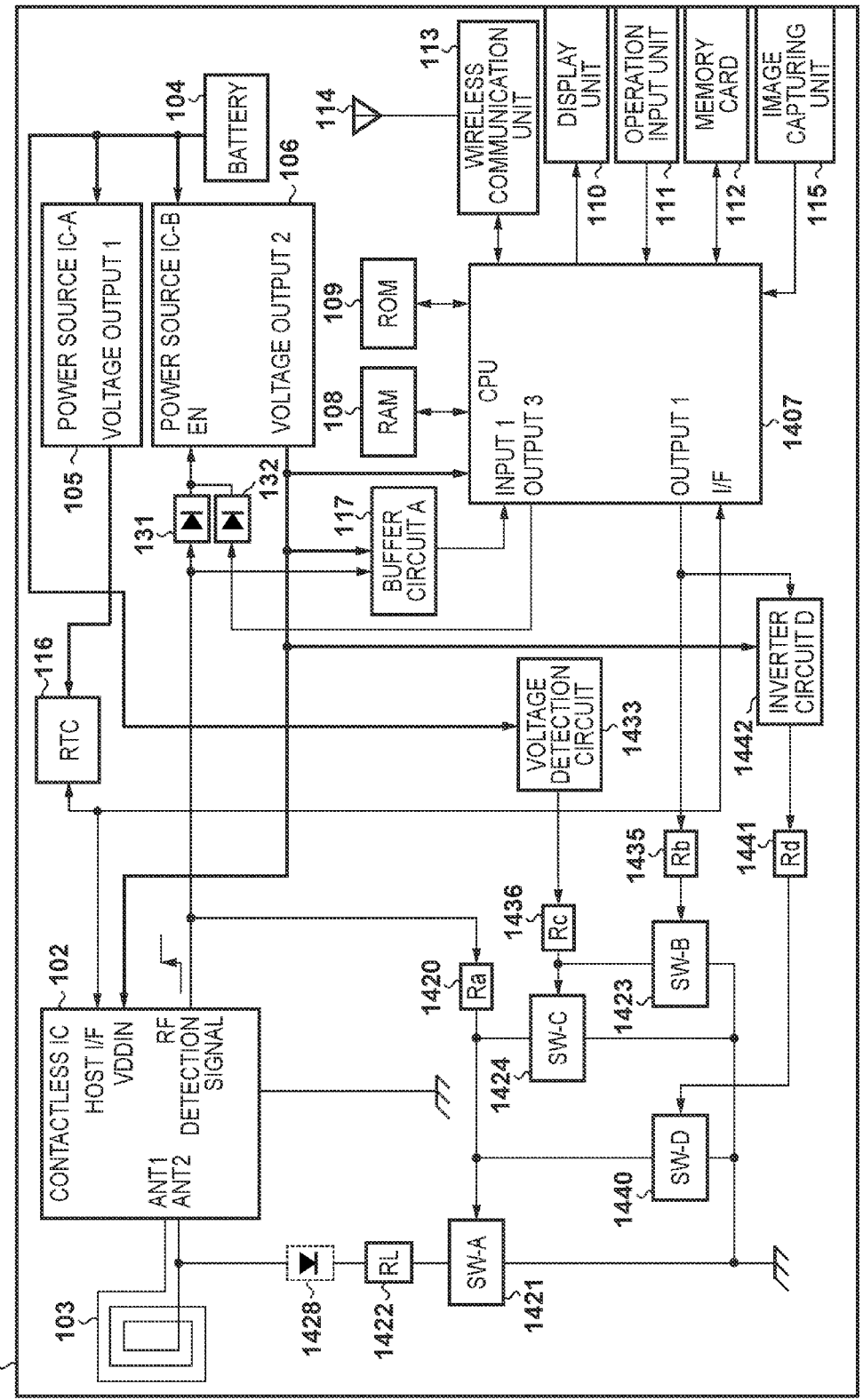
FIG. 14 is a block diagram showing a configuration example 1 of peripheral circuits of a contactless IC 102 of a wireless communication apparatus 1401 according to a third embodiment.

FIG. 14 is a block diagram showing the configuration example 1 of peripheral circuits of a contactless IC 102 of a wireless communication apparatus 1401 according to the third embodiment. In FIG. 14, the same reference numerals are given to constituent elements that are the same as or similar to those in the configuration example 1 of the first embodiment (FIG. 1). Hereinafter, differences from the configuration example 1 of the first embodiment will be mainly described.

An Ra 1420, an RL 1422, an Rb 1435, an Rc 1436, and an Rd 1441 are resistors, and an SW-A 1421, an SW-B 1423, an SW-C 1424, and an SW-D 1440 are switches. An input terminal for turning on/off the SW-A 1421 (a first switch) is connected to a terminal for outputting an RF detection signal (a signal output terminal) via the Ra 1420. An input terminal for turning on/off the SW-B 1423 (a second switch) is connected to an "output 1" of the CPU 1407 (a control output terminal) via the Rb 1435. An input terminal for turning on/off the SW-C 1424 (a third switch) is connected to a voltage detection circuit 1433 via the Rc 1436. An input terminal for turning on/off the SW-D 1440 (a fourth switch) is connected to the "output 1" of the CPU 1407 (the control output terminal) via the Rd 1441 and an inverter circuit D 1442. The SW-A 1421, the SW-B 1423, the SW-C 1424, and the SW-D 1440 can be elements that are in a conduction state when on, and that are in a high impedance state when off, such as an NPN transistor, an NchMOSFET, and the like.

A diode 1428 is a diode for rectification. In the case where the SW-A 1421 is an NPN transistor, the SW-A 1421 itself performs the rectification operation, and therefore the diode 1428 is not required, but in the case where the SW-A 1421 is an NchMOSFET, the diode 1428 for rectification is required. In the present embodiment, because description is given assuming the SW-A 1421 is an NPN transistor, detailed description of the diode 1428 will be omitted.

The inverter circuit D 1442 inverts and outputs the output 1 from the CPU 1407. The input state of signals to the SW-B 1423 and the SW-D 1440 is inverted by the inverter circuit D 1442.

The voltage detection circuit 1433 detects the voltage of the battery 104, and outputs "L" if the detected voltage is less than a voltage threshold Vt1, and "H" if the detected voltage is greater than or equal to the voltage threshold Vt1. Because the power source of the voltage detection circuit 1433 is the battery 104, the voltage detection circuit 1433 operates regardless of the operations of the wireless communication apparatus 1401.

Next, operations of peripheral circuits of the contactless IC 102 will be described. In the description below, it is assumed that an OFF state of the main body of the wireless communication apparatus 1401 refers to a state in which the CPU 1407 does not perform control due to the voltage not being output from the power source IC-B 106 and the CPU 1407 being in the OFF state. Also, it is assumed that an ON state of the main body of the wireless communication apparatus 1401 refers to a state in which the CPU 1407 performs control due to the voltage being output from the power source IC-B 106 and the CPU 1407 being in the ON state.

First, operations performed in a case in which the contactless IC 102 receives electromagnetic waves and communication from the contactless IC reader/writer in the case where the main body of the wireless communication apparatus 1401 is OFF and the voltage of the battery 104 is less than the voltage threshold Vt1 will be described.

The contactless IC 102 outputs a positive logic RF detection signal upon receiving electromagnetic waves and communication from the outside. The RF detection signal drives the SW-A 1421 via the Ra 1420, and the SW-A 1421 is turned on. The SW-A 1421 is connected to the antenna 103 for the contactless IC 102 via the RL 1422, and the antenna 103 is shunted to ground via the RL 1422 and the SW-A 1421 if the SW-A 1421 is ON.

When the antenna 103 is shunted to ground, the electric current generated in the antenna 103 due to the electromagnetic waves from the outside flows to the ground side. As a result of the electric current generated in the antenna 103 flowing in the ground side, modulation/demodulation for wireless communication in the contactless IC 102 is prevented, and the power required to perform wireless communication cannot be maintained, as a result of which the wireless communication operation is stopped. In order to reliably prevent the modulation/demodulation for wireless communication, it is desirable that the RL 1422 and the SW-A 1421 are connected to an antenna terminal on the side to which the load that is used to perform wireless communication load modulation in the contactless IC 102 is connected so as to extract the electric current of the antenna 103.

The contactless IC 102 outputs an RF detection signal upon receiving electromagnetic waves and communication from the outside, and therefore the contactless IC 102 drives the power source IC-B 106 using the RF detection signal. The CPU 1407 then starts operating with the voltage output from the power source IC-B 106. However, as described above, if the contactless IC 102 cannot maintain the power required to perform wireless communication and the wireless communication operation stops, the contactless IC 102 stops output of the RF detection signal, and therefore the power source IC-B 106 is no longer driven by the contactless IC 102.

Next, operations performed in a case in which the contactless IC 102 receives electromagnetic waves and communication from the contactless IC reader/writer in the case where the main body of the wireless communication apparatus 1401 is OFF and the voltage of the battery 104 is greater than or equal to the voltage threshold Vt1 will be described.

Because the voltage detection circuit 1433 outputs "H", the SW-C 1424 is driven. If the SW-C 1424 is driven by the output from the voltage detection circuit 1433 to turn on the SW-C 1424, the SW-C 1424 shunts the signal that drives the SW-A 1421 to ground, as a result of which the SW-A 1421 is turned off.

In the case where the voltage detection circuit 1433 outputs "H", the contactless IC 102 outputs an RF detection signal upon receiving electromagnetic waves and communication from the outside, but the FR detection signal is shunted to ground by the SW-C 1424 via the Ra 1420. Therefore, the SW-A 1421 is not driven by the RF detection signal, and the SW-A 1421 is turned off. If the SW-A 1421 is in the OFF state, the contactless IC 102 can perform wireless communication.

Next, operations performed in a case in which the contactless IC 102 receives electromagnetic waves and communication from the contactless IC reader/writer in the case where the main body of the wireless communication apparatus 1401 is ON will be described.

In the case where the main body of the wireless communication apparatus 1401 is ON, the wireless communication apparatus 1401 can drive the SW-B 1423 and the SW-D 1440 using the signal from the CPU 1407 (the output 1). If the SW-B 1423 is driven by the signal from the CPU 1407 to turn on the SW-B 1423, the SW-D 1440 that is subjected to the inversion operation by the inverter circuit D 1442 is turned off. In this case, the SW-B 1423 shunts the signal that drives the SW-C 1424 to ground, as a result of which the SW-C 1424 is turned off.

Because the SW-C 1424 is turned off regardless of the output state of the voltage detection circuit 1433 in the case where the SW-B 1423 is turned on under the control of the CPU 1407, there is no longer a switch that turns off the SW-A 1421. When the contactless IC 102 receives electromagnetic waves and communication from the outside in this state, the SW-A 1421 is turned on, and the antenna 103 is shunted to ground via the RL 1422 and the SW-A 1421, as a result of which the wireless communication operation of the contactless IC 102 is stopped.

If the SW-B 1423 is not driven by the signal from the CPU 1407 (the output 1) and the SW-B 1423 is turned off, the SW-D 1440 that is subjected to the inversion operation by the inverter circuit D 1442 is turned on. The contactless IC 102 outputs the RF detection signal upon receiving electromagnetic waves and communication from the outside in the case where the SW-D 1440 is ON, but the RF detection signal is shunted to ground by the SW-D 1440 via the Ra 1420. Therefore, the SW-A 1421 is not driven by the RF detection signal, and the SW-A 1421 is turned off. If the SW-A 1421 is in the OFF state, the contactless IC 102 can perform wireless communication.

The operations of the configuration example 1 of the third embodiment are summarized as follows.

In the case where the main body of the wireless communication apparatus 1401 is OFF, control can be performed to turn on/off the SW-C 1424 using the output from the voltage detection circuit 1433. In the case where the SW-C 1424 is ON, the SW-A 1421 is OFF even if the contactless IC receives electromagnetic waves and communication from the outside, and therefore the wireless communication operation of the contactless IC 102 is activated. In the case where the SW-C 1424 is OFF, the SW-A 1421 is turned on when the contactless IC receives electromagnetic waves and communication from the outside, and thus the wireless communication operation of the contactless IC 102 is deactivated.

In the case where the main body of the wireless communication apparatus 1401 is ON, the wireless communication apparatus 1401 can turn on/off and perform control to turn on/off the SW-B 1423 and the SW-D 1440, using the signal from the CPU 1407. In the case where the SW-B 1423 is ON and the SW-D 1440 is OFF, regardless of the output state of the voltage detection circuit 1433, the SW-A 1421 is turned on when the contactless IC receives electromagnetic waves and communication from the outside, and the wireless communication operation of the contactless IC 102 is deactivated. In the case where the SW-B 1423 is OFF and the SW-D 1440 is ON, regardless of the output state of the voltage detection circuit 1433, the SW-A 1421 is OFF even if the contactless IC receives electromagnetic waves and communication from the outside, and therefore the wireless communication operation of the contactless IC 102 is activated.

Control for switching the wireless communication of the contactless IC 102 between enabled and disabled has been described above with regard to the respective cases in which the main body of the wireless communication apparatus 1401 is OFF and ON.

FIG. 15 is a table of truth values related to states of peripheral circuits of the contactless IC 102 of the wireless communication apparatus 1401 according to the third embodiment and the wireless communication operation of the contactless IC 102. In the description below, activation and deactivation of the wireless communication operation of the contactless IC 102 may be respectively described as "enabling" and "disabling" the wireless communication operation.

It is assumed that the operation minimum voltage of the power source IC-B 106 is Vb1, the voltage threshold of the voltage detection circuit 1433 is Vt1, and Vb1<Vt1. In the case where the battery voltage Vbatt of the battery 104 is 0≤Vbatt<Vb1, the power source IC-B 106 cannot operate, and therefore the CPU 1407 is OFF. Moreover, the output from the voltage detection circuit 1433 is "L". If the CPU 1407 is OFF and the output from the voltage detection circuit 1433 is "L", the wireless communication operation of the contactless IC 102 is only "disabled".

In the case where the battery voltage Vbatt of the battery 104 is Vb1≤Vbatt<Vt1, the power source IC-B 106 is operable, and therefore the CPU 1407 can be in either the ON state or the OFF state. Moreover, the output from the voltage detection circuit 1433 is "L". If the CPU 1407 is OFF, the wireless communication operation of the contactless IC 102 is "disabled". If the CPU 1407 is ON, the wireless communication operation of the contactless IC 102 can be selectively "disabled" or "enabled" under the control of the CPU 1407.

In the case where the battery voltage Vbatt of the battery 104 is Vt1≤Vbatt, the power source IC-B 106 is operable, and therefore the CPU 1407 can be in either the ON state or the OFF state. Moreover, the output from the voltage detection circuit 1433 is "H". If the CPU 1407 is OFF, the wireless communication operation of the contactless IC 102 is "enabled" due to the output from the voltage detection circuit 1433. If the CPU 1407 is ON, the wireless communication operation of the contactless IC 102 can be selectively "disabled" or "enabled" under the control of the CPU 1407.

Figure 16:
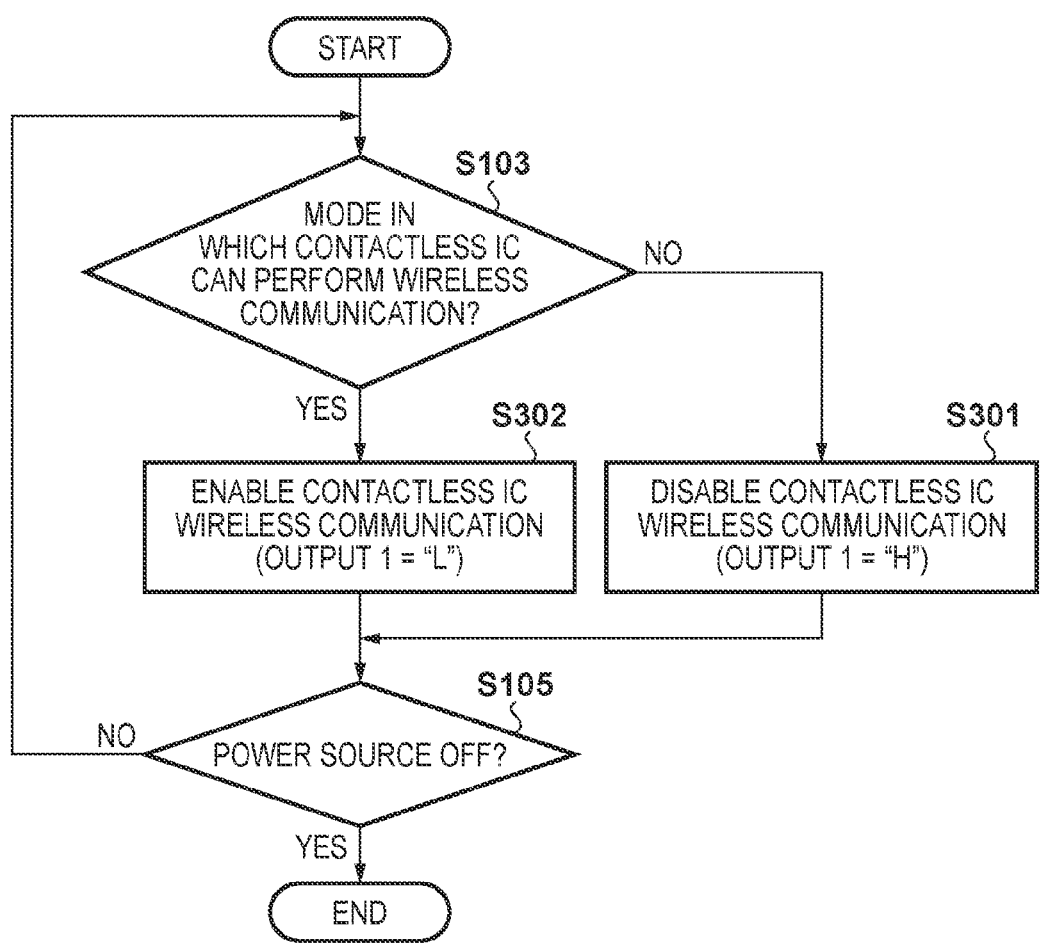
FIG. 16 is a flowchart showing a procedure for controlling the contactless IC 102 of the wireless communication apparatus 1401 according to the third embodiment.

FIG. 16 is a flowchart showing a procedure for controlling the contactless IC 102 of the wireless communication apparatus 1401 according to the third embodiment. Processing of each step in this flowchart is executed by the CPU 1407, unless otherwise stated. In FIG. 16, the same reference numerals are given to the steps in which the same or similar processing as/to that of FIG. 3 is performed, and description thereof will be omitted.

In the case where it is determined in step S103 that the operation mode of the CPU 1407 is a mode in which the contactless IC 102 cannot perform wireless communication, in step S301, the CPU 1407 controls the output 1 to "H" to turn on the SW-B 1423 and to turn off the SW-D 1440. Accordingly, the contactless IC 102 is "disabled".

In the case where it is determined in step S103 that the operation mode of the CPU 1407 is a mode in which the contactless IC 102 can perform wireless communication, in step S302, the CPU 1407 controls the output 1 to "L" to turn off the SW-B 1423 and to turn on the SW-D 1440. Accordingly, the contactless IC 102 is "enabled".

Also, in the present embodiment, independent of the processing shown in FIG. 16, even in the case where the CPU 1407 is OFF, the wireless communication operation of the contactless IC 102 can be "disabled" or "enabled" depending on the output state of the voltage detection circuit 1433.

Configuration Example 2 of Third Embodiment

Figure 17:
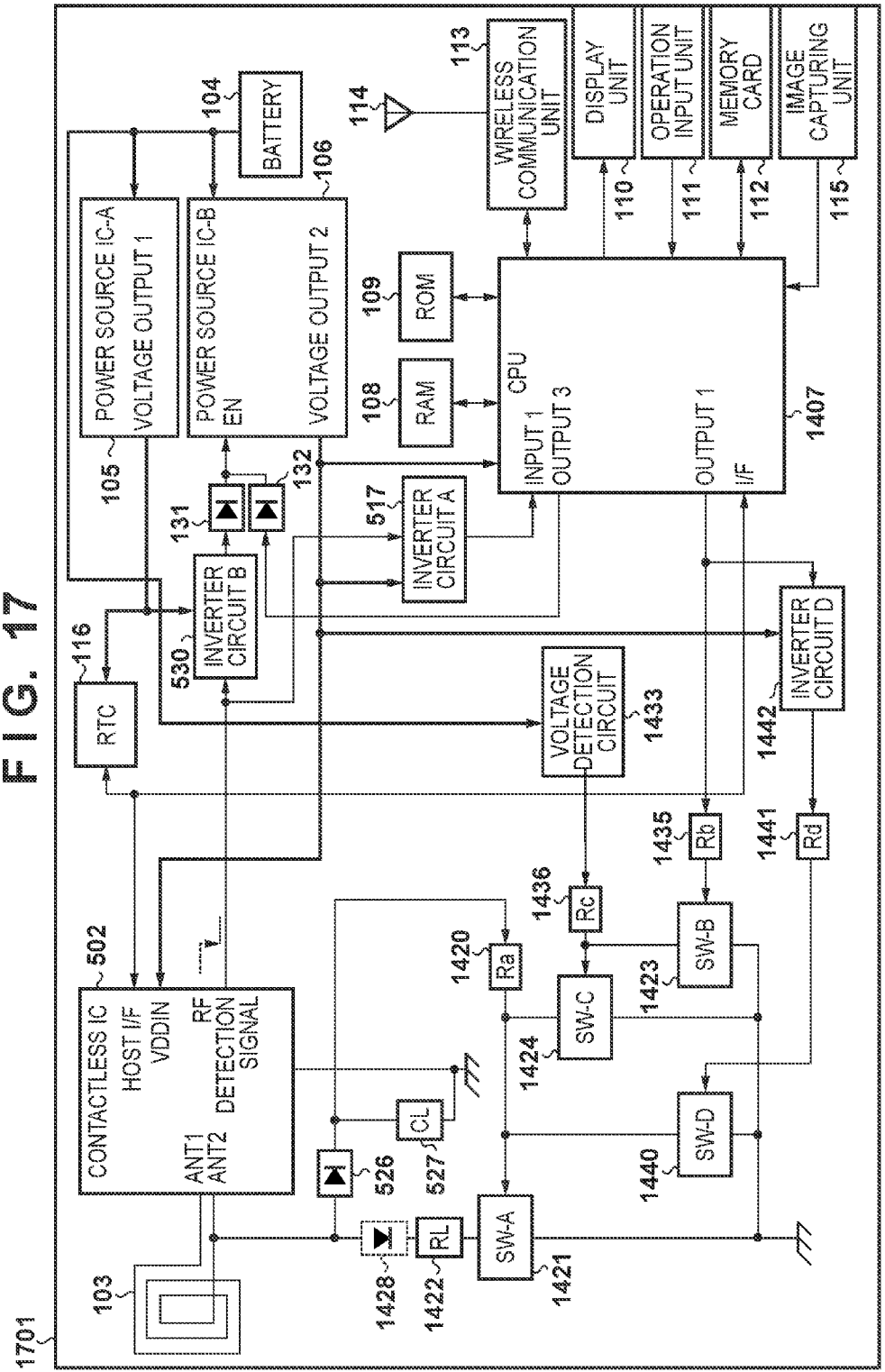
FIG. 17 is a block diagram showing a configuration example 2 of peripheral circuits of a contactless IC 502 of a wireless communication apparatus 1701 according to the third embodiment.

FIG. 17 is a block diagram showing the configuration example 2 of peripheral circuits of a contactless IC 502 of a wireless communication apparatus 1701 according to the third embodiment. In FIG. 17, the same reference numerals are given to constituent elements that are the same as or similar to those in the configuration example 1 of FIG. 14. Also, the same reference numerals are given to constituent elements that are the same as or similar to those in the configuration example 2 of the first embodiment (FIG. 5). Hereinafter, differences from the configuration example 1 will be mainly described.

When the contactless IC 502 receives electromagnetic waves from the outside, the electric current is generated in the antenna 103, and the electric current is rectified by the diode 526. The rectified electric current drives the SW-A 1421 via the Ra 1420, and the SW-A 1421 is turned on. A CL 527 is the capacitor, and is disposed for compensating driving of the SW-A 1421. The SW-A 1421 is connected to the antenna 103 for the contactless IC 502 via the RL 1422, and the antenna 103 is shunted to ground via the RL 1422 and the SW-A 1421 if the SW-A 1421 is ON.

When the antenna 103 is shunted to ground, the electric current generated in the antenna 103 due to the electromagnetic waves from the outside flows to the ground side. As a result of the electric current generated in the antenna 103 flowing in the ground side, modulation/demodulation for wireless communication in the contactless IC 502 is prevented, and the power required to perform wireless communication cannot be maintained, as a result of which the wireless communication operation is stopped. In order to reliably prevent the modulation/demodulation for wireless communication, it is desirable that the RL 1422 and the SW-A 1421 are connected to an antenna terminal on the side to which the load that is used to perform wireless communication load modulation in the contactless IC 502 is connected so as to extract the electric current of the antenna 103.

The configuration example 2 of FIG. 17 and the configuration example 1 of FIG. 14 are the same in that they have the SW-A 1421, the SW-B 1423, the SW-C 1424, the SW-D 1440, and the voltage detection circuit 1433. Therefore, also in the configuration example 2, the wireless communication operation of the contactless IC 502 can be selectively "disabled" or "enabled" depending on the control of the CPU 1407 and the output state of the voltage detection circuit 1433. The table of truth values of FIG. 15 and the flowchart of FIG. 16 can also be applied to the configuration example 2.

Configuration Example 3 of Third Embodiment

Figure 18:
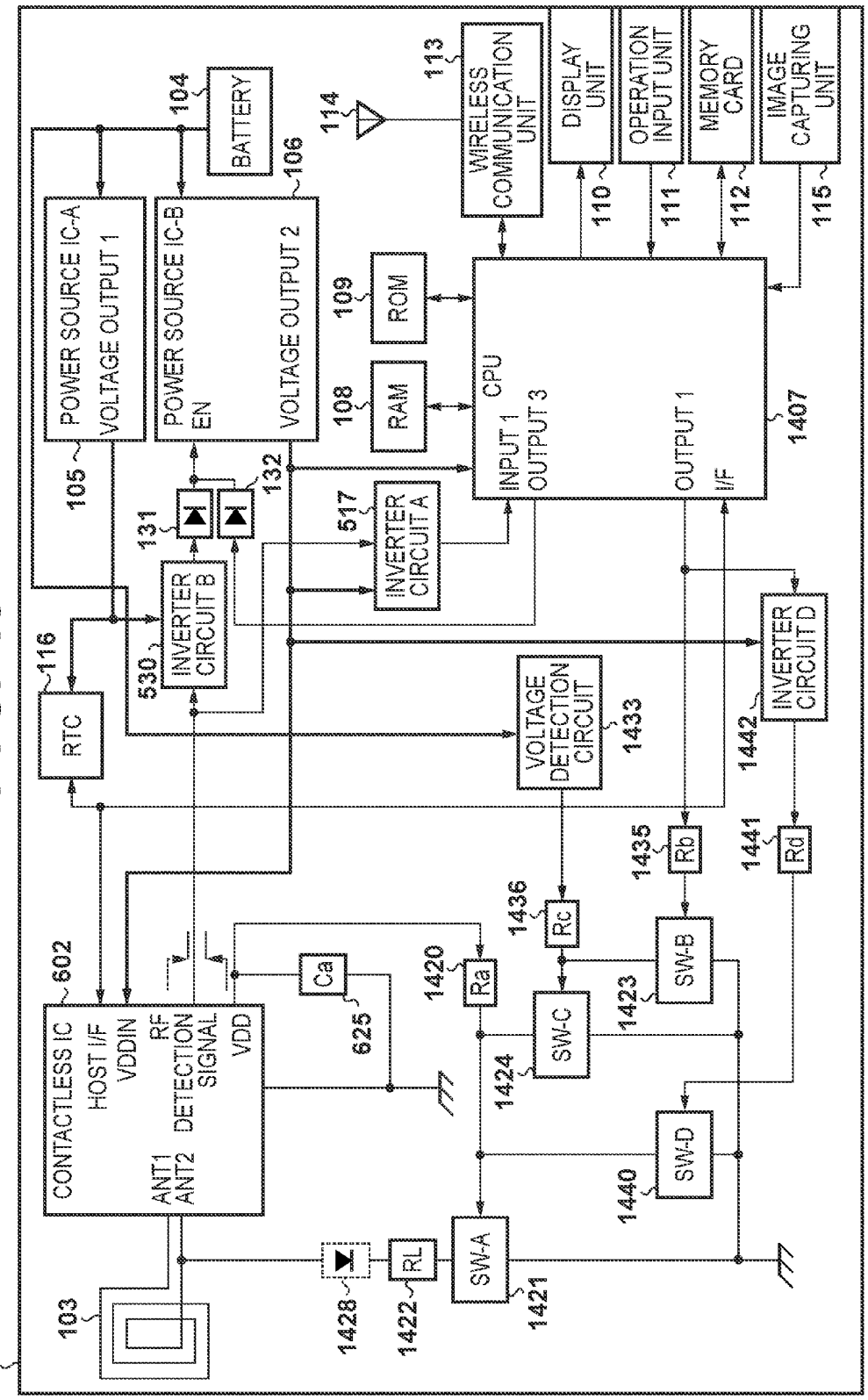
FIG. 18 is a block diagram showing a configuration example 3 of peripheral circuits of a contactless IC 602 of a wireless communication apparatus 1801 according to the third embodiment.

FIG. 18 is a block diagram showing the configuration example 3 of peripheral circuits of a contactless IC 602 of a wireless communication apparatus 1801 according to the third embodiment. In FIG. 18, the same reference numerals are given to constituent elements that are the same as or similar to those in the configuration example 1 of FIG. 14. Also, the same reference numerals are given to constituent elements that are the same as or similar to those in the configuration example 3 of the first embodiment (FIG. 6). Hereinafter, differences from the configuration example 1 will be mainly described.

The contactless IC 602 outputs the voltage to the VDD terminal upon receiving electromagnetic waves and communication from the outside. The signal generated by the voltage that is output to the VDD terminal drives the SW-A 1421 via the Ra 1420, and the SW-A 1421 is turned on. The SW-A 1421 is connected to the antenna 103 for the contactless IC 602 via the RL 1422, and the antenna 103 is shunted to ground via the RL 1422 and the SW-A 1421 if the SW-A 1421 is ON.

When the antenna 103 is shunted to ground, the electric current generated in the antenna 103 due to the electromagnetic waves from the outside flows to the ground side. As a result of the electric current generated in the antenna 103 flowing in the ground side, modulation/demodulation for wireless communication in the contactless IC 602 is prevented, and the power required to perform wireless communication cannot be maintained, as a result of which the wireless communication operation is stopped. In order to reliably prevent the modulation/demodulation for wireless communication, it is desirable that the RL 1422 and the SW-A 1421 are connected to an antenna terminal on the side to which the load that is used to perform wireless communication load modulation in the contactless IC 602 is connected so as to extract the electric current of the antenna 103.

The configuration example 3 of FIG. 18 and the configuration example 1 of FIG. 14 are the same in that they have the SW-A 1421, the SW-B 1423, the SW-C 1424, the SW-D 1440, and the voltage detection circuit 1433. Therefore, also in the configuration example 3, the wireless communication operation of the contactless IC 602 can be selectively "disabled" or "enabled" depending on the control of the CPU 1407 and the output state of the voltage detection circuit 1433. The table of truth values of FIG. 15 and the flowchart of FIG. 16 can also be applied to the configuration example 3.

Configuration Example 4 of Third Embodiment

Figure 19:
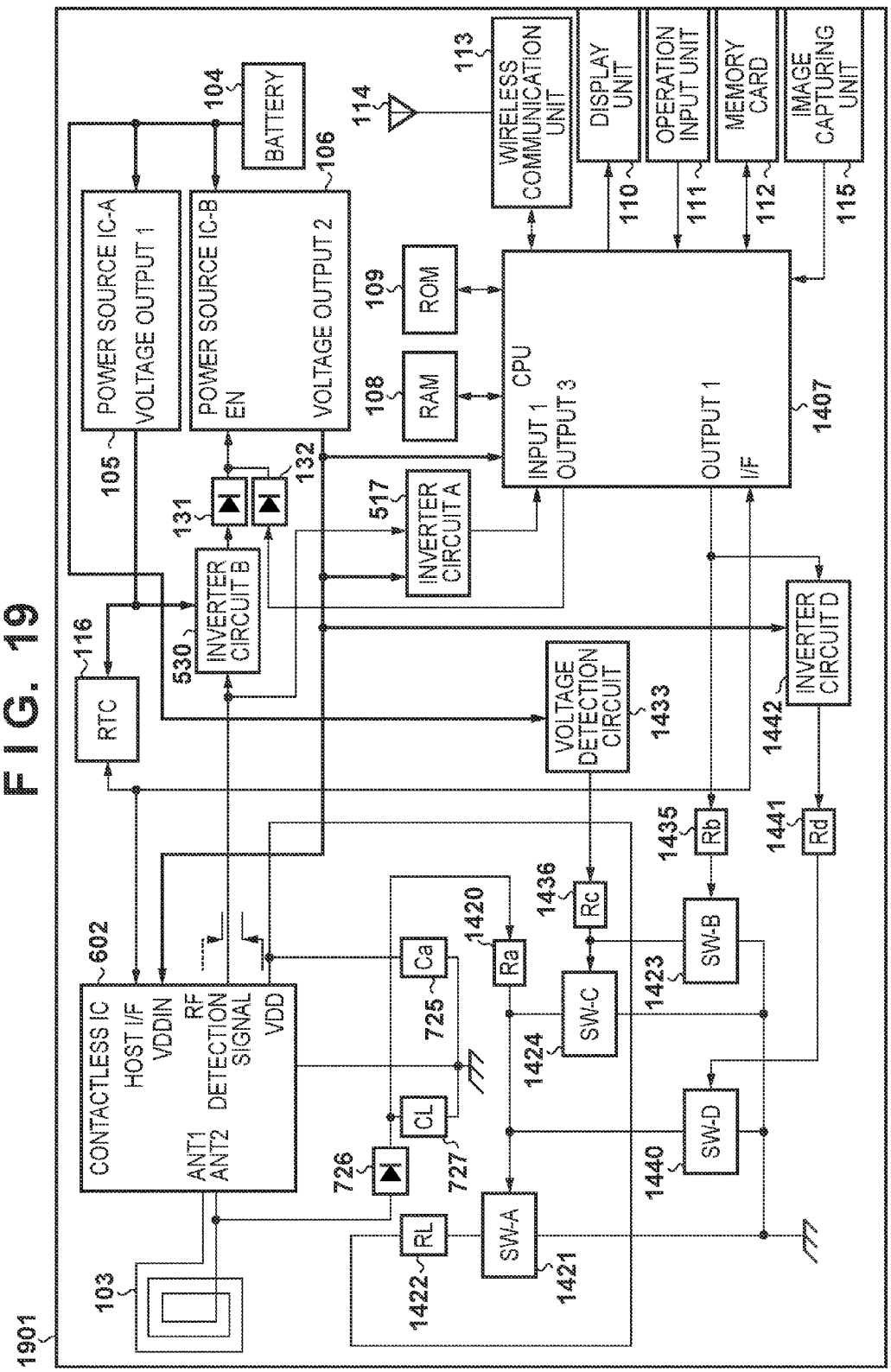
FIG. 19 is a block diagram showing a configuration example 4 of peripheral circuits of a contactless IC 602 of a wireless communication apparatus 1901 according to the third embodiment.

FIG. 19 is a block diagram showing the configuration example 4 of peripheral circuits of a contactless IC 602 of a wireless communication apparatus 1901 according to the third embodiment. In FIG. 19, the same reference numerals are given to constituent elements that are the same as or similar to those in the configuration example 1 of FIG. 14. Also, the same reference numerals are given to constituent elements that are the same as or similar to those in the configuration example 4 of the first embodiment (FIG. 7). Hereinafter, differences from the configuration example 1 will be mainly described.

When the contactless IC 602 receives electromagnetic waves and communication from the outside, the electric current is generated in the antenna 103, and the electric current is rectified by the diode 726. The rectified electric current drives the SW-A 1421 via the Ra 1420, and the SW-A 1421 is turned on. A CL 727 is the capacitor, and is disposed for compensating driving of the SW-A 1421. The SW-A 1421 is connected to the VDD terminal of the contactless IC 602 via the RL 1422, and the VDD terminal of the contactless IC 602 is shunted to ground via the RL 1422 and the SW-A 1421 if the SW-A 1421 is ON.

If the VDD terminal of the contactless IC 602 is shunted to ground, the voltage required to perform wireless communication cannot be accumulated in the VDD terminal of the contactless IC 602 due to the electromagnetic waves from the outside, and the power required to perform wireless communication cannot be maintained, as a result of which the wireless communication operation is stopped.

The configuration example 4 of FIG. 19 and the configuration example 1 of FIG. 14 are the same in that they have the SW-A 1421, the SW-B 1423, the SW-C 1424, the SW-D 1440, and the voltage detection circuit 1433. Therefore, also in the configuration example 4, the wireless communication operation of the contactless IC 602 can be selectively "disabled" or "enabled" depending on the control of the CPU 1407 and the output state of the voltage detection circuit 1433. The table of truth values of FIG. 15 and the flowchart of FIG. 16 can also be applied to the configuration example 4.

The four configuration examples of the third embodiment have been described above. The configuration of the third embodiment is as follows when described in general terms. The contactless IC and the peripheral circuits configure a closed loop circuit such that in the case of receiving electromagnetic waves and communication from the outside, the wireless communication operation of the contactless IC is deactivated using the electromagnetic waves and communication as a trigger. Moreover, the peripheral circuits further include a configuration for releasing the closed loop circuit.

In the third embodiment, release of the closed loop circuit is controlled by the output of the CPU and the output of the voltage detection circuit.

Fourth Embodiment

The first embodiment has described a configuration in which in the case where the CPU of the wireless communication apparatus is ON, the wireless communication operation of the contactless IC can be selectively "disabled" or "enabled" under the control of the CPU.

The second embodiment has described a configuration in which even in the case where the CPU of the wireless communication apparatus is OFF, the wireless communication operation of the contactless IC can be selectively "disabled" or "enabled" by the state holding circuit, in addition to the control described in the first embodiment.

The third embodiment has described a configuration in which even in the case where the CPU of the wireless communication apparatus is OFF, the wireless communication operation of the contactless IC can be selectively "disabled" or "enabled" by the voltage detection circuit, in addition to the control described in the first embodiment.

The fourth embodiment is different from the third embodiment in that circuits and operations are partially changed. Similarly to the third embodiment, in the fourth embodiment, in the case where the CPU of the wireless communication apparatus is OFF, the wireless communication operation of the contactless IC can be set to either "disabled" or "enabled" by the voltage detection circuit. The fourth embodiment is different from the third embodiment in that in the case where the CPU of the wireless communication apparatus is ON, the wireless communication operation of the contactless IC is controlled to be "disabled" or "enabled" by "OR" of the control of the CPU and the voltage detection circuit. Also, the fourth embodiment is different from the third embodiment in that the number of circuit elements is reduced and simpler operations are realized.

In the third embodiment, even if the battery voltage is greater than or equal to the threshold Vt1 of the voltage detection circuit, the wireless communication operation of the contactless IC can be controlled to be "disabled" or "enabled" depending on the output state of the CPU of the main body of the wireless communication apparatus. In contrast, in the fourth embodiment, in the case where the battery voltage is greater than or equal to the threshold Vt1 of the voltage detection circuit, the wireless communication operation of the contactless IC is "enabled", regardless of the output state of the CPU of the main body of the wireless communication apparatus. Operations described in the fourth embodiment are effective in a case where it is guaranteed that the main body of the wireless communication apparatus can perform operation cooperation with the contactless IC if, for example, the battery voltage is greater than or equal to the threshold Vt1 of the voltage detection circuit.

Herein, similarly to the third embodiment, four configuration examples (configuration examples 1 to 4) of circuits that correspond to functions of a contactless IC will be described in order. It is assumed that in the fourth embodiment, wireless communication of the contactless IC supports the international standard ISO/IEC 21481.

Configuration Example 1 of Fourth Embodiment

Figure 20:
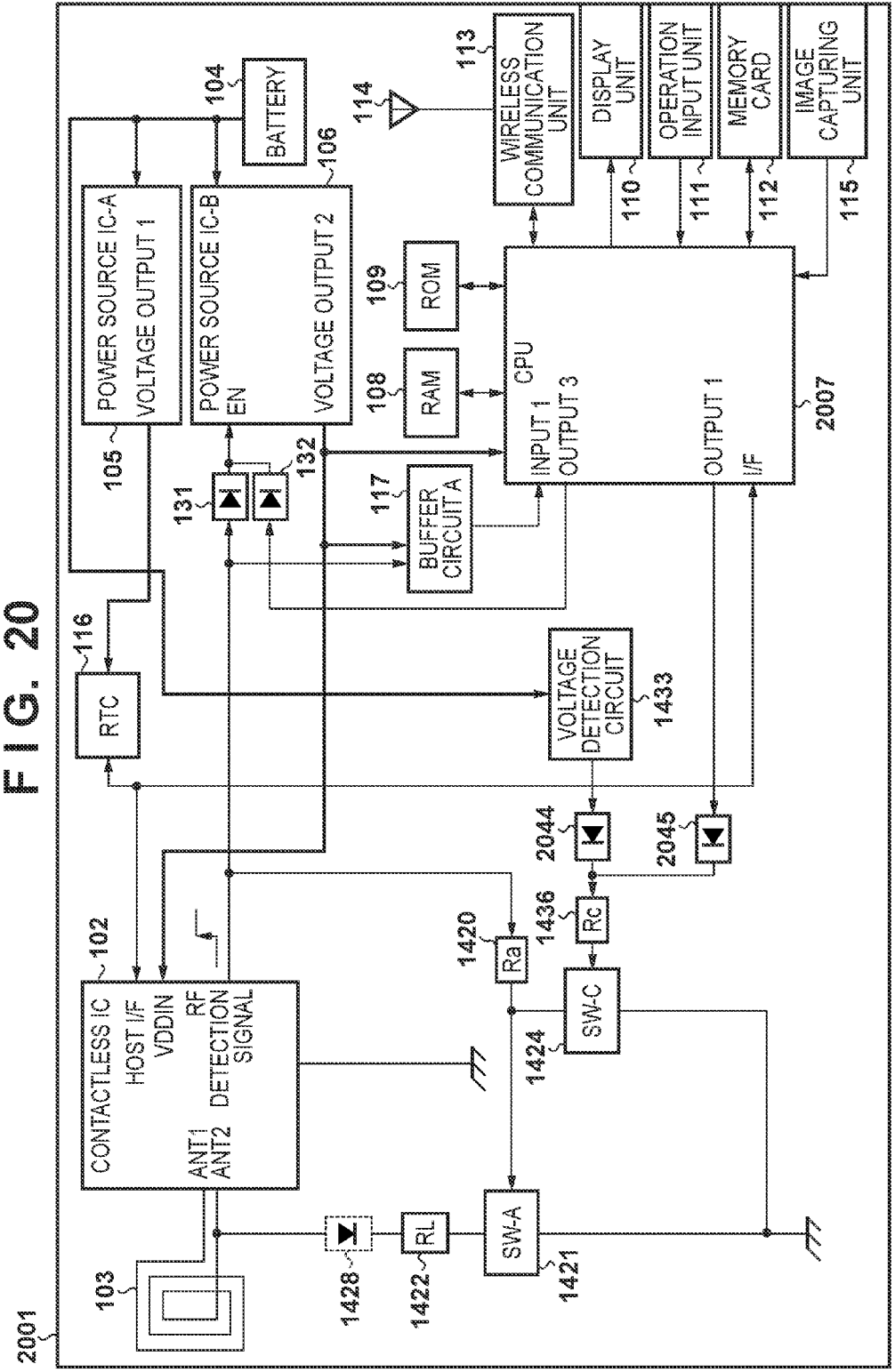
FIG. 20 is a block diagram showing a configuration example 1 of peripheral circuits of a contactless IC 102 of a wireless communication apparatus 2001 according to a fourth embodiment.

FIG. 20 is a block diagram showing the configuration example 1 of peripheral circuits of a contactless IC 102 of a wireless communication apparatus 2001 according to the fourth embodiment. In FIG. 20, the same reference numerals are given to constituent elements that are the same as or similar to those in the configuration example 1 of the third embodiment (FIG. 14). Hereinafter, differences from the configuration example 1 of the third embodiment will be mainly described.

In FIG. 20, the operations of the CPU 2007 are different from the operations of the CPU 1407 in FIG. 14 (details will be described later). An input terminal for turning on/off the SW-A 1421 (a first switch) is connected to a terminal for outputting an RF detection signal (a signal output terminal) via the Ra 1420. An input terminal for turning on/off the SW-C 1424 (a third switch) is connected to a voltage detection circuit 1433 via an Rc 1436 and a diode 2044, and is connected to an "output 1" of the CPU 2007 (a control output terminal) via the Rc 1436 and the diode 2045. Therefore, the output from the voltage detection circuit 1433 and the output 1 from the CPU 2007 are OR input to the Rc 1436 using the diode 2044 and the diode 2045.

Next, operations of peripheral circuits of the contactless IC 102 will be described. In the description below, it is assumed that an OFF state of the main body of the wireless communication apparatus 2001 refers to a state in which the CPU 2007 does not perform control due to the voltage not being output from the power source IC-B 106 and the CPU 2007 being in the OFF state. Also, it is assumed that an ON state of the main body of the wireless communication apparatus 2001 refers to a state in which the CPU 2007 performs control due to the voltage being output from the power source IC-B 106 and the CPU 2007 being in the ON state.

First, operations performed in a case in which the contactless IC 102 receives electromagnetic waves and communication from the contactless IC reader/writer in the case where the main body of the wireless communication apparatus 2001 is OFF and the voltage of the battery 104 is less than the voltage threshold Vt1 will be described.

The contactless IC 102 outputs a positive logic RF detection signal upon receiving electromagnetic waves and communication from the outside. The RF detection signal drives the SW-A 1421 via the Ra 1420, and the SW-A 1421 is turned on. The SW-A 1421 is connected to the antenna 103 for the contactless IC 102 via the RL 1422, and the antenna 103 is shunted to ground via the RL 1422 and the SW-A 1421 if the SW-A 1421 is ON.

When the antenna 103 is shunted to ground, the electric current generated in the antenna 103 due to the electromagnetic waves from the outside flows to the ground side. As a result of the electric current generated in the antenna 103 flowing in the ground side, modulation/demodulation for wireless communication in the contactless IC 102 is prevented, and the power required to perform wireless communication cannot be maintained, as a result of which the wireless communication operation is stopped. In order to reliably prevent the modulation/demodulation for wireless communication, it is desirable that the RL 1422 and the SW-A 1421 are connected to an antenna terminal on the side to which the load that is used to perform wireless communication load modulation in the contactless IC 102 is connected so as to extract the electric current of the antenna 103.

The contactless IC 102 outputs an RF detection signal upon receiving electromagnetic waves and communication from the outside, and therefore the contactless IC 102 drives the power source IC-B 106 using the RF detection signal. The CPU 2007 then starts operating with the voltage output from the power source IC-B 106. However, as described above, if the contactless IC 102 cannot maintain the power required to perform wireless communication and the wireless communication operation stops, the contactless IC 102 stops output of the RF detection signal, and therefore the power source IC-B 106 is no longer driven by the contactless IC 102.

Next, operations performed in a case in which the contactless IC 102 receives electromagnetic waves and communication from the contactless IC reader/writer in the case where the main body of the wireless communication apparatus 2001 is OFF and the voltage of the battery 104 is greater than or equal to the voltage threshold Vt1 will be described.

Because the voltage detection circuit 1433 outputs "H", the SW-C 1424 is driven. If the SW-C 1424 is driven by the output from the voltage detection circuit 1433 to turn on the SW-C 1424, the SW-C 1424 shunts the signal that drives the SW-A 1421 to ground, as a result of which the SW-A 1421 is turned off.

In the case where the voltage detection circuit 1433 outputs "H", the contactless IC 102 outputs an RF detection signal upon receiving electromagnetic waves and communication from the outside, but the FR detection signal is shunted to ground by the SW-C 1424 via the Ra 1420. Therefore, the SW-A 1421 is not driven by the RF detection signal, and the SW-A 1421 is turned off. If the SW-A 1421 is in the OFF state, the contactless IC 102 can perform wireless communication.

Next, operations performed in a case in which the contactless IC 102 receives electromagnetic waves and communication from the contactless IC reader/writer in the case where the main body of the wireless communication apparatus 2001 is ON will be described.

In the case where the main body of the wireless communication apparatus 2001 is ON, the wireless communication apparatus 2001 can drive the SW-C 1424 using the OR of signals of the voltage detection circuit 1433 and the CPU 2007. In the case where the voltage of the battery 104 is less than the voltage threshold Vt1, the voltage detection circuit 1433 outputs "L", and therefore the SW-C 1424 can be controlled by a signal from the CPU 2007 (the output 1) to be turned on/off.

If the SW-C 1424 is not driven by the signal from the CPU 2007 (the output 1) and the SW-C 1424 is turned off, there is no longer a switch that turns off the SW-A 1421. When the contactless IC 102 receives electromagnetic waves and communication from the outside, the SW-A 1421 is turned on, and the antenna 103 is shunted to ground via the RL 1422 and the SW-A 1421, as a result of which the wireless communication operation of the contactless IC 102 is stopped.

If the SW-C 1424 is driven by the signal from the CPU 2007 (the output 1) to turn on the SW-C 1424, the contactless IC 102 outputs an RF detection signal upon receiving electromagnetic waves and communication from the outside. However, the RF detection signal is shunted to ground by the SW-C 1424 via the Ra 1420. Therefore, the SW-A 1421 is not driven by the RF detection signal, and the SW-A 1421 is turned off. If the SW-A 1421 is in the OFF state, the contactless IC 102 can perform wireless communication.

In the case where the voltage of the battery 104 is greater than or equal to the voltage threshold Vt1, the voltage detection circuit 1433 outputs "H", and therefore the SW-C 1424 is driven to be turned on regardless of the signal from the CPU 2007. In the case where the voltage detection circuit 1433 outputs "H", the contactless IC 102 outputs an RF detection signal upon receiving electromagnetic waves and communication from the outside, but the RF detection signal is shunted to ground by the SW-C 1424 via the Ra 1420. Therefore, the SW-A 1421 is not driven by the RF detection signal, and the SW-A 1421 is turned off. If the SW-A 1421 is in the OFF state, the contactless IC 102 can perform wireless communication.

The operations of the configuration example 1 of the fourth embodiment are summarized as follows.

In the case where the main body of the wireless communication apparatus 2001 is OFF, it is possible to perform control so as to turn on/off the SW-C 1424 using the output from the voltage detection circuit 1433. In the case where the SW-C 1424 is ON, the SW-A 1421 is OFF even if the contactless IC receives electromagnetic waves and communication from the outside, and therefore the wireless communication operation of the contactless IC 102 is activated. In the case where the SW-C 1424 is OFF, the SW-A 1421 is turned on when the contactless IC receives electromagnetic waves and communication from the outside, and thus the wireless communication operation of the contactless IC 102 is deactivated.

In the case where the main body of the wireless communication apparatus 2001 is ON, the wireless communication apparatus 2001 can perform control to turn on/off the SW-C 1424 using the OR of signals of the voltage detection circuit 1433 and the CPU 2007. In the case where the voltage of the battery 104 is less than the voltage threshold Vt1, it is possible to perform control so as to turn on/off the SW-C 1424 using the output from the CPU 2007. In the case where the SW-C 1424 is ON, the SW-A 1421 is OFF even if the contactless IC receives electromagnetic waves and communication from the outside, and therefore the wireless communication operation of the contactless IC 102 is activated. In the case where the SW-C 1424 is OFF, the SW-A 1421 is turned on when the contactless IC receives electromagnetic waves and communication from the outside, and thus the wireless communication operation of the contactless IC 102 is deactivated.

In the case where the voltage of the battery 104 is greater than or equal to the voltage threshold Vt1, the voltage detection circuit 1433 outputs "H", and therefore the SW-C 1424 is driven to be turned on regardless of the signal from the CPU 2007. In the case where the SW-C 1424 is ON, the SW-A 1421 is OFF even if the contactless IC receives electromagnetic waves and communication from the outside, and therefore the wireless communication operation of the contactless IC 102 is activated.

Control for switching the wireless communication of the contactless IC 102 between enabled or disabled has been described above with regard to the respective cases in which the main body of the wireless communication apparatus 2001 is OFF and ON.

FIG. 21 is a table of truth values related to states of peripheral circuits of the contactless IC 102 of the wireless communication apparatus 2001 according to the fourth embodiment and the wireless communication operation of the contactless IC 102. In the description below, activation and deactivation of the wireless communication operation of the contactless IC 102 may be respectively described as "enabling" and "disabling" the wireless communication operation.

It is assumed that the operation minimum voltage of the power source IC-B 106 is Vb1, the voltage threshold of the voltage detection circuit 1433 is Vt1, and Vb1<Vt1. In the case where the battery voltage Vbatt of the battery 104 is 0≤Vbatt<Vb1, the power source IC-B 106 cannot operate, and therefore the CPU 2007 is OFF. Moreover, the output from the voltage detection circuit 1433 is "L". If the CPU 2007 is OFF and the output from the voltage detection circuit 1433 is "L", the wireless communication operation of the contactless IC 102 is only "disabled".

In the case where the battery voltage Vbatt of the battery 104 is Vb1≤Vbatt<Vt1, the power source IC-B 106 is operable, and therefore the CPU 2007 can be in either the ON state or the OFF state. Moreover, the output from the voltage detection circuit 1433 is "L". If the CPU 2007 is OFF, the wireless communication operation of the contactless IC 102 is "disabled". If the CPU 2007 is ON, the wireless communication operation of the contactless IC 102 can be selectively "disabled" or "enabled" under the control of the CPU 2007.

In the case where the battery voltage Vbatt of the battery 104 is Vt1≤Vbatt, the power source IC-B 106 is operable, and therefore the CPU 2007 can be in either the ON state or the OFF state. Moreover, the output from the voltage detection circuit 1433 is "H". Because the operation of the contactless IC 102 is determined by the OR of signals of the voltage detection circuit 1433 and the CPU 2007, the wireless communication operation of the contactless IC 102 is "enabled".

Figure 22:
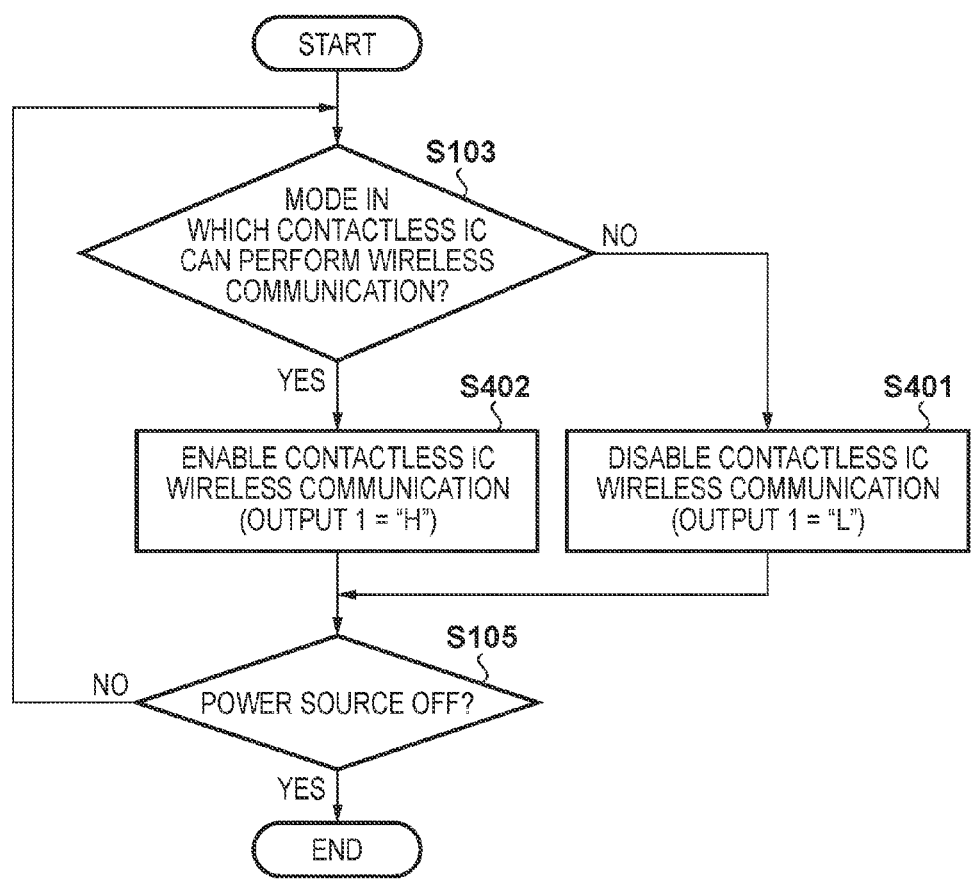
FIG. 22 is a flowchart showing a procedure for controlling the contactless IC 102 of the wireless communication apparatus 2001 according to the fourth embodiment.

FIG. 22 is a flowchart showing a procedure for controlling the contactless IC 102 of the wireless communication apparatus 2001 according to the fourth embodiment. Processing of each step in this flowchart is executed by the CPU 2007, unless otherwise stated. In FIG. 22, the same reference numerals are given to the steps in which the same or similar processing as/to that of FIG. 3 is performed, and description thereof will be omitted.

In the case where it is determined in step S103 that the operation mode of the CPU 2007 is a mode in which the contactless IC 102 cannot perform wireless communication, in step S401, the CPU 2007 controls the output 1 to "L" to turn off the SW-C 1424, and thereby causes the contactless IC 102 to be "disabled".

In the case where it is determined in step S103 that the operation mode of the CPU 2007 is a mode in which the contactless IC 102 can perform wireless communication, in step S402, the CPU 2007 controls the output 1 to "H" to turn on the SW-C 1424, and thereby causes the contactless IC 102 to be "enabled".

It should be noted that in the case of Vt1≤Vbatt in steps S401 and S402, the SW-C 1424 is turned on regardless of the state of the output 1, and therefore the contactless IC 102 is "enabled" regardless of the control of the CPU 2007.

Also, in the present embodiment, independent of the processing of FIG. 22, even in the case where the CPU 2007 is OFF, the wireless communication operation of the contactless IC 102 can be selectively "disabled" or "enabled" depending on the output state of the voltage detection circuit 1433.

Configuration Example 2 of Fourth Embodiment

Figure 23:
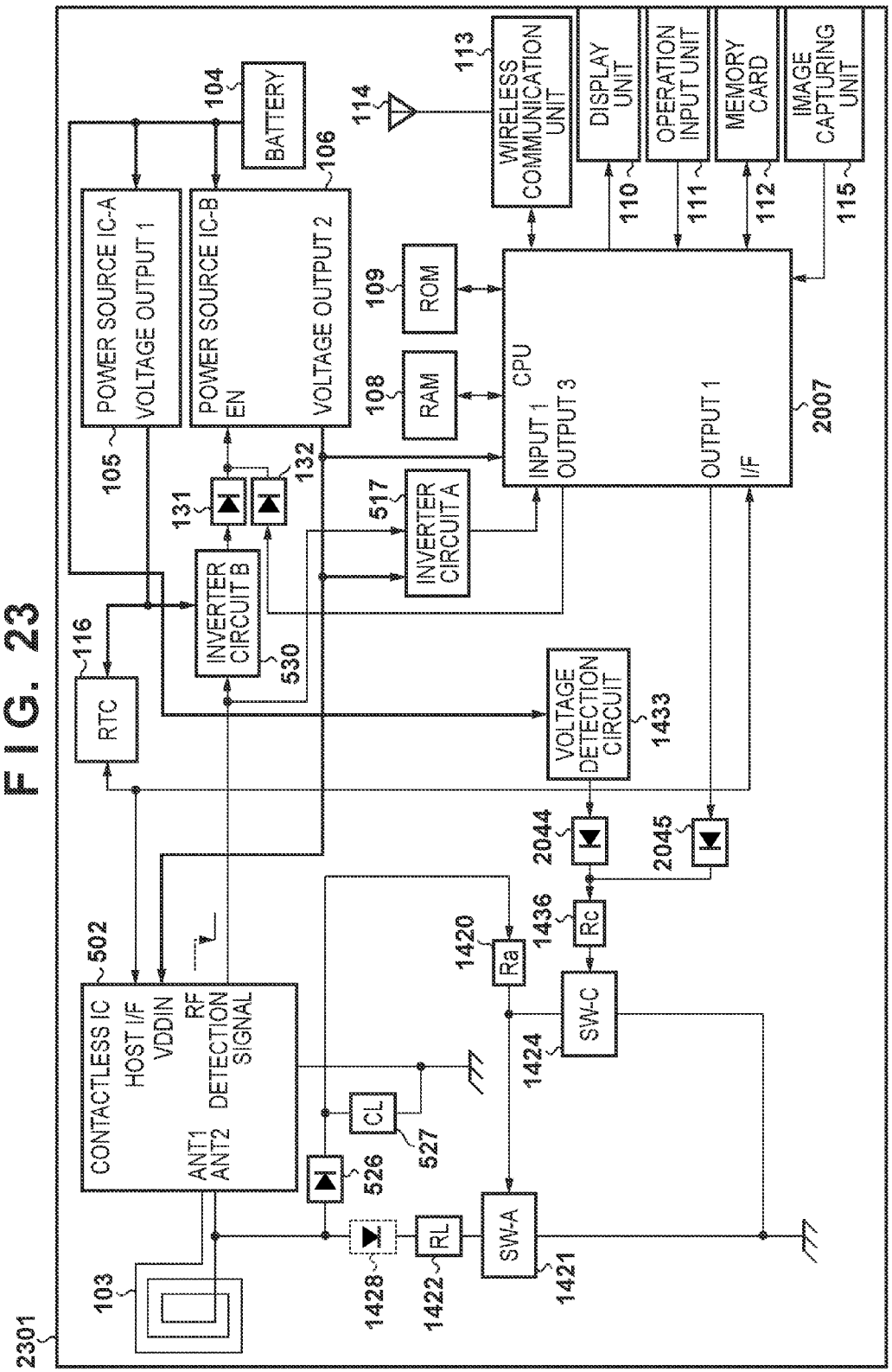
FIG. 23 is a block diagram showing a configuration example 2 of peripheral circuits of a contactless IC 502 of a wireless communication apparatus 2301 according to the fourth embodiment.

FIG. 23 is a block diagram showing the configuration example 2 of peripheral circuits of a contactless IC 502 of a wireless communication apparatus 2301 according to the fourth embodiment. In FIG. 23, the same reference numerals are given to constituent elements that are the same as or similar to those in the configuration example 1 of FIG. 20. Also, the same reference numerals are given to constituent elements that are the same as or similar to those in the configuration example 2 of the third embodiment (FIG. 17). Hereinafter, differences from the configuration example 1 will be mainly described.

When the contactless IC 502 receives electromagnetic waves from the outside, the electric current is generated in the antenna 103, and the electric current is rectified by the diode 526. The rectified electric current drives the SW-A 1421 via the Ra 1420, and the SW-A 1421 is turned on. A CL 527 is the capacitor, and is disposed for compensating driving of the SW-A 1421. The SW-A 1421 is connected to the antenna 103 for the contactless IC 502 via the RL 1422, and the antenna 103 is shunted to ground via the RL 1422 and the SW-A 1421 if the SW-A 1421 is ON.

When the antenna 103 is shunted to ground, the electric current generated in the antenna 103 due to the electromagnetic waves from the outside flows to the ground side. As a result of the electric current generated in the antenna 103 flowing in the ground side, modulation/demodulation for wireless communication in the contactless IC 502 is prevented, and the power required to perform wireless communication cannot be maintained, as a result of which the wireless communication operation is stopped. In order to reliably prevent the modulation/demodulation for wireless communication, it is desirable that the RL 1422 and the SW-A 1421 are connected to an antenna terminal on the side to which the load that is used to perform wireless communication load modulation in the contactless IC 502 is connected so as to extract the electric current of the antenna 103.

The configuration example 2 of FIG. 23 and the configuration example 1 of FIG. 20 are the same in that they have the SW-A 1421, the SW-C 1424, and the voltage detection circuit 1433. Therefore, also in the configuration example 2, the wireless communication operation of the contactless IC 502 can be selectively "disabled" or "enabled" depending on the control of the CPU 2007 and the output state of the voltage detection circuit 1433. The table of truth values of FIG. 21 and the flowchart of FIG. 22 can also be applied to the configuration example 2.

Configuration Example 3 of Fourth Embodiment

FIG. 24 is a block diagram showing the configuration example 3 of peripheral circuits of a contactless IC 602 of a wireless communication apparatus 2401 according to the fourth embodiment. In FIG. 24, the same reference numerals are given to constituent elements that are the same as or similar to those in the configuration example 1 of FIG. 20. Also, the same reference numerals are given to constituent elements that are the same as or similar to those in the configuration example 3 of the third embodiment (FIG. 18). Hereinafter, differences from the configuration example 1 will be mainly described.

The contactless IC 602 outputs the voltage to the VDD terminal upon receiving electromagnetic waves and communication from the outside. The signal generated by the voltage that is output to the VDD terminal drives the SW-A 1421 via the Ra 1420, and the SW-A 1421 is turned on. The SW-A 1421 is connected to the antenna 103 for the contactless IC 602 via the RL 1422, and the antenna 103 is shunted to ground via the RL 1422 and the SW-A 1421 if the SW-A 1421 is ON.

When the antenna 103 is shunted to ground, the electric current generated in the antenna 103 due to the electromagnetic waves from the outside flows to the ground side. As a result of the electric current generated in the antenna 103 flowing in the ground side, modulation/demodulation for wireless communication in the contactless IC 602 is prevented, and the power required to perform wireless communication cannot be maintained, as a result of which the wireless communication operation is stopped. In order to reliably prevent the modulation/demodulation for wireless communication, it is desirable that the RL 1422 and the SW-A 1421 are connected to an antenna terminal on the side to which the load that is used to perform wireless communication load modulation in the contactless IC 602 is connected so as to extract the electric current of the antenna 103.

The configuration example 3 of FIG. 24 and the configuration example 1 of FIG. 20 are the same in that they have the SW-A 1421, the SW-C 1424, and the voltage detection circuit 1433. Therefore, also in the configuration example 3, the wireless communication operation of the contactless IC 602 can be selectively "disabled" or "enabled" depending on the control of the CPU 2007 and the output state of the voltage detection circuit 1433. The table of truth values of FIG. 21 and the flowchart of FIG. 22 can also be applied to the configuration example 3.

Configuration Example 4 of Fourth Embodiment

Figure 25:
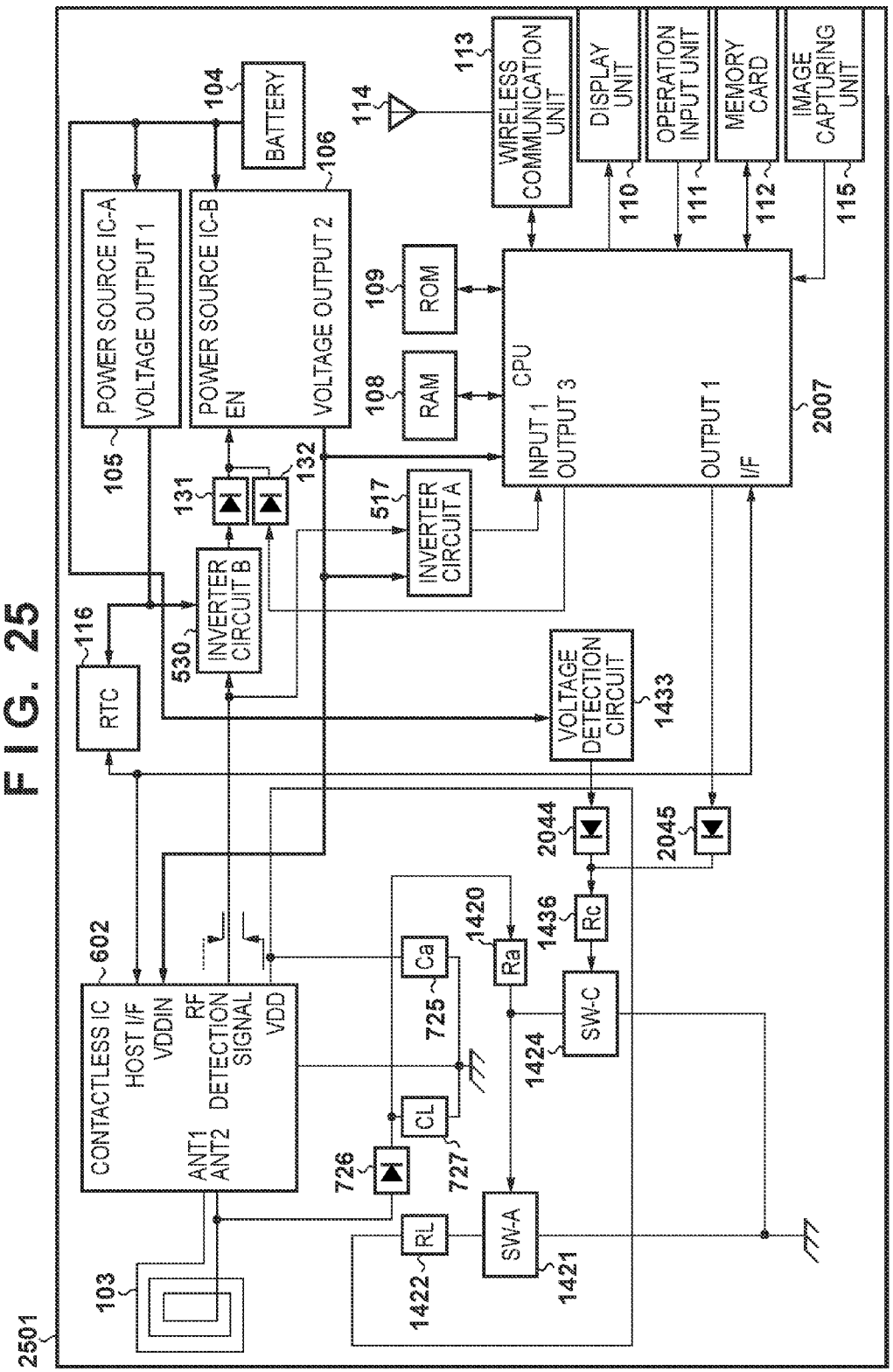
FIG. 25 is a block diagram showing a configuration example 4 of peripheral circuits of a contactless IC 602 of a wireless communication apparatus 2501 according to the fourth embodiment.

FIG. 25 is a block diagram showing the configuration example 4 of peripheral circuits of a contactless IC 602 of a wireless communication apparatus 2501 according to the fourth embodiment. In FIG. 25, the same reference numerals are given to constituent elements that are the same as or similar to those in the configuration example 1 of FIG. 20. Also, the same reference numerals are given to constituent elements that are the same as or similar to those in the configuration example 4 of the third embodiment (FIG. 19). Hereinafter, differences from the configuration example 1 will be mainly described.

When the contactless IC 602 receives electromagnetic waves and communication from the outside, the electric current is generated in the antenna 103, and the electric current is rectified by the diode 726. The rectified electric current drives the SW-A 1421 via the Ra 1420, and the SW-A 1421 is turned on. A CL 727 is the capacitor, and is disposed for compensating driving of the SW-A 1421. The SW-A 1421 is connected to the VDD terminal of the contactless IC 602 via the RL 1422, and the VDD terminal of the contactless IC 602 is shunted to ground via the RL 1422 and the SW-A 1421.

If the VDD terminal of the contactless IC 602 is shunted to ground, the voltage required to perform wireless communication cannot be accumulated in the VDD terminal of the contactless IC 602 due to the electromagnetic waves from the outside, and the power required to perform wireless communication cannot be maintained, as a result of which the wireless communication operation is stopped.

The configuration example 4 of FIG. 25 and the configuration example 1 of FIG. 20 are the same in that they have the SW-A 1421, the SW-C 1424, and the voltage detection circuit 1433. Therefore, also in the configuration example 4, the wireless communication operation of the contactless IC 602 can be selectively "disabled" or "enabled" depending on the control of the CPU 2007 and the output state of the voltage detection circuit 1433. The table of truth values of FIG. 21 and the flowchart of FIG. 22 can also be applied to the configuration example 4.

The four configuration examples of the fourth embodiment have been described above. The configuration of the fourth embodiment is as follows when described in general terms. The contactless IC and the peripheral circuits configure a closed loop circuit such that in the case of receiving electromagnetic waves and communication from the outside, the wireless communication operation of the contactless IC is deactivated using the electromagnetic waves and communication as a trigger. Moreover, the peripheral circuits further include a configuration for releasing the closed loop circuit. In the fourth embodiment, release of the closed loop circuit is controlled by the output of the CPU and the output of the voltage detection circuit.

Fifth Embodiment

The above embodiments have described configurations in which the antenna of a contactless IC is shunted to ground via a switch, allowing the electric current to flow to the ground side, thereby deactivating the power supply to the contactless IC and stopping the wireless communication operation.

In contrast, a fifth embodiment will describe a case where the wireless communication operation of the contactless IC is stopped by a different means from in the above-described embodiments, taking the presence of wireless power supply with the contactless IC into account.

In recent years, as a means for charging a secondary battery of an electronic device, wireless power supply for performing charging in the main body of an electronic device upon receiving power supply with electromagnetic waves has become commonly used. In wireless power supply, power is transmitted and received by an antenna of a power reception apparatus, which is on the power reception side, receiving the electromagnetic waves emitted from an antenna of a power transmission apparatus, which is on the power transmission side. In general, a method for safely controlling power transmission and reception involves the power transmission apparatus and the power reception apparatus first acquiring information on power transmission and reception from each other by communication therebetween, and then transmitting and receiving power of an amount determined by the communication.

There are various frequencies (carrier frequencies) of electromagnetic waves used in such wireless power supply, and a wireless power supply method in which 6.78 MHz or 13.56 MHz in HF bands is used as the carrier frequencies for wireless power has been proposed. The carrier frequencies of this wireless power supply overlap with 13.56 MHz, which is the carrier frequency of a contactless IC function that is widely available. Therefore, it is necessary to perform designing taking influences of overload, heat generation, and the like resulting from electromagnetic waves emitted from an antenna of a power transmission apparatus on the contactless IC function of a wireless communication apparatus into consideration. For example, it is necessary to configure a circuit with components that achieve an increase in temperature of a component located in an electric current path and meet ratings, and thus the degree of freedom of designing a product decreases.

In view of this, in the fifth embodiment, the resonance frequencies of the antenna of the contactless IC are changed to frequencies different from electromagnetic waves from the outside. Accordingly, generation of an electric current of the antenna generated by electromagnetic waves from the outside is reduced. As a result, it is possible to deactivate power supply to the contactless IC, stop the wireless communication operation, and prevent the influence from electromagnetic waves of a power supply apparatus.

Hereinafter, three circuit configuration examples (configuration examples 1 to 3) that correspond to functions of the contactless IC in the present embodiment will be described in order. It is assumed that in the fifth embodiment, wireless communication of the contactless IC supports the international standard ISO/IEC 21481.

Also, an antenna 152 of a wireless communication apparatus 151 shown in FIG. 26 may be an antenna of a contactless IC reader/writer, or if the wireless communication apparatus 151 has a wireless power supply function, may be an antenna used in wireless power supply in HF bands.

It should be noted that in the following, description and illustration of blocks that are not necessary for describing the present embodiment and blocks that have already been described in the first embodiment to the fourth embodiment will be omitted.

Configuration Example 1 of Fifth Embodiment

Figure 27A:
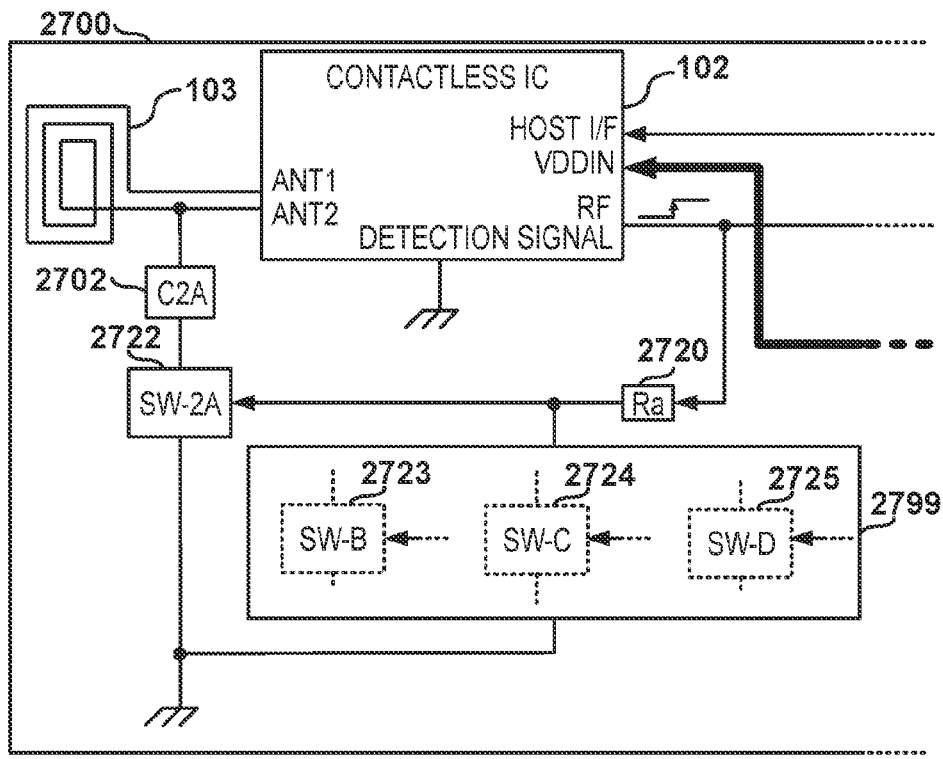
FIG. 27A is a block diagram showing a configuration example 1 of peripheral circuits of the contactless IC 102 of a wireless communication apparatus 2700 according to a fifth embodiment.

FIG. 27A is a block diagram showing a configuration example 1 of peripheral circuits of the contactless IC 102 of a wireless communication apparatus 2700 according to the fifth embodiment. In FIG. 27A, the same reference numerals are given to constituent elements that are the same as or similar to those in the configuration example 1 (FIG. 1) of the first embodiment.

An Ra 2720 is a resistor, a C2A 2702 is a capacitor, and an SW-2A 2722 is a switch. An input terminal for turning on/off the SW-2A 2722 (first switch) is connected to the output terminal (signal output terminal) for an RF detection signal of the contactless IC 102 via the Ra 2720. The SW-2A 2722 may be any element that is in a conduction state when on and that is in a high impedance state when off by control of the on/off input terminal, such as a PIN diode, a transistor, and a MEMS switch.

Also, an SW-B 2723, an SW-C 2724, an SW-D 2725 are switches, and any one of circuits described in the first embodiment to the fourth embodiment can be adopted in a circuit 2799 that includes these switches SW-B 2723, SW-C 2724, and SW-D 2725. That is, the connection terminals and on/off input terminals for the SW-B 2723 (second switch), the SW-C 2724 (third switch), and the SW-D 2725 (fourth switch) are connected to connection destinations corresponding to an adopted circuit of the circuits of the first to fourth embodiments.

The SW-B 2723, the SW-C 2724, and the SW-D 2725 may be elements that are in a conduction state when on and that are in a high impedance state when off by the control of the on/off input terminals, such as an NPN transistor or an NchMOSFET.

The circuit 2799, the SW-B 2723, the SW-C 2724, and the SW-D 2725 are also similar to those in the configuration examples 2 and 3 of the fifth embodiment, and embodiments 6 to 8, which will be described later.

Operations performed in a case in which the contactless IC 102 receives electromagnetic waves from the contactless IC reader/writer and the wireless power supply apparatus will be described.

Upon receiving electromagnetic waves from the outside, the contactless IC 102 outputs a positive logic RF detection signal. The RF detection signal drives the SW-2A 2722 via the Ra 2720, and the SW-2A 2722 is turned on. The SW-2A 2722 is connected to the antenna 103 of the contactless IC 102 via the C2A 2702, and if the SW-2A 2722 is on, the antenna 103 is connected to ground via the C2A 2702 and the SW-2A 2722.

When the antenna 103 is connected to ground via the C2A 2702, an equivalent resonance circuit of the antenna 103 has a configuration in which in addition to inductance and capacitor components of the antenna 103, a capacitor C2A 2702 is added to ground. Accordingly, a resonance frequency and a Q value of the antenna 103 change to different values from before the capacitor C2A 2702 is added.

Q is an abbreviation of "Quality Factor" expressing the sharpness of a resonance peak.

It should be noted that it is assumed that the resonance frequency of the antenna 103 that has changed due to the addition of the capacitor C2A 2702 is a frequency that is lower than a fundamental frequency of electromagnetic waves from the contactless IC reader/writer and the wireless power supply apparatus, for example.

Also, it is assumed that the Q value of the antenna 103 that has changed due to the addition of the capacitor C2A 2702 is a Q value that is lower than before the change.

Change in the resonance frequency and a Q value of the antenna 103 reduces the electric current generated in the antenna 103 by the electromagnetic waves from the outside, and the contactless IC 102 cannot maintain the power required for the wireless communication operation, as a result of which the wireless communication operation stops.

In order to allow the contactless IC 102 to perform the wireless communication operation, the following operation is performed. The SW-2A 2722 is controlled to be turned off by driving and turning on any one of the SW-B 2723, the SW-C 2724, and the SW-D 2725, and shunting the RF detection signal driving the SW-2A 2722 to ground via the Ra 2720.

Configuration Example 2 of Fifth Embodiment

Figure 27B:
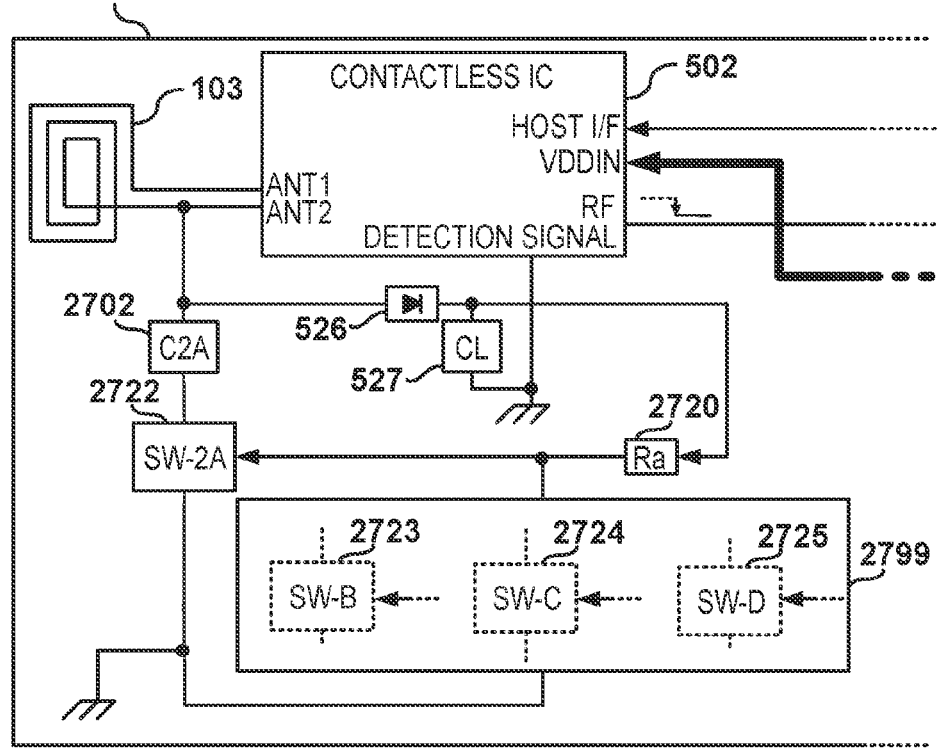
FIG. 27B is a block diagram showing a configuration example 2 of peripheral circuits of the contactless IC 502 of a wireless communication apparatus 2801 according to the fifth embodiment.

FIG. 27B is a block diagram showing a configuration example 2 of peripheral circuits of the contactless IC 502 of a wireless communication apparatus 2801 according to the fifth embodiment. In FIG. 27B, the same reference numerals are given to constituent elements that are the same as or similar to those in the configuration example 2 (FIG. 5) of the first embodiment and FIG. 27A.

An Ra 2720 is a resistor, a C2A 2702 is a capacitor, and an SW-2A 2722, an SW-B 2723, an SW-C 2724, an SW-D 2725 are switches. An input terminal for turning on/off the SW-2A 2722 is connected to the antenna 103 of the contactless IC 502 via the Ra 2720 and a diode 526. Any one of circuits described in the first embodiment to the fourth embodiment can be adopted in a circuit 2799 that includes the switches SW-B 2723, SW-C 2724, and SW-D 2725.

Operations performed in a case in which the contactless IC 502 receives electromagnetic waves from the contactless IC reader/writer and the wireless power supply apparatus will be described.

When the contactless IC 502 receives electromagnetic waves from the outside, an electric current is generated in the antenna 103, and the electric current is rectified by the diode 526. The rectified electric current drives the SW-2A 2722 via the Ra 2720, and the SW-2A 2722 is turned on.

A CL 527 is a capacitor, and a rectifier circuit is configured by the diode 526 and the capacitor CL 527, and the CL 527 is disposed for compensating driving of the SW-2A 2722 with the capacity of the CL 527.

The SW-2A 2722 is connected to the antenna 103 of the contactless IC 502 via the C2A 2702, and if the SW-2A 2722 is on, the antenna 103 is connected to ground via the C2A 2702 and the SW-2A 2722.

When the antenna 103 is connected to ground via the C2A 2702, an equivalent resonance circuit of the antenna 103 has a configuration in which in addition to inductance and capacitor components of the antenna 103, a capacitor C2A 2702 is added to ground. Accordingly, a resonance frequency and a Q value of the antenna 103 change to different values from before the capacitor C2A 2702 is added.

It should be noted that it is assumed that the resonance frequency of the antenna 103 that has changed due to the addition of the capacitor C2A 2702 is a frequency that is lower than a fundamental frequency of electromagnetic waves from the contactless IC reader/writer and the wireless power supply apparatus, for example.

Also, it is assumed that the Q value of the antenna 103 that has changed due to the addition of the capacitor C2A 2702 is a Q value that is lower than before the change.

Change in the resonance frequency and a Q value of the antenna 103 reduces the electric current generated in the antenna 103 by the electromagnetic waves from the outside, and the contactless IC 502 cannot maintain the power required for the wireless communication operation, as a result of which the wireless communication operation stops.

In order to allow the contactless IC 502 to perform the wireless communication operation, the following operation is performed. The SW-2A 2722 is controlled to be turned off by driving and turning on any one of the SW-B 2723, the SW-C 2724, and the SW-D 2725, and shunting the RF detection signal driving the SW-2A 2722 to ground via the Ra 2720.

Configuration Example 3 of Fifth Embodiment

FIG. 28 is a block diagram showing a configuration example 3 of peripheral circuits of the contactless IC 602 of a wireless communication apparatus 2901 according to the fifth embodiment. In FIG. 28, the same reference numerals are given to constituent elements that are the same as or similar to those in the configuration example 3 (FIG. 6) of the first embodiment.

An Ra 2720 is a resistor, a C2A 2702 is a capacitor, and an SW-2A 2722, an SW-B 2723, an SW-C 2724, and an SW-D 2725 are switches. An input terminal for turning on/off the SW-2A 2722 is connected to a VDD terminal (power output terminal) of the contactless IC 602 via the Ra 2720. Any one of circuits described in the first embodiment to the fourth embodiment can be adopted in a circuit 2799 that includes the switches SW-B 2723, SW-C 2724, and SW-D 2725.

Operations performed in a case in which the contactless IC 602 receives electromagnetic waves from the contactless IC reader/writer and the wireless power supply apparatus will be described.

Upon receiving electromagnetic waves from the outside, the contactless IC 602 outputs a voltage to the VDD terminal. A signal resulting from a voltage output to the VDD terminal drives the SW-2A 2722 via the Ra 2720, and the SW-2A 2722 is turned on. The SW-2A 2722 is connected to the antenna 103 of the contactless IC 602 via the C2A 2702, and if the SW-2A 2722 is on, the antenna 103 is connected to ground via the C2A 2702 and the SW-2A 2722.

When the antenna 103 is connected to ground via the C2A 2702, an equivalent resonance circuit of the antenna 103 has a configuration in which in addition to inductance and capacitor components of the antenna 103, a capacitor C2A 2702 is added to ground. Accordingly, a resonance frequency and a Q value of the antenna 103 change to different values from before the capacitor C2A 2702 is added.

It should be noted that it is assumed that the resonance frequency of the antenna 103 that has changed due to the addition of the capacitor C2A 2702 is a frequency that is lower than a fundamental frequency of electromagnetic waves from the contactless IC reader/writer and the wireless power supply apparatus, for example.

Also, it is assumed that the Q value of the antenna 103 that has changed due to the addition of the capacitor C2A 2702 is a Q value that is lower than before the change.

Change in the resonance frequency and a Q value of the antenna 103 reduces the electric current generated in the antenna 103 by the electromagnetic waves from the outside, and the contactless IC 602 cannot maintain the power required for the wireless communication operation, as a result of which the wireless communication operation stops.

In order to allow the contactless IC 602 to perform the wireless communication operation, the following operation is performed. The SW-2A 2722 is controlled to be turned off by driving and turning on any one of the SW-B 2723, the SW-C 2724, and the SW-D 2725, and shunting the signal of the VDD terminal driving the SW-2A 2722 to ground via the Ra 2720.

Three configuration examples of the fifth embodiment have been described above. In the present embodiment, the contactless IC and the peripheral circuits configure a closed loop circuit in which, in the case of receiving electromagnetic waves of wireless communication or wireless power supply from the outside, the resonance frequency of the antenna of the contactless IC is changed using the electromagnetic waves as a trigger, and power supply to the contactless IC is deactivated. As a result, the resonance frequency and the Q value of the antenna of the contactless IC change due to the electromagnetic waves from the outside, and the electric current that is generated by the electromagnetic waves from the outside and flows through the antenna is reduced. Accordingly, temperature of components is unlikely to increase, and it becomes possible to configure circuits with components that have a smaller size and a lower rating.

Sixth Embodiment

In a sixth embodiment, a configuration in which the power supply to the contactless IC is deactivated and the wireless communication operation is stopped by connecting the antenna terminals of the contactless IC via a capacitor, changing the resonance frequency of the antenna, and reducing the electric current generated in the antenna will be described.

In the sixth embodiment, three circuit configuration examples (configuration examples 1 to 3) that correspond to functions of the contactless IC will be described in order. It is assumed that in the sixth embodiment, wireless communication of the contactless IC supports the international standard ISO/IEC 21481.

Also, an antenna 152 of a wireless communication apparatus 151 shown in FIG. 26 may be an antenna of a contactless IC reader/writer, or if the wireless communication apparatus 151 has a wireless power supply function, may be an antenna used in wireless power supply in HF bands.

It should be noted that in the following, description and illustration of blocks that are not necessary for describing the present embodiment and blocks that have already been described in the first embodiment to the fourth embodiment will be omitted.

Configuration Example 1 of Sixth Embodiment

Figure 29A:
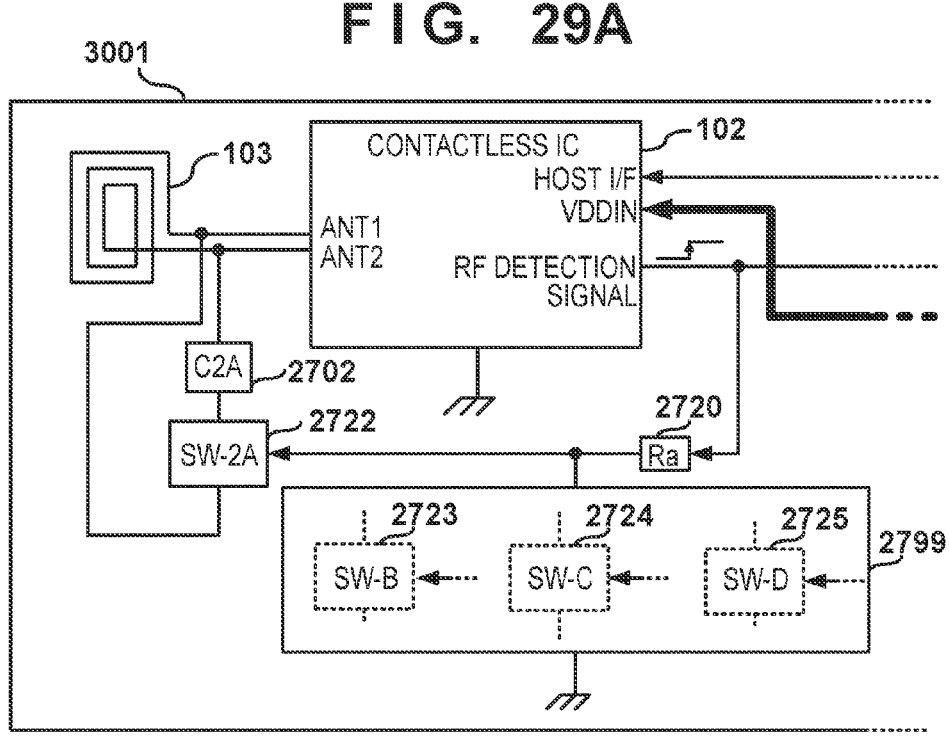
FIG. 29A is a block diagram showing a configuration example 1 of peripheral circuits of the contactless IC 102 of a wireless communication apparatus 3001 according to a sixth embodiment.

FIG. 29A is a block diagram showing a configuration example 1 of peripheral circuits of the contactless IC 102 of a wireless communication apparatus 3001 according to the sixth embodiment. In FIG. 29A, the same reference numerals are given to constituent elements that are the same as or similar to those in the configuration example 1 (FIG. 1) of the first embodiment.

An Ra 2720 is a resistor, a C2A 2702 is a capacitor, and an SW-2A 2722 is a switch.

An input terminal for turning on/off the SW-2A 2722 (first switch) is connected to the terminal for outputting a RF detection signal (signal output terminal) of the contactless IC 102 via the Ra 2720.

Also, an SW-B 2723, an SW-C 2724, an SW-D 2725 are switches, and any one of circuits described in the first embodiment to the fourth embodiment can be adopted in a circuit 2799 that includes these switches SW-B 2723, SW-C 2724, and SW-D 2725.

Operations performed in a case in which the contactless IC 102 receives electromagnetic waves from the contactless IC reader/writer and the wireless power supply apparatus will be described.

Upon receiving electromagnetic waves from the outside, the contactless IC 102 outputs a positive logic RF detection signal. The RF detection signal drives the SW-2A 2722 via the Ra 2720, and the SW-2A 2722 is turned on. The SW-2A 2722 is connected to one terminal of the antenna 103 of the contactless IC 102 via the C2A 2702, and the other terminal of the SW-2A 2722 is connected to the other terminal of the antenna 103 of the contactless IC 102.

If the SW-2A 2722 is on, one of the terminals of the antenna 103 is connected to the other terminal of the antenna 103 via the C2A 2702 and the SW-2A 2722. If the terminals of the antenna 103 are connected to each other via the C2A 2702, the equivalent resonance circuit of the antenna 103 has a configuration in which in addition to inductance and capacitor components of the antenna 103, the capacitor C2A 2702 is added in parallel. Accordingly, a resonance frequency and a Q value of the antenna 103 change to different values from before the capacitor C2A 2702 is added.

Q is an abbreviation of "Quality Factor" expressing the sharpness of a resonance peak.

It should be noted that it is assumed that the resonance frequency of the antenna 103 that has changed due to the addition of the capacitor C2A 2702 is a frequency that is lower than a fundamental frequency of electromagnetic waves from the contactless IC reader/writer and the wireless power supply apparatus, for example.

Also, it is assumed that the Q value of the antenna 103 that has changed due to the addition of the capacitor C2A 2702 is a Q value that is lower than before the change.

Change in the resonance frequency and a Q value of the antenna 103 reduces the electric current generated in the antenna 103 by the electromagnetic waves from the outside, and the contactless IC 102 cannot maintain the power required for the wireless communication operation, as a result of which the wireless communication operation stops.

In order to allow the contactless IC 102 to perform the wireless communication operation, the following operation is performed. The SW-2A 2722 is controlled to be turned off by driving and turning on any one of the SW-B 2723, the SW-C 2724, and the SW-D 2725, and shunting the RF detection signal driving the SW-2A 2722 to ground via the Ra 2720.

Configuration Example 2 of Sixth Embodiment

Figure 29B:
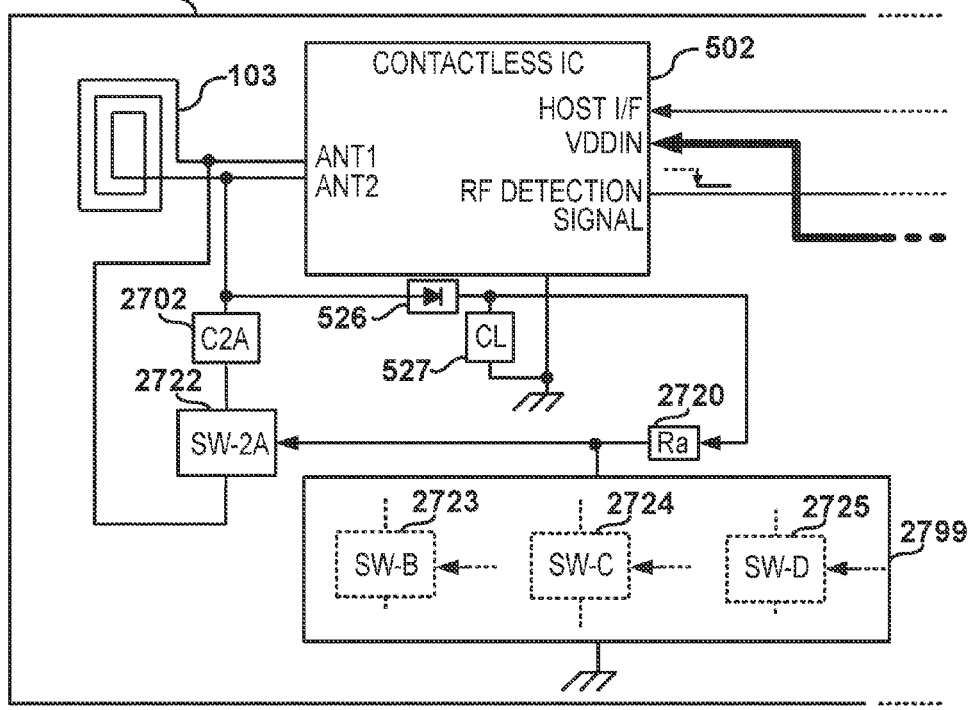
FIG. 29B is a block diagram showing a configuration example 2 of peripheral circuits of a contactless IC 502 of a wireless communication apparatus 3101 according to the sixth embodiment.

FIG. 29B is a block diagram showing a configuration example 2 of peripheral circuits of the contactless IC 502 of a wireless communication apparatus 3101 according to the sixth embodiment. In FIG. 29B, the same reference numerals are given to constituent elements that are the same as or similar to those in the configuration example 2 (FIG. 5) of the first embodiment.

An Ra 2720 is a resistor, a C2A 2702 is a capacitor, and an SW-2A 2722 is a switch.

An input terminal for turning on/off the SW-2A 2722 (first switch) is connected to the antenna 103 of the contactless IC 502 via the Ra 2720 and the diode 526.

Also, an SW-B 2723, an SW-C 2724, an SW-D 2725 are switches, and any one of circuits described in the first embodiment to the fourth embodiment can be adopted in a circuit 2799 that includes these switches SW-B 2723, SW-C 2724, and SW-D 2725.

Operations performed in a case in which the contactless IC 502 receives electromagnetic waves from the contactless IC reader/writer and the wireless power supply apparatus will be described.

When the contactless IC 502 receives electromagnetic waves from the outside, an electric current is generated in the antenna 103, and the electric current is rectified by the diode 526. The rectified electric current drives the SW-2A 2722 via the Ra 2720, and the SW-2A 2722 is turned on.

A CL 527 is a capacitor, a rectifier circuit is configured by the diode 526 and the capacitor CL 527, and the CL 527 is disposed for compensating driving of the SW-2A 2722 with the capacity of the CL 527.

The SW-2A 2722 is connected to one terminal of the antenna 103 of the contactless IC 502 via the C2A 2702, and the other terminal of the SW-2A 2722 is connected to the other terminal of the antenna 103 of the contactless IC 502.

If the SW-2A 2722 is on, one of the terminals of the antenna 103 is connected to the other terminal of the antenna 103 via the C2A 2702 and the SW-2A 2722.

If the terminals of the antenna 103 are connected to each other via the C2A 2702, the equivalent resonance circuit of the antenna 103 has a configuration in which in addition to inductance and capacitor components of the antenna 103, the capacitor C2A 2702 is added in parallel. Accordingly, a resonance frequency and a Q value of the antenna 103 change to different values from before the capacitor C2A 2702 is added.

It should be noted that it is assumed that the resonance frequency of the antenna 103 that has changed due to the addition of the capacitor C2A 2702 is a frequency that is lower than a fundamental frequency of electromagnetic waves from the contactless IC reader/writer and the wireless power supply apparatus, for example.

Also, it is assumed that the Q value of the antenna 103 that has changed due to the addition of the capacitor C2A 2702 is a Q value that is lower than before the change.

Change in the resonance frequency and a Q value of the antenna 103 reduces the electric current generated in the antenna 103 by the electromagnetic waves from the outside, and the contactless IC 502 cannot maintain the power required for the wireless communication operation, as a result of which the wireless communication operation stops.

In order to allow the contactless IC 502 to perform the wireless communication operation, the following operation is performed. The SW-2A 2722 is controlled to be turned off by driving and turning on any one of the SW-B 2723, the SW-C 2724, and the SW-D 2725, and shunting the RF detection signal driving the SW-2A 2722 to ground via the Ra 2720.

Configuration Example 3 of Sixth Embodiment

FIG. 30 is a block diagram showing a configuration example 3 of peripheral circuits of the contactless IC 602 of a wireless communication apparatus 3201 according to the sixth embodiment. In FIG. 30, the same reference numerals are given to constituent elements that are the same as or similar to those in the configuration example 3 (FIG. 6) of the first embodiment.

An Ra 2720 is a resistor, a C2A 2702 is a capacitor, and an SW-2A 2722 is a switch.

An input terminal for turning on/off the SW-2A 2722 (first switch) is connected to a VDD terminal (power output terminal) of the contactless IC 602 via the Ra 2720.

Also, an SW-B 2723, an SW-C 2724, and an SW-D 2725 are switches, and any one of circuits described in the first embodiment to the fourth embodiment can be adopted in a circuit 2799 that includes these switches SW-B 2723, SW-C 2724, and SW-D 2725.

Operations performed in a case in which the contactless IC 602 receives electromagnetic waves from the contactless IC reader/writer and the wireless power supply apparatus will be described.

Upon receiving electromagnetic waves from the outside, the contactless IC 602 outputs a voltage to the VDD terminal. A signal resulting from a voltage output to the VDD terminal drives the SW-2A 2722 via the Ra 2720, and the SW-2A 2722 is turned on.

The SW-2A 2722 is connected to one terminal of the antenna 103 of the contactless IC 602 via the C2A 2702, and the other terminal of the SW-2A 2722 is connected to the other terminal of the antenna 103 of the contactless IC 602.

If the SW-2A 2722 is on, one of the terminals of the antenna 103 is connected to the other terminal of the antenna 103 via the C2A 2702 and the SW-2A 2722.

If the terminals of the antenna 103 are connected to each other via the C2A 2702, the equivalent resonance circuit of the antenna 103 has a configuration in which in addition to inductance and capacitor components of the antenna 103, the capacitor C2A 2702 is added in parallel. Accordingly, a resonance frequency and a Q value of the antenna 103 change to different values from before the capacitor C2A 2702 is added.

It should be noted that it is assumed that the resonance frequency of the antenna 103 that has changed due to the addition of the capacitor C2A 2702 is a frequency that is lower than a fundamental frequency of electromagnetic waves from the contactless IC reader/writer and the wireless power supply apparatus, for example.

Also, it is assumed that the Q value of the antenna 103 that has changed due to the addition of the capacitor C2A 2702 is a Q value that is lower than before the change.

Change in the resonance frequency and a Q value of the antenna 103 reduces the electric current generated in the antenna 103 by the electromagnetic waves from the outside, and the contactless IC 602 cannot maintain the power required for the wireless communication operation, as a result of which the wireless communication operation stops.

In order to allow the contactless IC 602 to perform the wireless communication operation, the following operation is performed. The SW-2A 2722 is controlled to be turned off by driving and turning on any one of the SW-B 2723, the SW-C 2724, and the SW-D 2725, and shunting the signal of the VDD terminal driving the SW-2A 2722 to ground via the Ra 2720.

Three configuration examples of the sixth embodiment have been described above. In the present embodiment, the contactless IC and the peripheral circuits configure a closed loop circuit in which, in the case of receiving electromagnetic waves of wireless communication or wireless power supply from the outside, the resonance frequency of the antenna of the contactless IC is changed using the electromagnetic waves as a trigger, and power supply to the contactless IC is deactivated. As a result, the resonance frequency and the Q value of the antenna of the contactless IC change due to the electromagnetic waves from the outside, and the electric current that is generated by the electromagnetic waves from the outside and flows through the antenna is reduced. Accordingly, temperature of components is unlikely to increase, and it becomes possible to configure circuits with components that have a smaller size and a lower rating.

Seventh Embodiment

In a seventh embodiment, a configuration in which the power supply to the contactless IC is deactivated and the wireless communication operation is stopped by connecting both terminals of the antenna of the contactless IC to ground via a capacitor, changing the resonance frequency of the antenna, and reducing the electric current generated in the antenna will be described.

In the seventh embodiment, three circuit configuration examples (configuration examples 1 to 3) that correspond to functions of the contactless IC will be described in order. It is assumed that in the seventh embodiment, wireless communication of the contactless IC supports the international standard ISO/IEC 21481.

Also, an antenna 152 of a wireless communication apparatus 151 shown in FIG. 26 may be an antenna of a contactless IC reader/writer, or if the wireless communication apparatus 151 has a wireless power supply function, may be an antenna used in wireless power supply in HF bands.

It should be noted that in the following, description and illustration of blocks that are not necessary for describing the present embodiment and blocks that have already been described in the first embodiment to the fourth embodiment will be omitted.

Configuration Example 1 of Seventh Embodiment

Figure 31A:
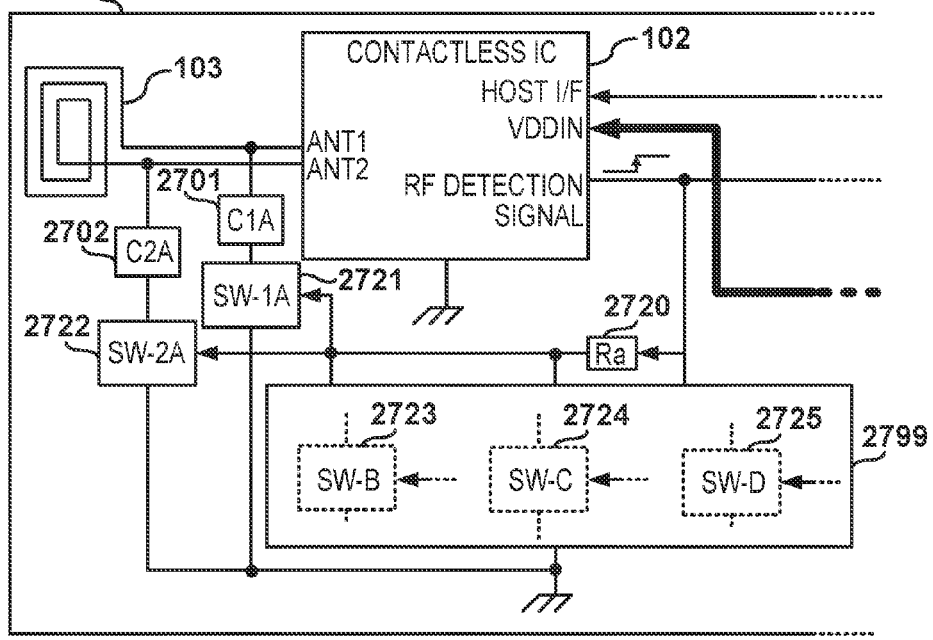
FIG. 31A is a block diagram showing a configuration example 1 of peripheral circuits of the contactless IC 102 of a wireless communication apparatus 3301 according to a seventh embodiment.

FIG. 31A is a block diagram showing a configuration example 1 of peripheral circuits of the contactless IC 102 of a wireless communication apparatus 3301 according to the seventh embodiment. In FIG. 31A, the same reference numerals are given to constituent elements that are the same as or similar to those in the configuration example 1 (FIG. 1) of the first embodiment.

An Ra 2720 is a resistor, a C1A 2701 and a C2A 2702 are capacitors, and an SW-1A 2721 and an SW-2A 2722 are switches. Input terminals for turning on/off the SW-1A 2721 (fifth switch) and the SW-2A 2722 (first switch) are connected to terminals for outputting a RF detection signal (signal output terminal) of the contactless IC 102 via the Ra 2720.

Also, an SW-B 2723, an SW-C 2724, an SW-D 2725 are switches, and any one of circuits described in the first embodiment to the fourth embodiment can be adopted in a circuit 2799 that includes these switches SW-B 2723, SW-C 2724, and SW-D 2725.

The SW-1A 2721 and the SW-2A 2722 may be any elements that are in a conduction state when on and that are in a high impedance state when off by control of the on/off input terminal, such as a PIN diode, a transistor, and a MEMS switch.

The SW-B 2723, the SW-C 2724, and the SW-D 2725 may be elements that are in a conduction state when on and that are in a high impedance state when off by the control of the on/off input terminals, such as an NPN transistor or an NchMOSFET.

Operations performed in a case in which the contactless IC 102 receives electromagnetic waves from the contactless IC reader/writer and the wireless power supply apparatus will be described.

Upon receiving electromagnetic waves from the outside, the contactless IC 102 outputs a positive logic RF detection signal. The RF detection signal drives the SW-1A 2721 and the SW-2A 2722 via the Ra 2720, and the SW-1A 2721 and the SW-2A 2722 are turned on.

The SW-2A 2722 is connected to the antenna 103 of the contactless IC 102 via the C2A 2702, and if the SW-2A 2722 is on, the antenna 103 is connected to ground via the C2A 2702 and the SW-2A 2722.

The SW-1A 2721 is connected to the antenna 103 of the contactless IC 102 via the C1A 2701, and if the SW-1A 2721 is on, the antenna 103 is connected to ground via the C1A 2701 and the SW-1A 2721.

The SW-1A 2721 uses one of the antenna terminals of the contactless IC 102 as a connection point. The SW-2A 2722 uses the other terminal of the antenna 103, which is different from the connection point of the SW-1A 2721, as a connection point.

An operation by which the antenna 103 is connected to ground via the SW-1A 2721 and the C2A 2702 will be described. The equivalent resonance circuit of the antenna 103 has a configuration in which in addition to inductance and capacitor components of the antenna 103, the capacitors C1A 2701 and C2A 2702 are added to ground. Accordingly, a resonance frequency and a Q value of the antenna 103 change to different values from before the capacitors C1A 2701 and C2A 2702 are added.

Compared to the fifth embodiment, in the present embodiment, the capacitor components added to ground can be increased, and the effect of changing the resonance frequency and the Q value is greater than in the fifth embodiment.

Q is an abbreviation of "Quality Factor" expressing the sharpness of a resonance peak.

It should be noted that it is assumed that the resonance frequency of the antenna 103 that has changed due to the addition of the capacitors C1A 2701 and C2A 2702 is a frequency that is lower than a fundamental frequency of electromagnetic waves from the contactless IC reader/writer and the wireless power supply apparatus, for example.

Also, it is assumed that the Q value of the antenna 103 that has changed due to the addition of the capacitors C1A 2701 and C2A 2702 is a Q value that is lower than before the change.

Change in the resonance frequency and a Q value of the antenna 103 reduces the electric current generated in the antenna 103 by the electromagnetic waves from the outside, and the contactless IC 102 cannot maintain the power required for the wireless communication operation, as a result of which the wireless communication operation stops.

In order to allow the contactless IC 102 to perform the wireless communication operation, the following operation is performed. Any one of the SW-B 2723, the SW-C 2724, and the SW-D 2725 is driven and turned on. The SW-1A 2721 and the SW-2A 2722 are controlled to be turned off by shunting the RF detection signal that drives the SW-1A 2721 and the SW-2A 2722 to ground via the Ra 2720.

Configuration Example 2 of Seventh Embodiment

Figure 31B:
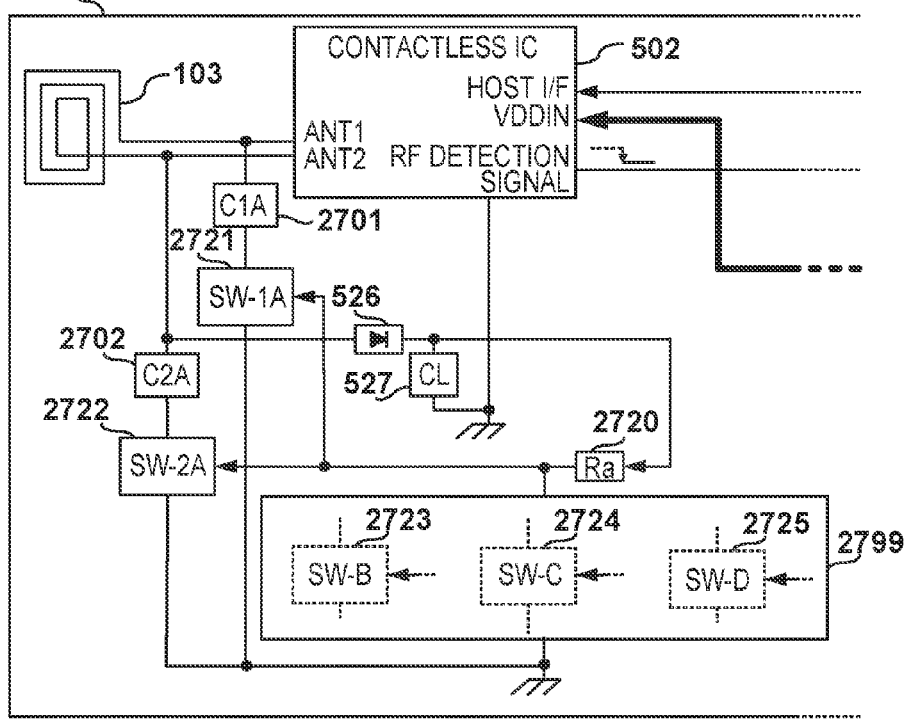
FIG. 31B is a block diagram showing a configuration example 2 of peripheral circuits of the contactless IC 502 of a wireless communication apparatus 3401 according to the seventh embodiment.

FIG. 31B is a block diagram showing a configuration example 2 of peripheral circuits of the contactless IC 502 of a wireless communication apparatus 3401 according to the seventh embodiment. In FIG. 31B, the same reference numerals are given to constituent elements that are the same as or similar to those in the configuration example 2 (FIG. 5) of the first embodiment.

An Ra 2720 is a resistor, a C1A 2701 and a C2A 2702 are capacitors, and an SW-1A 2721 and an SW-2A 2722 are switches.

Input terminals for turning on/off the SW-1A 2721 (fifth switch) and the SW-2A 2722 (first switch) are connected to the antenna 103 of the contactless IC 502 via the Ra 2720 and the diode 526.

Also, an SW-B 2723, an SW-C 2724, an SW-D 2725 are switches, and any one of circuits described in the first embodiment to the fourth embodiment can be adopted in a circuit 2799 that includes these switches SW-B 2723, SW-C 2724, and SW-D 2725.

Operations performed in a case in which the contactless IC 502 receives electromagnetic waves from the contactless IC reader/writer and the wireless power supply apparatus will be described.

When the contactless IC 502 receives electromagnetic waves from the outside, an electric current is generated in the antenna 103, and the electric current is rectified by the diode 526. The rectified electric current drives the SW-1A 2721 and the SW-2A 2722 via the Ra 2720, and the SW-1A 2721 and the SW-2A 2722 are turned on.

A CL 527 is a capacitor, and a rectifier circuit is configured by the diode 526 and the capacitor CL 527, and the CL 527 is disposed for compensating driving of the SW-2A 2722 with the capacity of the CL 527.

The SW-2A 2722 is connected to the antenna 103 of the contactless IC 502 via the C2A 2702, and if the SW-2A 2722 is on, the antenna 103 is connected to ground via the C2A 2702 and the SW-2A 2722.

The SW-1A 2721 is connected to the antenna 103 of the contactless IC 502 via the C1A 2701, and if the SW-1A 2721 is on, the antenna 103 is connected to ground via the C1A 2701 and the SW-1A 2721.

The SW-1A 2721 uses one of the antenna terminals of the contactless IC 502 as a connection point. The SW-2A 2722 uses the other terminal of the antenna 103, which is different from the connection point of the SW-1A 2721, as a connection point.

An operation by which the antenna 103 is connected to ground via the SW-1A 2721 and the C2A 2702 will be described. The equivalent resonance circuit of the antenna 103 has a configuration in which in addition to inductance and capacitor components of the antenna 103, the capacitors C1A 2701 and C2A 2702 are added to ground. Accordingly, a resonance frequency and a Q value of the antenna 103 change to different values from before the capacitors C1A 2701 and C2A 2702 are added.

Compared to the fifth embodiment, in the present embodiment, the capacitor components added to ground can be increased, and the effect of changing the resonance frequency and the Q value is greater than in the fifth embodiment.

It should be noted that it is assumed that the resonance frequency of the antenna 103 that has changed due to the addition of the capacitors C1A 2701 and C2A 2702 is a frequency that is lower than a fundamental frequency of electromagnetic waves from the contactless IC reader/writer and the wireless power supply apparatus, for example.

Also, it is assumed that the Q value of the antenna 103 that has changed due to the addition of the capacitors C1A 2701 and C2A 2702 is a Q value that is lower than before the change.

Change in the resonance frequency and a Q value of the antenna 103 reduces the electric current generated in the antenna 103 by the electromagnetic waves from the outside, and the contactless IC 502 cannot maintain the power required for the wireless communication operation, as a result of which the wireless communication operation stops.

In order to allow the contactless IC 502 to perform the wireless communication operation, the following operation is performed. Any one of the SW-B 2723, the SW-C 2724, and the SW-D 2725 is driven and turned on. The SW-1A 2721 and the SW-2A 2722 are controlled to be turned off by shunting the RF detection signal that drives the SW-1A 2721 and the SW-2A 2722 to ground via the Ra 2720.

Configuration Example 3 of Seventh Embodiment

FIG. 32 is a block diagram showing a configuration example 3 of peripheral circuits of the contactless IC 602 of a wireless communication apparatus 3501 according to the seventh embodiment. In FIG. 32, the same reference numerals are given to constituent elements that are the same as or similar to those in the configuration example 3 (FIG. 6) of the first embodiment.

An Ra 2720 is a resistor, a C1A 2701 and a C2A 2702 are capacitors, and an SW-1A 2721 and an SW-2A 2722 are switches.

Input terminals for turning on/off the SW-1A 2721 (fifth switch) and the SW-2A 2722 (first switch) are connected to a VDD terminal (power output terminal) of the contactless IC 602 via the Ra 2720.

Also, an SW-B 2723, an SW-C 2724, an SW-D 2725 are switches, and any one of circuits described in the first embodiment to the fourth embodiment can be adopted in a circuit 2799 that includes these switches SW-B 2723, SW-C 2724, and SW-D 2725.

Operations performed in a case in which the contactless IC 602 receives electromagnetic waves from the contactless IC reader/writer and the wireless power supply apparatus will be described.

Upon receiving electromagnetic waves from the outside, the contactless IC 602 outputs a voltage to the VDD terminal. The signal resulting from a voltage output to the VDD terminal drives the SW-1A 2721 and the SW-2A 2722 via the Ra 2720, and the SW-1A 2721 and the SW-2A 2722 are turned on.

The SW-2A 2722 is connected to the antenna 103 of the contactless IC 602 via the C2A 2702, and if the SW-2A 2722 is on, the antenna 103 is connected to ground via the C2A 2702 and the SW-2A 2722.

The SW-1A 2721 is connected to the antenna 103 of the contactless IC 602 via the C1A 2701, and if the SW-1A 2721 is on, the antenna 103 is connected to ground via the C1A 2701 and the SW-1A 2721.

The SW-1A 2721 uses one of the antenna terminals of the contactless IC 602 as a connection point. The SW-2A 2722 uses the other terminal of the antenna 103, which is different from the connection point of the SW-1A 2721, as a connection point.

An operation by which the antenna 103 is connected to ground via the SW-1A 2721 and the C2A 2702 will be described. The equivalent resonance circuit of the antenna 103 has a configuration in which in addition to inductance and capacitor components of the antenna 103, the capacitors C1A 2701 and C2A 2702 are added to ground. Accordingly, a resonance frequency and a Q value of the antenna 103 change to different values from before the capacitors C1A 2701 and C2A 2702 are added.

Compared to the fifth embodiment, in the present embodiment, the capacitor components added to ground can be increased, and the effect of changing the resonance frequency and the Q value is greater than in the fifth embodiment. It should be noted that it is assumed that the resonance frequency of the antenna 103 that has changed due to the addition of the capacitors C1A 2701 and C2A 2702 is a frequency that is lower than a fundamental frequency of electromagnetic waves from the contactless IC reader/writer and the wireless power supply apparatus, for example.

Also, it is assumed that the Q value of the antenna 103 that has changed due to the addition of the capacitors C1A 2701 and C2A 2702 is a Q value that is lower than before the change.

Change in the resonance frequency and a Q value of the antenna 103 reduces the electric current generated in the antenna 103 by the electromagnetic waves from the outside, and the contactless IC 602 cannot maintain the power required for the wireless communication operation, as a result of which the wireless communication operation stops.

In order to allow the contactless IC 602 to perform the wireless communication operation, the following operation is performed. Any one of the SW-B 2723, the SW-C 2724, and the SW-D 2725 is driven and turned on. The SW-1A 2721 and the SW-2A 2722 are controlled to be turned off by shunting the signal of the VDD terminal that drives the SW-1A 2721 and the SW-2A 2722 to ground via the Ra 2720.

Three configuration examples of the seventh embodiment have been described above. In the present embodiment, the contactless IC and the peripheral circuits configure a closed loop circuit in which, in the case of receiving electromagnetic waves of wireless communication or wireless power supply from the outside, the resonance frequency of the antenna of the contactless IC is changed using the electromagnetic waves as a trigger, and power supply to the contactless IC is deactivated. As a result, the resonance frequency and the Q value of the antenna of the contactless IC change due to the electromagnetic waves from the outside, and the electric current that is generated by the electromagnetic waves from the outside and flows through the antenna is reduced. Accordingly, temperature of components is unlikely to increase, and it becomes possible to configure circuits with components that have a smaller size and a lower rating.

Eighth Embodiment

In an eighth embodiment, a configuration in which a voltage generated in the antenna of the contactless IC is detected, and if the voltage is greater than or equal to a detection threshold, the power supply to the contactless IC is deactivated and the wireless communication operation is stopped by changing the resonance frequency of the antenna and reducing the electric current generated in the antenna will be described.

In the eighth embodiment, three circuit configuration examples (configuration examples 1 to 3) that correspond to functions of the contactless IC will be described in order. It is assumed that in the eighth embodiment, wireless communication of the contactless IC supports the international standard ISO/IEC 21481. Although the contactless IC configuring the present embodiment can be configured by any one of the contactless IC 102, the contactless IC 502, and the contactless IC 602, for example, description will be given using the contactless IC 502 as a representative example. Also, an antenna 152 of a wireless communication apparatus 151 shown in FIG. 26 may be an antenna of a contactless IC reader/writer, or if the wireless communication apparatus 151 has a wireless power supply function, may be an antenna used in wireless power supply in HF bands.

It should be noted that in the following, description and illustration of blocks that are not necessary for describing the present embodiment and blocks that have already been described in the first embodiment to the fourth embodiment will be omitted.

Configuration Example 1 of Eighth Embodiment

Figure 33A:
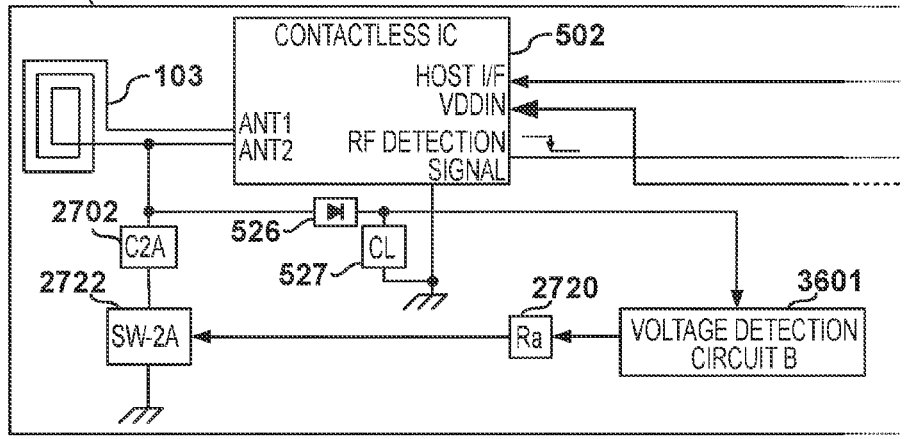
FIG. 33A is a block diagram showing a configuration example 1 of peripheral circuits of the contactless IC 502 of a wireless communication apparatus 3600 according to an eighth embodiment.

FIG. 33A is a block diagram showing a configuration example 1 of peripheral circuits of the contactless IC 502 of a wireless communication apparatus 3600 according to the eighth embodiment. In FIG. 33A, the same reference numerals are given to constituent elements that are the same as or similar to those in the configuration example 2 (FIG. 5) of the first embodiment.

An Ra 2720 is a resistor, a C2A 2702 is a capacitor, and an SW-2A 2722 is a switch.

It is assumed that a voltage detection circuit B 3601 detects a voltage output from a rectifier circuit configured by the diode 526 and the capacitor CL 527, and if the detected voltage is less than a detection voltage threshold Vbt, the voltage detection circuit B 3601 outputs "L", whereas if the detected voltage is greater than or equal to the detection voltage threshold Vbt, outputs "H". It is assumed that a power source of the voltage detection circuit B 3601 is the output of the rectifier circuit configured by the diode 526 and the capacitor CL 527, and the voltage detection circuit B 3601 operates regardless of the operations of the wireless communication apparatus 3600.

It is desirable that the detection voltage threshold Vbt of the voltage detection circuit B 3601 is set such that, for example, a voltage is detected so that the voltage generated in the antenna 103 does not exceed an allowable voltage of the antenna terminal of the contactless IC 502, and "H" is output.

Also, the detection voltage threshold Vbt of the voltage detection circuit B 3601 may be set such that a voltage is detected so that a magnetic field strength in an interface between the inside of the wireless communication apparatus 3600 and the outside at 13.56 MHz does not exceed 7.5 A/m, and "H" is output.

The detection voltage threshold Vbt of the voltage detection circuit B 3601 may be set such that a voltage is detected so that a magnetic field strength or an antenna power that is allowable for a combination of the contactless IC 502 and the antenna 103 is not exceeded, and "H" is output.

The function and configuration of the SW-2A 2722 block itself are the same as those of the configuration example 2 of the fifth embodiment, and thus description thereof is omitted.

An input terminal for turning on/off the SW-2A 2722 (first switch) is connected to the antenna 103 of the contactless IC 502 via the Ra 2720 and the diode 526.

Operations performed in a case in which the contactless IC 502 receives electromagnetic waves from the contactless IC reader/writer and the wireless power supply apparatus will be described.

When the contactless IC 502 receives electromagnetic waves from the outside, an electric current is generated in the antenna 103, the electric current is rectified by the rectifier circuit configured by the diode 526 and the capacitor CL 527, and the voltage generated in the rectifier circuit is input to the voltage detection circuit B 3601.

If the input voltage is less than the detection voltage threshold Vbt, the voltage detection circuit B 3601 outputs "L", a signal output from the voltage detection circuit B 3601 does not drive the SW-2A 2722 via the Ra 2720, and the SW-2A 2722 remains off.

If the input voltage is greater than or equal to the detection voltage threshold Vbt, the voltage detection circuit B 3601 outputs "H", the signal output from the voltage detection circuit B 3601 drives the SW-2A 2722 via the Ra 2720, and the SW-2A 2722 is turned on.

The SW-2A 2722 is connected to the antenna 103 of the contactless IC 502 via the C2A 2702, and if the SW-2A 2722 is on, the antenna 103 is connected to ground via the C2A 2702 and the SW-2A 2722.

When the antenna 103 is connected to ground via the C2A 2702, an equivalent resonance circuit of the antenna 103 has a configuration in which in addition to inductance and capacitor components of the antenna 103, the capacitor C2A 2702 is added to ground. Accordingly, a resonance frequency and a Q value of the antenna 103 change to different values from before the capacitor C2A 2702 is added.

Q is an abbreviation of "Quality Factor" expressing the sharpness of a resonance peak.

It should be noted that it is assumed that the resonance frequency of the antenna 103 that has changed due to the addition of the capacitor C2A 2702 is a frequency that is lower than a fundamental frequency of electromagnetic waves from the contactless IC reader/writer and the wireless power supply apparatus, for example.

Also, it is assumed that the Q value of the antenna 103 that has changed due to the addition of the capacitor C2A 2702 is a Q value that is lower than before the change.

Change in the resonance frequency and a Q value of the antenna 103 reduces the electric current generated in the antenna 103 by the electromagnetic waves from the outside, and the contactless IC 502 cannot maintain the power required for the wireless communication operation, as a result of which the wireless communication operation stops.

In order to allow the contactless IC 502 to perform the wireless communication operation, it is sufficient that an output voltage that is generated in the antenna 103 by electromagnetic waves from the outside and rectified in the rectifier circuit configured by the diode 526 and the capacitor CL 527 is less than the detection voltage threshold Vbt of the voltage detection circuit B 3601.

Configuration Example 2 of Eighth Embodiment

Figure 33B:
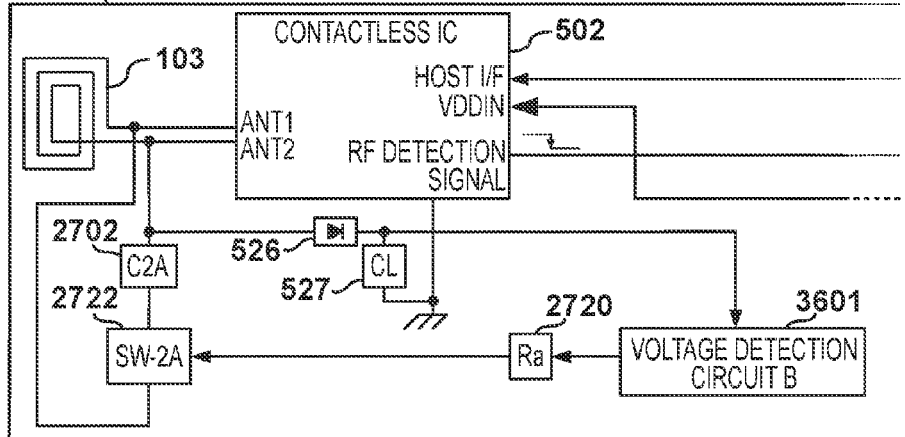
FIG. 33B is a block diagram showing a configuration example 2 of peripheral circuits of the contactless IC 502 of a wireless communication apparatus 3701 according to the eighth embodiment.

FIG. 33B is a block diagram showing a configuration example 2 of peripheral circuits of the contactless IC 502 of a wireless communication apparatus 3701 according to the eighth embodiment. In FIG. 33B, the same reference numerals are given to constituent elements that are the same as or similar to those in the configuration example 2 (FIG. 5) of the first embodiment.

An Ra 2720 is a resistor, a C2A 2702 is a capacitor, and an SW-2A 2722 is a switch.

The function and configuration of the SW-2A 2722 block itself are the same as those of the configuration example 2 of the sixth embodiment, and thus description thereof is omitted.

Also, the function and configuration of the voltage detection circuit B 3601 block itself are the same as those of the configuration example 1 of the eighth embodiment, and thus description thereof is omitted.

An input terminal for turning on/off the SW-2A 2722 (first switch) is connected to the output terminal of the voltage detection circuit B 3601 via the Ra 2720.

Operations performed in a case in which the contactless IC 502 receives electromagnetic waves from the contactless IC reader/writer and the wireless power supply apparatus will be described.

When the contactless IC 502 receives electromagnetic waves from the outside, an electric current is generated in the antenna 103, the electric current is rectified by the rectifier circuit configured by the diode 526 and the capacitor CL 527, and the voltage generated in the rectifier circuit is input to the voltage detection circuit B 3601.

If the input voltage is less than the detection voltage threshold Vbt, the voltage detection circuit B 3601 outputs "L", a signal output from the voltage detection circuit B 3601 does not drive the SW-2A 2722 via the Ra 2720, and the SW-2A 2722 remains off.

If the input voltage is greater than or equal to the detection voltage threshold Vbt, the voltage detection circuit B 3601 outputs "H", the signal output from the voltage detection circuit B 3601 drives the SW-2A 2722 via the Ra 2720 and the SW-2A 2722 is turned on.

The SW-2A 2722 is connected to one terminal of the antenna 103 of the contactless IC 502 via the C2A 2702, and the other terminal of the SW-2A 2722 is connected to the other terminal of the antenna 103 of the contactless IC 502.

If the SW-2A 2722 is on, one of the terminals of the antenna 103 is connected to the other terminal of the antenna 103 via the C2A 2702 and the SW-2A 2722.

If the terminals of the antenna 103 are connected to each other via the C2A 2702, the equivalent resonance circuit of the antenna 103 has a configuration in which in addition to inductance and capacitor components of the antenna 103, the capacitor C2A 2702 is added in parallel. Accordingly, a resonance frequency and a Q value of the antenna 103 change to different values from before the capacitor C2A 2702 is added.

It should be noted that it is assumed that the resonance frequency of the antenna 103 that has changed due to the addition of the capacitor C2A 2702 is a frequency that is lower than a fundamental frequency of electromagnetic waves from the contactless IC reader/writer and the wireless power supply apparatus, for example.

Also, it is assumed that the Q value of the antenna 103 that has changed due to the addition of the capacitor C2A 2702 is a Q value that is lower than before the change.

Change in the resonance frequency and a Q value of the antenna 103 reduces the electric current generated in the antenna 103 by the electromagnetic waves from the outside, and the contactless IC 502 cannot maintain the power required for the wireless communication operation, as a result of which the wireless communication operation stops.

In order to allow the contactless IC 502 to perform the wireless communication operation, it is sufficient that an output voltage that is generated in the antenna 103 by electromagnetic waves from the outside and rectified in the rectifier circuit configured by the diode 526 and the capacitor CL 527 is less than the detection voltage threshold Vbt of the voltage detection circuit B 3601.

Configuration Example 3 of Eighth Embodiment

Figure 33C:
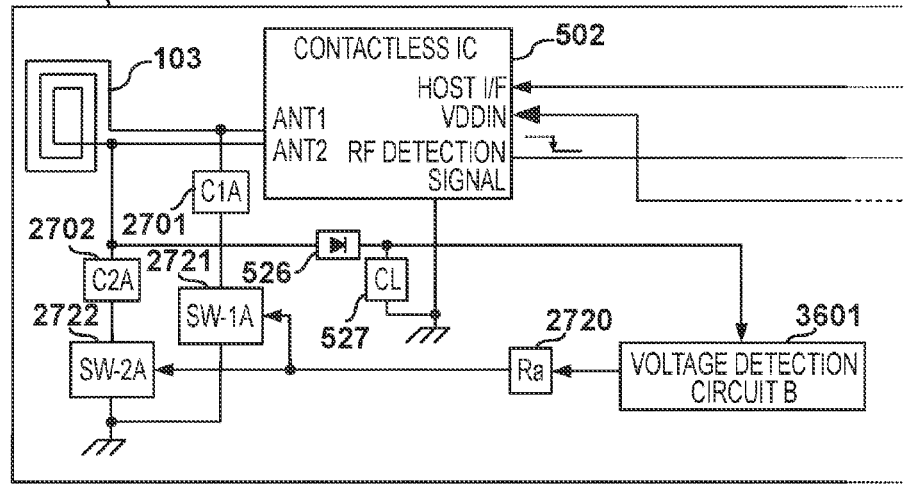
FIG. 33C is a block diagram showing a configuration example 3 of peripheral circuits of the contactless IC 502 of a wireless communication apparatus 3801 according to the eighth embodiment.

FIG. 33C is a block diagram showing a configuration example 3 of peripheral circuits of the contactless IC 502 of a wireless communication apparatus 3801 according to the eighth embodiment. In FIG. 33C, the same reference numerals are given to constituent elements that are the same as or similar to those in the configuration example 2 (FIG. 5) of the first embodiment.

An Ra 2720 is a resistor, a C2A 2702 is a capacitor, and an SW-1A 2721 and an SW-2A 2722 are switches.

The functions and configurations of the SW-1A 2721 and the SW-2A 2722 are the same as those of the configuration example 2 of the seventh embodiment, and thus description thereof is omitted and a connection configuration and operations of circuit blocks will be described in the present embodiment.

Also, the function and configuration of the voltage detection circuit B 3601 block itself are the same as those of the configuration example 1 of the eighth embodiment.

Input terminals for turning on/off the SW-1A 2721 (fifth switch) and the SW-2A 2722 (first switch) are connected to an output terminal of the voltage detection circuit B 3601 via the Ra 2720.

Operations performed in a case in which the contactless IC 502 receives electromagnetic waves from the contactless IC reader/writer and the wireless power supply apparatus will be described.

When the contactless IC 502 receives electromagnetic waves from the outside, an electric current is generated in the antenna 103, the electric current is rectified by the rectifier circuit configured by the diode 526 and the capacitor CL 527, and the voltage generated in the rectifier circuit is input to the voltage detection circuit B 3601.

If the input voltage is less than the detection voltage threshold Vbt, the voltage detection circuit B 3601 outputs "L", and a signal output from the voltage detection circuit B 3601 does not drive the SW-1A 2721 or the SW-2A 2722 via the Ra 2720. The SW-1A 2721 and the SW-2A 2722 thus remain off.

If the input voltage is greater than or equal to the detection voltage threshold Vbt, the voltage detection circuit B 3601 outputs "H", and the signal output from the voltage detection circuit B 3601 drives the SW-1A 2721 and the SW-2A 2722 via the Ra 2720. The SW-1A 2721 and the SW-2A 2722 are thus turned on.

The SW-2A 2722 is connected to the antenna 103 of the contactless IC 502 via the C2A 2702, and if the SW-2A 2722 is on, the antenna 103 is connected to ground via the C2A 2702 and the SW-2A 2722.

The SW-1A 2721 is connected to the antenna 103 of the contactless IC 502 via the C1A 2701, and if the SW-1A 2721 is on, the antenna 103 is connected to ground via the C1A 2701 and the SW-1A 2721.

The SW-1A 2721 uses one of the antenna terminals of the contactless IC 502 as a connection point. The SW-2A 2722 uses the other terminal of the antenna 103, which is different from the connection point of the SW-1A 2721, as a connection point.

An operation by which the antenna 103 is connected to ground via the SW-1A 2721 and the C2A 2702 will be described. The equivalent resonance circuit of the antenna 103 has a configuration in which in addition to inductance and capacitor components of the antenna 103, the capacitors C1A 2701 and C2A 2702 are added to ground. Accordingly, a resonance frequency and a Q value of the antenna 103 change to different values from before the capacitor C2A 2702 is added.

Compared to the configuration example 1 of the eighth embodiment, in the present embodiment, the capacitor components added to ground can be increased and the effect of changing the resonance frequency and the Q value is greater than in the configuration example 1 of the eighth embodiment.

It should be noted that it is assumed that the resonance frequency of the antenna 103 that has changed due to the addition of the capacitors C1A 2701 and C2A 2702 is a frequency that is lower than a fundamental frequency of electromagnetic waves from the contactless IC reader/writer and the wireless power supply apparatus, for example.

Also, it is assumed that the Q value of the antenna 103 that has changed due to the addition of the capacitors C1A 2701 and C2A 2702 is a Q value that is lower than before the change.

Change in the resonance frequency and a Q value of the antenna 103 reduces the electric current generated in the antenna 103 by the electromagnetic waves from the outside, and the contactless IC 502 cannot maintain the power required for the wireless communication operation, as a result of which the wireless communication operation stops.

In order to allow the contactless IC 502 to perform the wireless communication operation, it is sufficient that an output voltage that is generated in the antenna 103 by electromagnetic waves from the outside and rectified in the rectifier circuit configured by the diode 526 and the capacitor CL 527 is less than the detection voltage threshold Vbt of the voltage detection circuit B 3601.

Three configuration examples of the eighth embodiment have been described above. In the present embodiment, in the case of receiving electromagnetic waves of wireless communication or wireless power supply from the outside, if the intensity of the input voltage of the electromagnetic waves is greater than or equal to a detection voltage threshold, the contactless IC and the peripheral circuits change the resonance frequency of an antenna of the contactless IC, using the electromagnetic waves as a trigger. That is, if the electromagnetic waves have an intensity such that the voltage input to the voltage detection circuit is greater than or equal to the detection voltage threshold, the contactless IC and the peripheral circuits start a closed loop circuit such that power supply to the contactless IC is deactivated. As a result, in the eighth embodiment, the resonance frequency and the Q value of the antenna of the contactless IC change due to the electromagnetic waves from the outside, and the electric current that is generated by the electromagnetic waves from the outside and flows through the antenna is reduced. Accordingly, temperature of components is unlikely to increase, and it becomes possible to configure circuits with components that have a smaller size and a lower rating. Also, in the case where the electromagnetic waves have an intensity that is less than a predetermined voltage threshold, the resonance frequency and the Q value are not changed. That is, it is possible to perform communication with respect to electromagnetic waves that are not for power supply.

OTHER EMBODIMENTS

It should be noted that in order to simplify the description, the above-described embodiments have each described a case in which, among the terminals of the antenna 103, a terminal that is connected to an ANT 2 of the contactless ICs 102, 502, and 602 is shunted. However, a terminal that is connected to an ANT 1 may also be shunted. In this case, for example, in FIG. 24 or the like, the ANT 1 may be connected to the SW-A 1421 via the diode 1428 and the resistor RL 1422. Such a configuration can shut off the power supply to the contactless IC without being influenced by differences in the internal circuits of the contactless IC.

The above embodiments have described a configuration in which an NPN transistor or an NchMOSFET is used for the SW-A, the SW-B, the SW-C, and the SW-D. However, switches that can be applied to the above embodiments are not limited to the NPN transistor or the NchMOSFET. For example, a PNP transistor or a PchMOSFET can be applied to the above embodiments. In the case where all or any of the SW-A, the SW-B, the SW-C, and the SW-D are the PNP transistor or the PchMOSFET, it is sufficient to reverse the relationship between the logic of a signal that drives the switch and the highside and lowside of the switch. In other words, as the SW-A, the SW-B, the SW-C, and the SW-D, another element can be adopted as long as it is in a conduction state when turned on and is in a high impedance state when turned off.

Also, in the above embodiments, the description has been given assuming that the wireless communication of the contactless IC support the international standard ISO/IEC 21481. However, the wireless communication standard of the contactless IC that can be applied to the above embodiments is not limited to ISO/IEC 21481. Any standard can be applied thereto as long as the contactless IC can operate using electromagnetic waves from the outside as power. In terms of the frequency of the electromagnetic waves, frequencies other than 13.56 MHz used by ISO/IEC 21481 (for example, frequencies from the kHz band to the GHz band used in the respective parts of the ISO/IEC 18000 series) can be applied to the above embodiments. Moreover, regarding the frequency of the electromagnetic waves, 6.78 MHz and 13.56 MHz transmitted by a wireless power-supply apparatus can be applied to the above embodiments.

Also, the present invention is not limited to the specific embodiment described in the above embodiments, and peripheral circuits and methods for controlling the same in the above embodiments may be appropriately combined. Whatever the form, the contactless IC and the peripheral circuits constitute a closed loop circuit such that, in the case of receiving electromagnetic waves and communication from the outside, deactivates the wireless communication operation of the contactless IC using the electromagnetic waves and communication as a trigger. Moreover, the peripheral circuits further include a configuration for releasing the closed loop circuit. Therefore, in the case where the peripheral circuits and the methods for controlling the same in the above embodiments are combined, as a configuration in which the closed loop circuit is released, a portion or all of the output from the CPU, the output from the state holding circuit, and the output from the voltage detection circuit may be appropriately combined by OR or AND.

It should be noted that a closed loop circuit that deactivates the wireless communication operation of the contactless IC using electromagnetic waves and communication from the outside as a trigger and a configuration for releasing the closed loop circuit which have been described, are not limited to the above-described embodiments. The closed loop circuit may have any configuration for deactivating the wireless communication operation of the contactless IC using electromagnetic waves and communication from the outside as a trigger. Also, the configuration for releasing the closed loop circuit may be another configuration as long as it is able to release the closed loop circuit.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'M), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A communication apparatus comprising:
   an antenna;
   a battery;
   a communication unit configured to be able to use external power that is generated by receiving a signal from an external apparatus via the antenna, thereby transmitting a response to the signal that is received from the external apparatus to the external apparatus;
   a deactivation unit configured to, in a case where the external power is generated by receiving the signal from the external apparatus via the antenna, deactivate supply of the external power from the antenna to the communication unit by using the external power;
   an interrupt circuit that is coupled with the deactivation unit and configured to interrupt, in response to an input signal, deactivation of supply of the external power from the antenna to the communication unit by the deactivation unit;
   a central processing unit (CPU) configured to operate using power from the battery and input a signal to the interrupt circuit based on a CPU state; and
   a detection circuit that is coupled with the deactivation unit and configured to detect voltage of the battery and to input a signal to the interrupt circuit based on the voltage of the battery,
   wherein the deactivation unit, in a case where a signal output from the communication unit in response to reception of the signal from the external apparatus is input, deactivates supply of the external power from the antenna to the communication unit,
   wherein the communication unit includes a signal output terminal configured to output a signal in response to reception of a signal from the external apparatus,
   wherein the deactivation unit includes:
      a first switch including an input terminal and configured to be turned on when the signal is input to the input terminal; and
      a circuit configured to connect the signal output terminal to the input terminal of the first switch, and to shunt the antenna to ground in a case where the first switch is turned on,
   wherein the CPU further includes a control output terminal configured to output a control signal, and
   wherein the interrupt circuit includes:
      a third switch including an input terminal and configured to be turned on when the control signal from the CPU or the signal from the detection circuit is input to the input terminal; and
      a circuit configured to connect the control output terminal of the CPU and the signal output terminal of the detection circuit to the input terminal of the third switch, and to shunt the input terminal of the first switch to ground in a case where the third switch is turned on.

2. The communication apparatus according to claim 1, wherein the deactivation unit, in a case where a signal output from the communication unit in response to reception of the signal from the external apparatus is input, deactivates supply of the external power from the antenna to the communication unit by shunting the antenna to ground.

3. The communication apparatus according to claim 2, wherein the communication unit includes a VDD terminal, and
   wherein the signal output from the communication unit in response to reception of the signal from the external apparatus is an output from the VDD terminal.

4. The communication apparatus according to claim 1, wherein the interrupt circuit interrupts deactivation of supply of the external power from the antenna to the communication unit by the deactivation unit, by interrupting the signal from the communication unit to the deactivation unit.

5. The communication apparatus according to claim 4, wherein the interrupt circuit interrupts deactivation of supply of the external power from the antenna to the communication unit by the deactivation unit, by shunting a signal path from the communication unit to the deactivation unit to ground.

6. The communication apparatus according to claim 1, wherein the deactivation unit deactivates supply of the external power from the antenna to the communication unit by shunting the antenna to ground via a resistor.

7. A method for controlling a communication apparatus that includes:
   an antenna;
   a battery;
   a communication unit configured to be able to use external power that is generated by receiving a signal from an external apparatus via the antenna, thereby transmitting a response to the signal that is received from the external apparatus to the external apparatus;
   a deactivation unit configured to, in a case where the external power is generated by receiving the signal from the external apparatus via the antenna, deactivate supply of the external power from the antenna to the communication unit by using the external power;
   an interrupt circuit that is coupled with the deactivation unit and configured to interrupt, in response to an input signal, deactivation of supply of the external power from the antenna to the communication unit by the deactivation unit;

a central processing unit (CPU) configured to operate using power from the battery; and
a detection circuit that is coupled with the deactivation unit and configured to detect voltage of the battery,
wherein the deactivation unit, in a case where a signal output from the communication unit in response to reception of the signal from the external apparatus is input, deactivates supply of the external power from the antenna to the communication unit,
wherein the communication unit includes a signal output terminal configured to output a signal in response to reception of a signal from the external apparatus,
wherein the deactivation unit includes:
   a first switch including an input terminal and configured to be turned on when the signal is input to the input terminal; and
   a circuit configured to connect the signal output terminal to the input terminal of the first switch, and to shunt the antenna to ground in a case where the first switch is turned on,
wherein the CPU further includes a control output terminal configured to output a control signal, and
wherein the interrupt circuit includes:
   a third switch including an input terminal and configured to be turned on when the control signal from the CPU or the signal from the detection circuit is input to the input terminal; and
   a circuit configured to connect the control output terminal of the CPU and the signal output terminal of the detection circuit to the input terminal of the third switch, and to shunt the input terminal of the first switch to ground in a case where the third switch is turned on,
the method comprising:
performing control so as to interrupt deactivation of supply of the external power from the antenna to the communication unit by the deactivation unit based on a CPU state of the CPU and the voltage of the battery.

8. A non-transitory computer readable storage medium which stores a program for causing a computer to execute a method for controlling a communication apparatus that includes:
   an antenna;
   a battery;
   a communication unit configured to be able to use external power that is generated by receiving a signal from an external apparatus via the antenna, thereby transmitting a response to the signal that is received from the external apparatus to the external apparatus;
   a deactivation unit configured to, in a case where the external power is generated by receiving the signal from the external apparatus via the antenna, deactivate supply of the external power from the antenna to the communication unit by using the external power;
   an interrupt circuit that is coupled with the deactivation unit and configured to interrupt, in response to an input signal, deactivation of supply of the external power from the antenna to the communication unit by the deactivation unit;
   a central processing unit (CPU) configured to operate using power from the battery; and
   a detection circuit that is coupled with the deactivation unit and configured to detect voltage of the battery,
wherein the deactivation unit, in a case where a signal output from the communication unit in response to reception of the signal from the external apparatus is input, deactivates supply of the external power from the antenna to the communication unit,
wherein the communication unit includes a signal output terminal configured to output a signal in response to reception of a signal from the external apparatus,
wherein the deactivation unit includes:
   a first switch including an input terminal and configured to be turned on when the signal is input to the input terminal; and
   a circuit configured to connect the signal output terminal to the input terminal of the first switch, and to shunt the antenna to ground in a case where the first switch is turned on,
wherein the CPU further includes a control output terminal configured to output a control signal, and
wherein the interrupt circuit includes:
   a third switch including an input terminal and configured to be turned on when the control signal from the CPU or the signal from the detection circuit is input to the input terminal; and
   a circuit configured to connect the control output terminal of the CPU and the signal output terminal of the detection circuit to the input terminal of the third switch, and to shunt the input terminal of the first switch to ground in a case where the third switch is turned on,
the method comprising:
performing control so as to interrupt deactivation of supply of the external power from the antenna to the communication unit by the deactivation unit based on a CPU state of the CPU and the voltage of the battery.

* * * * *